US011036723B1

(12) United States Patent
Cooke et al.

(10) Patent No.: US 11,036,723 B1
(45) Date of Patent: *Jun. 15, 2021

(54) GRAPHICAL USER INTERFACE FOR RECURRING SEARCHES

(71) Applicant: Aurea Software, Inc., Austin, TX (US)

(72) Inventors: David Cooke, Los Altos, CA (US); Vivie Lee, Brisbane, CA (US); Nima Niakan, San Ramon, CA (US); Binay Mohanty, New Delhi (IN)

(73) Assignee: AUREA SOFTWARE, INC., Austin, TX (US)

( * ) Notice: Subject to any disclaimer, the term of this patent is extended or adjusted under 35 U.S.C. 154(b) by 795 days.

This patent is subject to a terminal disclaimer.

(21) Appl. No.: 15/018,817

(22) Filed: Feb. 8, 2016

Related U.S. Application Data

(63) Continuation of application No. 13/536,995, filed on Jun. 28, 2012, now Pat. No. 9,292,505.

(60) Provisional application No. 61/661,340, filed on Jun. 18, 2012, provisional application No. 61/658,911, filed on Jun. 12, 2012.

(51) Int. Cl.
| | |
|---|---|
| *G06F 16/242* | (2019.01) |
| *G06F 16/93* | (2019.01) |
| *G06F 3/0484* | (2013.01) |
| *G06F 3/0482* | (2013.01) |

(52) U.S. Cl.
CPC ........ *G06F 16/2428* (2019.01); *G06F 3/0482* (2013.01); *G06F 3/04842* (2013.01); *G06F 16/93* (2019.01)

(58) Field of Classification Search
CPC ......... G06F 17/30398; G06F 17/30011; G06F 3/0482; G06F 3/04842; G06F 16/2428; G06F 16/93
See application file for complete search history.

(56) References Cited

U.S. PATENT DOCUMENTS

| | | | |
|---|---|---|---|
| 7,698,261 B1 * | 4/2010 | Khoshnevisan | .. G06F 17/30864 707/999.003 |
| 2002/0052894 A1 * | 5/2002 | Bourdoncle | .......... G06F 16/954 715/202 |
| 2005/0060312 A1 * | 3/2005 | Curtiss | .............. G06F 17/30864 |

(Continued)

OTHER PUBLICATIONS

Amendment under 37 C.F.R. § 1.312 as filed in U.S. Appl. No. 13/536,995 dated Jan. 26, 2016, pp. 1-10.

(Continued)

*Primary Examiner* — John T Repsher, III

(57) ABSTRACT

Some embodiments provide a method for generating a graphical user interface (GUI) for a research system that identifies documents relevant to several categories. The method receives a user objective and at least one initial category for a recurring search that identifies documents relevant to several categories for presentation to a user. The method provides for display in the GUI several selectable additional categories related to the received initial category for the user objective. The method receives a selection of a set of categories through the GUI. The method provides for display in the GUI an optimized modifiable set of filters for removing specific types of documents that are relevant to the set of categories from the recurring search. The method generates the recurring search for the user based on the received categories and a modified set of filters.

10 Claims, 41 Drawing Sheets

(56) References Cited

U.S. PATENT DOCUMENTS

| | | | | |
|---|---|---|---|---|
| 2005/0197110 | A1* | 9/2005 | Hasan | H04M 1/274516 |
| | | | | 455/417 |
| 2006/0106793 | A1* | 5/2006 | Liang | G06F 17/30654 |
| 2007/0106627 | A1* | 5/2007 | Srivastava | G06Q 10/10 |
| | | | | 706/20 |
| 2010/0293073 | A1* | 11/2010 | Schmidt | G06Q 30/02 |
| | | | | 705/26.62 |
| 2011/0191326 | A1* | 8/2011 | Gutlapalli | G06F 16/00 |
| | | | | 707/723 |
| 2012/0278244 | A1* | 11/2012 | Lee | G06Q 50/184 |
| | | | | 705/310 |
| 2012/0310927 | A1* | 12/2012 | Johnson | G06F 17/30864 |
| | | | | 707/723 |

OTHER PUBLICATIONS

Notice of Allowance dated Oct. 27, 2015, mailed in U.S. Appl. No. 13/536,995, pp. 1-27.
Request for Continued Examination (RCE) and RCE Submission as filed in U.S. Appl. No. 13/536,995 dated Nov. 5, 2014, pp. 1-14.
Final Office Action dated Aug. 5, 2014, mailed in U.S. Appl. No. 13/536,995, pp. 1-34.
Response to Non-Final Office Action dated Mar. 12, 2014, as filed in U.S. Appl. No. 13/536,995, filed Jun. 12, 2014, pp. 1-12.
Non-Final Office Action dated Mar. 12, 2014, mailed in U.S. Appl. No. 13/536,995, pp. 1-27.

* cited by examiner

Set Up My Competitors »

What would you like to call this monitor? [_____]

🖉 Preview & set layout preferences
(of 432 articles in last 7 days)

| Things I am interested in monitoring | Focus areas and filters | Set delivery preferences |

Find one at a time or Enter a list of companies at once.    1307

What company would you like to monitor.

C:BoeingCompany    [Add]    [NEXT »]    1415

☑ Boeing Company

We have selected Companies, Topics and Industries of interest, based on observed business relationships

| Companies | Topics | Industries |
|---|---|---|
| remove all  select all | remove all  select all | remove all  select all |
| ☑ Airbus S.A.S. | ☐ Boeing 787 | ☐ Aerospace/Defense Industry - Major Diversified |
| ☐ United Launch Alliance, LLC | ☐ Aerospace Industry Outlook | ☐ Industrial Goods Sector |
| ☑ Dassault Aviation SA | ☑ Defense Contracts | ☐ Aerospace/Defense Segment |
| ☐ Groupe Industriel Marcel Dassault S.A. | ☐ Commercial Aerospace Industry | ☐ Aerospace/Defense Industry - Products & Services |
| ☑ BAE Systems PLC | ☐ Airbus 380 | ☐ Industrial Segment |
| ☐ Bombardier Inc. | ☐ Defense Industry Trends | ☐ Diversified Machinery Industry |
| ☐ Space Exploration Technologies Corp. | ☐ Airbus 350 | ☐ Industrial Equipment & Component Industry |
| ☑ Raytheon Company | ☑ Defense Spending | |
| ☐ Hindustan Aeronautics Limited | ☑ Military Aircraft Market | People |
| ☐ Rolls-Royce Holdings plc | ☐ Airbus 350 vs. Boeing 787 | remove all  select all |
| ☐ Dubai Aerospace Enterprise | ☐ Weapons Industry | ☐ Dennis A Muilenburg |
| ☐ Sierra Nevada Corporation | ☐ Aircraft Assemblies & Components | ☐ James F Albaugh |
| ☐ QinetiQ Group plc | ☐ Aerospace MRO Trends | ☐ R Sam Deford |
| ☐ Northrop Grumman Aerospace Systems | ☑ Satellite Launch Vehicles | ☐ John J Tracy |
| ☑ Thales SA | ☐ Aircraft Leasing Industry | ☐ Robert E Verbeck |
| ☐ Greenpoint Technologies, Inc. | ☐ Aerospace Sales Information | ☐ Ron Kirk |
| ☐ Sikorsky Aircraft Corporation | ☐ Avionics Industry | ☐ Richard Aboulafia |
| ☑ Saab AB | ☑ In-Flight Refueling | ☐ Siim Kallas |
| ☐ Hawker Beechcraft Corporation | ☐ Military Modernization Plans | ☐ Timothy Geithner |
| ☐ Israel Aerospace Industries Ltd. | ☐ Special Purpose Aircraft | ☐ Leon Panetta |
| ☐ Aviation Industry Corporation of China | ☐ Radar Systems | |
| ☐ AEL Sistemas S.A | ☐ Airbus 380 Vs. Boeing 747-8 | |
| ☐ AgustaWestland North America Inc. | ☐ Military Ships | |
| | ☐ Space Exploration Trends | |
| | ☐ Airborne Early Warning and Control (AEW&C) | |

Selected Interests    1308
8 Companies | 0 Industries | 5 Topics | 0 People | 0 Others

Companies
- ⊛ Boeing Company  [X]
- ⊛ Airbus S.A.S.  [X]
- ⊛ Dassault Aviation SA  [X]
- ⊛ BAE Systems PLC  [X]
- ⊛ Raytheon Company  [X]
- ⊛ Thales SA  [X]
- ⊛ Saab AB  [X]
- ⊛ EADS North America, Inc.  [X]

Industries

Topics
- Defense Contracts  [X]
- Defense Spending  [X]
- Military Aircraft Market  [X]
- Satellite Launch Vehicles  [X]
- In-Flight Refueling  [X]

People

Others

Set Up My Competitors »

What would you like to call this monitor?                    Preview & set layout preferences 1308
                                                             (of 436 articles in last 7 days)

| Things I am interested in monitoring | Focus areas and filters | Set delivery preferences |

Find one at a time or Enter a list of companies at once.    NEXT »    Selected Interests
What company would you like to monitor. 1307            8 Companies | 0 Industries | 5 Topics | 0 People | 0 Others C:BoeingCompany                          Add    1415        Companies
                                                            ▽ Boeing Company                    ✗
☑ Boeing Company                                        ▽ Airbus S.A.S.                     ✗
We have selected Companies, Topics and Industries of interest, based on observed business relationships   ▽ Dassault Aviation SA  ✗
                                                            ▽ BAE Systems PLC                   ✗
| Companies | Topics | Industries |                         ▽ Thales SA                         ✗
| remove all  select all | remove all  select all | remove all  select all | ▽ Saab AB         ✗
| ☑ Airbus S.A.S. | ☐ Boeing 787 | ☐ Aerospace/Defense Industry - Major Diversified | ▽ EADS North America, Inc. ✗
| ☑ United Launch Alliance, LLC | ☐ Aerospace Industry Outlook | ☐ Industrial Goods Sector | ▽ United Launch Alliance, LLC ✗
| ☑ Dassault Aviation SA | ☑ Defense Contracts | ☐ Aerospace/Defense Segment | Industries |
| ☐ Groupe Industriel Marcel Dassault S.A. | ☐ Commercial Aerospace Industry | ☐ Aerospace/Defense Industry - Products & Services | Topics |
| ☑ BAE Systems PLC | ☐ Airbus 380 | ☐ Industrial Segment | Defense Contracts ✗ |
| ☐ Bombardier Inc. | ☐ Defense Industry Trends | ☐ Diversified Machinery Industry | Defense Spending ✗ |
| ☐ Space Exploration Technologies Corp. | ☐ Airbus 350 | ☐ Industrial Equipment & Component Industry | Military Aircraft Market ✗ |
| ☐ Raytheon Company | ☑ Defense Spending | People | Satellite Launch Vehicles ✗ |
| ☐ Hindustan Aeronautics Limited | ☑ Military Aircraft Market | remove all  select all | In-Flight Refueling ✗ |
| ☐ Rolls-Royce Holdings plc | ☐ Airbus 350 vs. Boeing 787 | ☐ Dennis A Muilenburg | People |
| ☐ Dubai Aerospace Enterprise | ☐ Weapons Industry | ☐ James F Albaugh | Others |
| ☐ Sierra Nevada Corporation | ☐ Aircraft Assemblies & Components | ☐ R Sam Deford | |
| ☐ QinetiQ Group plc | ☐ Aerospace MRO Trends | ☐ John J Tracy | |
| ☐ Northrop Grumman Aerospace Systems | ☑ Satellite Launch Vehicles | ☐ Robert E Verbeck | |
| ☑ Thales SA | ☐ Aircraft Leasing Industry | ☐ Ron Kirk | |
| ☐ Greenpoint Technologies, Inc. | ☐ Aerospace Sales Information | ☐ Richard Aboulafia | |
| ☐ Sikorsky Aircraft Corporation | ☐ Avionics Industry | ☐ Slim Kallas | |
| ☑ Saab AB | ☑ In-Flight Refueling | ☐ Timothy Geithner | |
| ☐ Hawker Beechcraft Corporation | ☐ Military Modernization Plans | ☐ Leon Panetta | |
| ☐ Israel Aerospace Industries Ltd. | ☐ Special Purpose Aircraft | | |
| ☐ Aviation Industry Corporation of China | ☐ Radar Systems | | |
| ☐ AEL Sistemas S.A | ☐ Airbus 380 Vs. Boeing 747-8 | | |
| ☐ AgustaWestland North America Inc. | ☐ Military Ships | | |
|  | ☐ Space Exploration Trends | | |
|  | ☐ Airborne Early Warning and Control (AEW&C) | | |

1400 (arrow pointing to top right area)

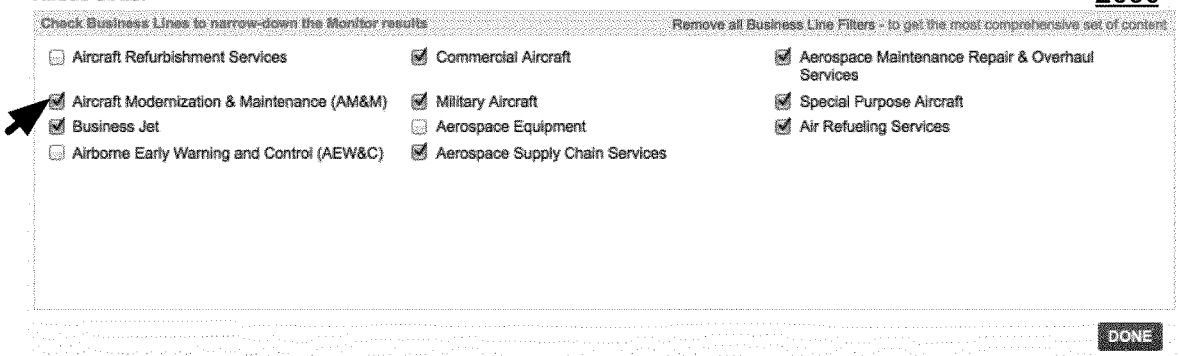
Figure 20

| Business Basics | Content Types | Regions | Advanced |

Select Business Basics to explicitly include, or exclude from your Monitor.   Remove all filters - to get the most comprehensive set of content

| Management and Board Changes | only | exclude | Product Initiatives | only | exclude |
| Regulatory, Litigation and Patents | only | exclude | Marketing Initiatives | only | exclude |
| Corporate Governance | only | exclude | Bankruptcy | only | exclude |
| M&A and Spin-offs | only | exclude | Earnings & Dividends | only | exclude |
| Partnerships and Agreements | only | exclude | Special Dividends | only | exclude |
| Customer Wins or Losses | only | exclude | Financing Activities | only | exclude |
| Business Expansion & Exit | only | exclude | Pricing Information | only | exclude |
| Market Share Information | only | exclude | Management Quotes | only | exclude |
| Operating Activities | only | exclude | Corporate & Investor Events | only | exclude |
| Analyst Ratings | only | exclude | Awards & Recognition | only | exclude |
| Analyst Comments | only | exclude | | | |

DONE

| Business Basics | Content Types | Regions | Advanced |

Select Content Types to explicitly include, or exclude from your Monitor.   Remove all filters - to get the most comprehensive set of content

| Press Releases | only | exclude | 8-K Filings | only | exclude | Call Transcripts | only | exclude |
| News Wires | only | exclude | 10-K Filings | only | exclude | Medical Journals | only | exclude |
| Blogs | only | exclude | 10-Q Filings | only | exclude | News and Web | only | exclude |
| Industry Sources | only | exclude | SEC Form 3,4,5 | only | exclude | | | |

DONE

Set Up My Competitors »

What would you like to call this monitor?  Airline Competitor Monitor

Preview & set layout preferences
(of 673 articles in last 7 days)

2200

| ✓ Things I am interested in monitoring | Focus areas and filters | Set delivery preferences |

Add more interests

16 Companies | 0 Industries | 10 Topics | 0 People | 0 Others

Based on the Companies you have selected and the projected monitor volume we recommend setting no filters on this monitor.

NEXT »

Companies
- Boeing Company
- Airbus S.A.S.
- Dassault Aviation SA
- BAE Systems PLC
- Thales SA
- Saab AB
- EADS North America, Inc.
- United Launch Alliance, LLC
- Southwest Airlines Co.
- JetBlue Airways Corporation
- Frontier Airlines, Inc.
- Alaska Airlines, Inc.
- EasyJet plc
- Comair Holdings, LLC
- Flybe Group PLC
- Mesa Air Group, Inc.

Industries

Topics
- Defense Contracts
- Defense Spending
- Military Aircraft Market
- Satellite Launch Vehicles
- In-Flight Refueling
- Airline Industry Trends
- Airline Industry - Statistical Information
- Airline Travel Trends
- Commercial Airlines - Business Class Travel
- Airlines - Low Cost Carriers

People

2905

Business Basics
Include ONLY the following specific types of business basics:
• Management and Board Changes  • Product Initiatives  • Regulatory, Litigation and Patents  • Marketing Initiatives  • Corporate Governance  • Partnerships and Agreements  • Customer Wins or Losses  • Business Expansion & Exit  • Pricing Information  • Market Share Information  • Management Quotes  • Operating Activities  • Awards & Recognition
Exclude ALL the following specific types of business basics:
• M&A and Spin-offs  • Special Dividends  • Corporate & Investor Events  • Analyst Ratings

Content Types
Exclude ALL the following specific types of content:
• 8-K Filings  • Call Transcripts  • 10-K Filings  • 10-Q Filings  • SEC Form 3,4,5

Regions
World-wide coverage configured.

Advanced
No additional filter parameter have been applied.

Remove all filters »  Add or Modify »

Set Up My Competitors »

What would you like to call this monitor? | Airline Competitor Monitor | ← 3305

📄 Preview & set layout preferences
(of 580 articles in last 7 days)

3000

✓ Things I am interested in monitoring | ✓ Focus areas and filters | Set delivery preferences

Add more interests
16 Companies | 0 Industries | 10 Topics | 0 People | 0 Others

Add more filters
17 Business Basics | 5 Content Types | 0 Regions

☐ Send Email reports:

DONE

Companies
- Boeing Company
- Airbus S.A.S.
- Dassault Aviation SA
- BAE Systems PLC
- Thales SA
- Saab AB
- EADS North America, Inc.
- United Launch Alliance, LLC
- Southwest Airlines Co.
- JetBlue Airways Corporation
- Frontier Airlines, Inc.
- Alaska Airlines, Inc.
- EasyJet plc
- Comair Holdings, LLC
- Flybe Group PLC
- Mesa Air Group, Inc.

Industries

Topics
- Defense Contracts
- Defense Spending
- Military Aircraft Market
- Satellite Launch Vehicles
- In-Flight Refueling
- Airline Industry Trends
- Airline Industry - Statistical Information
- Airline Travel Trends
- Commercial Airlines - Business Class Travel
- Airlines - Low Cost Carriers

People

Others

Business Basics
Include
- Management and Board Changes
- Product Initiatives
- Regulatory, Litigation and Patents
- Marketing Initiatives
- Corporate Governance
- Partnerships and Agreements
- Customer Wins or Losses
- Business Expansion & Exit
- Pricing Information
- Market Share Information
- Management Quotes
- Operating Activities
- Awards & Recognition Exclude
- M&A and Spin-offs
- Special Dividends
- Corporate & Investor Events
- Analyst Ratings

Content Types
Exclude
- 8-K Filings
- Call Transcripts
- 10-K Filings
- 10-Q Filings
- SEC Form 3,4,5

Regions
Advanced

Schedule
Weekdays ⇵ at 8 AM ⇵ & :00 ⇵
US/Pacific
+ Add more times

Format
☐ HTML (preferred option for desktop and laptop) sample
☐ Plain text (recommended for Blackberry users) sample Content Options
Standard ⇵  Include document summaries, and related topics Display Order
Change the order in which results are displayed

| Document ID | Category 1 | Score 1 | Category 2 | Score 2 | Category 3 | Score 3 | ... |
|---|---|---|---|---|---|---|---|
| Document ID 1 | Category A | 45 | Category C | 452 | Category J | 518 | |
| Document ID 2 | Category B | 105 | Category D | 974 | | | |
| Document ID 3 | Category A | 342 | Category B | 433 | Category C | 8 | |
| ... | | | | | | | |
| Document ID N | Category K | 681 | | | | | |

GRAPHICAL USER INTERFACE FOR RECURRING SEARCHES

CLAIM OF BENEFIT TO PRIOR APPLICATIONS

This application is a continuation application of U.S. patent application Ser. No. 13/536,995, filed Jun. 28, 2012. U.S. patent application Ser. No. 13/536,995 claims the benefit of U.S. Provisional Application 61/658,911, entitled "Generation of Recurring Searches", filed Jun. 12, 2012. This application also claims the benefit of U.S. Provisional Application 61/661,340, entitled "Generation of Recurring Searches", filed Jun. 18, 2012. U.S. patent application Ser. No. 13/536,995, U.S. Provisional Patent Application 61/658,911, and U.S. Provisional Patent Application 61/661,340 are incorporated herein by reference.

BACKGROUND

Most information today is stored electronically and is available on the World Wide Web. This information includes blog posts, articles (e.g., news articles, opinion pieces, etc.), research papers, web pages, and many other types of documents. While having this much information available is useful, it may be very difficult to find information relevant to a particular topic for a particular objective. Furthermore, it may be difficult to stay abreast of new information that becomes available regarding the particular topic on a continuing basis.

Search engines exist today to attempt to find documents on the web that relate to a search string input by the user. However, most search engines base their search on just the words and operators (e.g., "and", "or", etc.) entered by a user. When a user searches for a particular topic, the search engine will only find documents that use the entered word or words, which will lead to many relevant documents being completely overlooked. Such search engines cannot provide a good overview of the documents that surround a particular topic.

Furthermore, search engines do not provide a mechanism for assisting a user in formulating a search plan that includes detailed search parameters used to precisely define the types of content to retrieve for the user, which may then be applied on an ongoing basis to constantly monitor the World Wide Web for new information relevant to a variety of topics as defined by the search plan. Search engines require that the user specify all of the search terms and parameters for their interests. However, once a user searches for a topic, it is difficult for the user to narrow this search to a specific aspect of the topic using search terms alone. For example, a search engine may retrieve documents based on a search of a company name and this may or may not provide documents related to that company. However, focusing the documents on specific aspects of the company is not available in the search engine, as this sort of data is not stored by the search engine.

Lastly, search engines do not consider a user's objective for executing a search and thus do not help guide a user in formulating a search plan specific to their objective. Formulating a search plan is often a time consuming process and a user must execute numerous trial and error searches, review volumes of documents, and reevaluate a variety of different search plans before finding any search results that contain relevant information for their objective.

BRIEF SUMMARY

Some embodiments provide a novel system for monitoring a database (or collection of databases) for new documents relating to various categories (e.g. companies, topics, business lines, industries, people, etc.). In some embodiments, the system defines a monitor for a user according to interests and objectives received from the user. The system then retrieves and delivers to the user documents that are identified as relevant to the defined monitor (e.g., documents from the web or other sources). In some embodiments, each monitor is defined by a set of categories and a set of filters to use in determining which documents should be delivered to the user for the monitor. The system identifies a set of documents relevant to the categories and uses the set of filters to remove some of these documents.

In some embodiments, the categories for a particular monitor are user-specified categories. These categories may include companies, topics, industries, business lines, people or any other keyword that a user is interested in monitoring. Based on a set of categories initially specified by a user, the system automatically identifies additional categories to include in a monitor based on relationships between the initially-specified categories and the additional categories. Some embodiments automatically include these additional categories in the monitor, while other embodiments suggest the categories to the user and allow the user to select from the suggested categories. In order to suggest additional categories for a particular initial category, some embodiments detect different types of relationships that may exist between categories (e.g., competitors of a company, business lines of a company, etc.) and store these relationships in the knowledge base of the system. In some embodiments, the system continuously revisits and updates these relationships (e.g., by examining the relevancy of new documents to the different categories).

In addition to the categories, each monitor includes a set of filters used to further define and focus the specific types of information that the user wishes to receive. The filters defined for a monitor (or for a category within the monitor) may eliminate otherwise relevant documents based on various factors, such as content type, source type, and geographic restrictions. Some embodiments automatically generate an optimal set of filters for a monitor based on the user's objective and the categories selected. In some embodiments, the user can then modify the filter settings for the monitor to include more or fewer documents.

In order for the user to receive the documents determined relevant to a monitor, each monitor also includes a set of parameters that specify how to deliver the documents to the user. These delivery parameters specify the manner in which the documents are delivered (e.g., via e-mail, login to a website, etc.), how many documents should be delivered, how these documents should be displayed (e.g., as html, PDF, etc.) and the particular order that the documents are displayed.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 14-19 conceptually illustrates an exemplary stage by stage process of the various GUIs that are displayed during a monitor setup process for recommending additional categories to a user to include in the monitor.

FIG. 20 conceptually illustrates two stages of the GUI display for selecting a particular business lines of a company to monitor.

FIGS. 22-28 conceptually illustrates an exemplary stage by stage process of the various GUIs that are displayed during a monitor setup process for modifying a set of filters for the monitor.

FIGS. 30-33 conceptually illustrates an exemplary stage by stage process of the various GUIs that are displayed during a monitor setup process for specifying the delivery parameters for a monitor.

FIG. 39 illustrates an example of the GUI for presenting information for a particular monitor.

FIG. 42 conceptually illustrates a portion of a document database that stores relevancy information for a number of documents.

DETAILED DESCRIPTION

Figure 1:
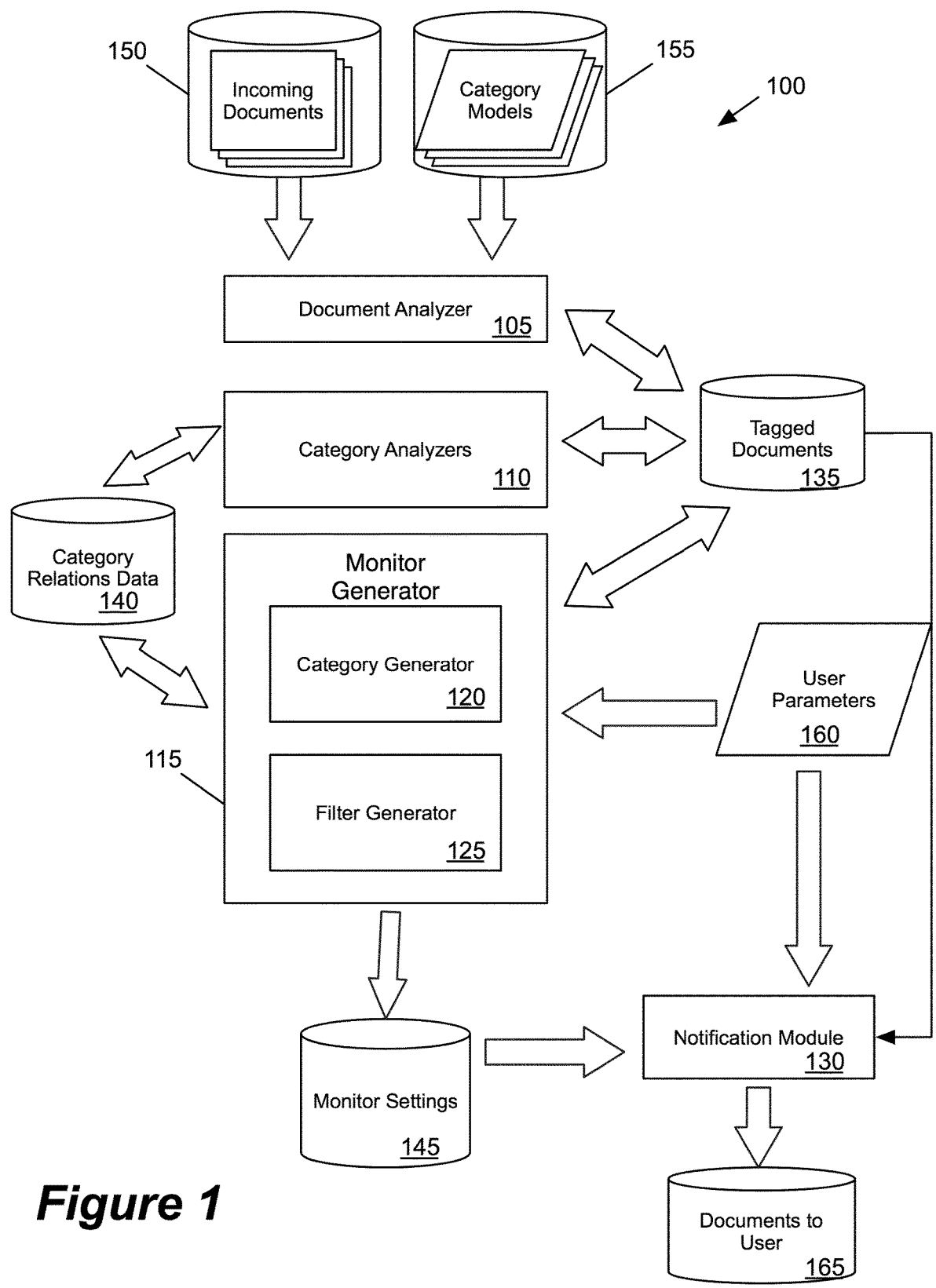
FIG. 1 conceptually illustrates a system of some embodiments that monitors a database of documents according to user specified monitors.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel system for monitoring a database (or collection of databases) for new documents relating to various categories (e.g. companies, topics, business lines, industries, people, etc.). Although many of the examples set forth and described below are related to business categories, the system may be implemented to generate monitors for any variety of subject matters, including topics related to sports, entertainment, education, or any other genre suitable for information monitoring.

In some embodiments, the system defines a monitor for a user according to interests and objectives received from the user. The system then retrieves and delivers to the user documents that are identified as relevant to the defined monitor (e.g., documents from the web or other sources). In some embodiments, each monitor is defined by a set of categories and a set of filters to use in determining which documents should be delivered to the user for the monitor. The system identifies a set of documents relevant to the categories and uses the set of filters to remove some of these documents.

In some embodiments, the categories for a particular monitor are user-specified categories. These categories may include companies, topics, industries, business lines, people or any other keyword that a user is interested in monitoring. Based on a set of categories initially specified by a user, the system automatically identifies additional categories to include in a monitor based on relationships between the initially-specified categories and the additional categories. Some embodiments automatically include these additional categories in the monitor, while other embodiments suggest the categories to the user and allow the user to select from the suggested categories. In order to suggest additional categories for a particular initial category, some embodiments detect different types of relationships that may exist between categories (e.g., competitors of a company, business lines of a company, etc.) and store these relationships in the knowledge base of the system. In some embodiments, the system continuously revisits and updates these relationships (e.g., by examining the relevancy of new documents to the different categories).

In addition to the categories, each monitor includes a set of filters used to further define and focus the specific types of information that the user wishes to receive. The filters defined for a monitor (or for a category within the monitor) may eliminate otherwise relevant documents based on various factors, such as content type, source type, and geographic restrictions. Some embodiments automatically generate an optimal set of filters for a monitor based on the user's objective and the categories selected. In some embodiments, the user can then modify the filter settings for the monitor to include more or fewer documents.

In order for the user to receive the documents determined relevant to a monitor, each monitor also includes a set of parameters that specify how to deliver the documents to the user. These delivery parameters specify the manner in which the documents are delivered (e.g., via e-mail, login to a website, etc.), how many documents should be delivered, and how these documents should be displayed (e.g., as html, PDF, etc.).

FIG. 1 conceptually illustrates a system 100 of some embodiments that monitors a database of documents according to user specified monitors. The monitors are each customized to retrieve focused information and/or documents that meet a user's objectives and interests. FIG. 1 illustrates the system of some embodiments which includes a document analyzer 105, a category analyzer 110, a monitor generator 115 that includes a category generator 120 and a filter generator 125, and a notification module 130. The system also includes tagged document storage 135, category relations data storage 140 and monitor settings storage 145.

The document analyzer 105 receives as inputs documents 150 and category models 155. The document analyzer 105 evaluates documents using the category models 155 to identify the relevance of the documents to the categories (e.g., companies, business lines, topics, or industries) represented by the models. When a document is relevant to a particular category, the document analyzer 105 tags the documents with the category. Each document tag may also include a relevance weight, score or level (e.g., low, medium, high) that indicates the degree to which a document is related to a particular category.

In some embodiments, the documents are retrieved on a periodic or continual basis by a document retriever, (e.g., a web crawler), and stored and/or transmitted to the document analyzer 105. Some embodiments store copies of the retrieved documents in a database system (e.g., SQL database) or store links to the documents in the database. In some embodiments, the system 100 may employ a different storage mechanism other than a database system to store documents. For instance, some embodiments of the system 100 may employ a NoSQL distributed architecture mechanism. This type of storage mechanism is typically used to manage large amount of information where performance and rapid access are important, such as for indexing a large number of documents or serving pages on high-traffic websites. The stored documents may be text files, computer readable files, HTML documents, PDF documents, word-processed documents, web resources, etc. Each of the documents contains a set of document elements. Document elements may include content elements (e.g., glyphs, letters, words, punctuation, numerical characters, symbols, etc.), structural elements (e.g., markup tags, headers, sections, columns, dividers, lines, etc.), and any other elements that can be parsed in a programmatic manner.

The category models 155 are used for a particular category (e.g., a business line, company, industry, topic, person, etc.) to identify documents relevant to the particular category. Each category model 155 includes data that is used to identify documents related to the category that the model represents. In some embodiments, the category models 155 include patterns of document elements associated with scores, as well as parameters used in the analysis of documents by the category model 155.

The patterns of document elements stored in the category models 155 may be any pattern (e.g., an uninterrupted sequence of words, groups of words within a certain proximity of each other, groups of word sets within a certain proximity of each other, pairs of words within a certain proximity of each other, etc.). For example, the patterns of document elements of some category models 155 is a group of word sets, with an anchor word set and other word sets within the context of the anchor word set forming a group of word sets. Different word set groups of the category model 155 may have different associated scores that are used in calculating a score for a document that contains the word set group.

In some embodiments, the document analyzer 105 applies the category models 155 to each of the documents by identifying the patterns of document elements in the document. The document analyzer 105 calculates a relevance score for each document's relation to each of the categories represented by the category models 155. The relevance score for each document is calculated based on the patterns identified in the document and their associated scores. When word set groups are utilized as the patterns of document elements, some embodiments calculate the relevance score for each document as the arithmetic mean of the scores for the word set groups identified in the document. Other embodiments calculate the relevance score as a sum, median, or other function of the scores for the identified word set groups.

The relevance of a particular document to a category varies based on the calculated score. When the document's relevance score for a particular category is above a threshold, the document is tagged, or otherwise related, to the particular category. The document evaluator stores the document and the tags indicating its relevancy to various categories in the tagged documents storage 135.

Using the numerous documents related to various categories, the category analyzers 110 associate categories with other categories for which data is stored in the system 100. The category analyzer 110 may define a variety of relationships between a variety of different categories using numerous automated and manual processes. Some examples of the different types of relationships between categories include relationships between companies and other companies (competitor, subsidiary, parent, partnership, etc.), companies and business lines in which the companies produce products, companies and people (CEO, Vice President, Director, Employee, etc.), companies and industries in which the companies participate, companies and topics, people and industries, topics and industries, and other variations. The category analyzer 110 retrieves tagged documents (or data regarding the relevancy of the documents to the various categories) from tagged documents storage 135. In some embodiments, category analyzer 110 sums the total number of documents that are relevant to a first category and a second category (i.e. a particular company and particular business line). When this count exceeds a threshold, the category analyzer 110 associates these two categories with each other. The threshold number may vary based on a number of factors. For example, for a category that is a business line, the particular industry of the business line may play a factor in calculating the threshold. The category analyzer 110 may iterate through all distinct potential other categories for the first category to establish the entire set of relationships for the first category.

In some embodiments, category analyzer 110 of the system 100 may also order the relatedness of the related categories to the first category. Each category associated with the first category may have a different degree of importance to that category. Different algorithms are used by the category analyzers 110 in order to sort the other categories associated with the first category. For instance, some embodiments sort the business lines for a particular company based on the number of documents that relate to each line of business and the particular company. The category analyzer 110 stores the generated relationship data in the category relations storage 140. This category relations data, along with the tagged documents information stored in storage 135, forms the knowledge base of the system 100 in some embodiments.

In order to use the knowledge base to provide the user with the most relevant information for a category on a regular basis, some embodiments of the system 100 apply individual monitors, customized for the user, to the knowledge base to automatically retrieve requested information. Some embodiments of the system 100 also apply these monitors during the document retrieval and classification operations described above in order to instantly detect and present any new information to the user that has recently been identified from external sources (e.g., the Internet, etc.). The monitor generator 115 creates these monitors using the category relations data 140 and the tagged documents storage 135 and stores the monitors in the monitor settings storage 145. In some embodiments, each monitor includes a set of parameters used to precisely define and focus the type of information that the user would likely consider as relevant. The parameters are customized for each monitor in part based on the user's objective for the monitor and the categories the user is interested in monitoring.

In some embodiments, the parameters that define a monitor include a set of categories to monitor for relevant documents, a set of filters to narrow a set of relevant documents, and a set of delivery information. A user specifies their particular areas of interest by selecting a set of categories to include in the monitor, some initially input by the user and some recommended by the system 100. The categories used in the monitor may include various different types of categories, including a set of particular companies, topics, industries, and people that a user is interested in monitoring. The user can include any variety of categories from each category type. For example, a user may elect to monitor a list of companies, a particular industry, and several people or the user may elect to monitor a single company, several industries, several topics and zero people.

Each monitor applies a variety of different filters to help further define and focus the types of information that would likely be relevant to the user. The filters may distinguish between information or documents based on several characteristics, including the source of the information, the type of information and content, or the particular geographical region that the information is related to. When a monitor specifies that a particular filter is turned on, the system does not deliver to the user documents that are excluded by the filter.

Each monitor also includes a set of delivery parameters gathered from the user that detail the manner in which any information retrieved by the system will be provided to the user. The monitor delivery parameters include the frequency with which to deliver any new information detected to the user, the format of these notifications, and other variables regarding how the system should provide the retrieved information to the user.

The monitor generator 115 of the system 100 creates a monitor with customized parameters based on the user parameters 160 by using the information in the tagged documents storage 170 and the category relations data 140. The monitor generator 115 of the system 100 includes a category generator 120 and a filter generator 125, with each used to customize certain aspects of a monitor. Based on received user input contained in the user parameters 160, the category generator 120 recommends additional categories to the user for inclusion in a list of categories for monitoring. The user parameters 160 include user-specified information regarding the user's objective for a monitor and various user-provided keywords and/or categories to monitor. Some embodiments infer the user's objective in part based on various profile information for the user (e.g., job title, company, industry, etc.). In some embodiments, the user may select an objective from a list of several pre-defined objectives included in the system 100. For instance, these objectives might include a portfolio or stock related analysis (e.g., for a financial advisor), a customer-related analysis (e.g., for a marketing or sales person), or a competitor-related analysis (e.g., for a corporate manager). The user may also have the option to create and define a new objective.

Using this information, the category generator analyzes the knowledge base, including the category relations data 140 and the tagged documents storage 135, to ascertain other categories that may be relevant to the user based on the user's objective and the user specified keywords and categories. The other categories may include a set of companies, topics, industries, business lines, and people, among other things, that would be relevant to the user based on the user's objective and areas of interest.

The category generator 120 executes various category analysis algorithms to analyze the category relations data 140 and the tagged documents storage 135, in order to identify the other categories to recommend. For example, if the user specifies a particular company for the monitor, the category generator may recommend, using relationship data stored in the category relations data 140, a set of the top competitors of that company. Some embodiments may present this list of competitors in a sorted order based on the importance of the competitive relationships between the companies. In some embodiments, the category generator 120 may recommend the particular competitors not only by analyzing competitor relations data already stored in the category relations data storage 140, but also by analyzing new information from external sources (e.g., new documents from the World Wide Web, external databases, etc.) to discover new relationships not yet defined in the category relations data 140. The user may then elect to include or exclude these recommended categories from a finalized set of categories to be included in the user's monitor.

The filter generator 125 further defines and focuses the information delivered to a user by a monitor by selecting an optimal set of filters for the monitor. The selected set of filters helps the monitor define with greater precision the types of information that are most likely relevant to a user's objective and interests. The filter generator 125 uses the set of user parameters 160 and the selected categories (from the category generator 120). The user parameters, as described, includes information regarding the user's objective for the monitor, the list of categories and keywords that the user wishes to monitor, and information regarding certain filtering aspects of the monitor.

Using this information, the filter generator 125 analyzes the current database of tagged documents to determine an optimal set of filters to include that best achieves the user's goals for the monitor. In some embodiments, the filter generator applies a set of filter rules to determine the optimal set of filters for the user. The filter rules take into account the user's objective for the monitor, and various other factors in order to determine the optimal set of filters. In some embodiments, the filter generator 125 recommends the optimal pre-selected set of filters to the user whereby the user may accept the proposed set of filters or make additional modifications to the filters.

In some embodiments, the filter generator 125 determines the optimal set of filters by executing simulations in order to predict the quality and quantity of information that would be retrieved for a given set of filters. Based on the quantity and quality of the set of information retrieved for a particular simulation of a set of filters, the filter generator 125 either expands or restricts the set of filters in each subsequent simulation until the returned set of information produces an optimal set of documents.

For any given category, the amount of information available will vary based on numerous factors. For example, for a well known publicly traded company, the tagged documents storage 135 will contain a substantial amount of information that may allow for filtering along numerous restriction parameters with the system 100 still retrieving a sufficient number of documents for a user. The company will likely have an abundance of available information on the Internet, including press releases, investment analyst reports, publicly available financial documents, news articles, and numerous other categories of information. The filter generator 125, in this situation, may apply a restrictive set of filters aimed specifically at a particular aspect of the company that still return an adequate collection of documents to a user. In contrast, a new, startup corporation will likely have only a minimal amount of publicly available information and thus the filter generator 125 will apply a less restrictive set of filters, if any, for this type of company in order for the monitor to return all available information to the user.

The monitor generator 115 stores a monitor data structure in the monitor settings data storage 145. The data stored in the data structure includes the finalized set of categories and filters as well as the delivery parameters received as part of the user parameters 160. As described above, in some embodiments, the system 100 applies each monitor stored in the monitor settings storage 145 to the knowledge base, including the category relations data storage 140 and the tagged documents data storage 135, on a recurring basis.

In some embodiments, the user parameters 160 specify the manner in which the system 100 provides to a user the information gathered and stored in the documents to user data storage 165 for a particular monitor. The delivery preferences stored in the monitor settings may include the frequency of notifications to send the user, the medium through which these notifications will be sent (i.e., e-mail, website log-in, rss feed, etc.), and the format for the notifications/reports. Some embodiments provide a report with references and links to documents mentioned in the reports. Some embodiments provide the actual documents retrieved by the system 100 and stored in the documents to user storage 165 to the user.

The notification module 130 provides the information to the user based on these delivery preferences stored in the monitor settings. In some embodiments, the system 100 applies each monitor during the ongoing document retrieval and classification operations and returns any newly tagged documents being stored in the tagged documents storage 135 that are relevant to a particular monitor. In some embodiments, the system 100 applies each monitor on a continuous basis in order to regularly detect new information being gathered by the system 100. In some embodiments, the system 100 may apply each monitor to the knowledge base and the document retrieval and classification operations on a recurring basis (e.g., hourly, daily, weekly, etc.).

While the process primarily described herein is an interactive process in which the user provides information, receives suggestions, and either validates or modifies these suggestions, some embodiments of the system 100 use an entirely automated process to generate a monitor for a user. The automated process automatically determines the set of categories, the optimal set of filters and the delivery parameters using only a user's profile information with zero, or a minimum amount, of information received from the user and/or controlled by the user (e.g., an objective, an initial category/or set of categories, and delivery preferences). Some embodiments generate a monitor for a user while using an automated process to determine certain aspects of the monitor (e.g., the selection of filters) but also allowing the user to control other aspects of the monitor (e.g., the selection of categories based on system-provided recommendations). Some embodiments give a user greater control over the individual monitor parameters and allow a user the ability to modify and/or specify the particular categories, relationship requirements between the categories (e.g., looking for documents that satisfy a set of criteria such as being relevant to multiple categories), the individual filters, and delivery parameters they wish to include in their monitor.

Several more detailed embodiments are described in the sections below. Section I discusses category analysis and building the relationship data for the knowledge base and Section II discusses monitor generation. Section III describes the monitor generation process and user interface through a stage by stage illustrations of the graphical user interface displayed. Section IV discusses document analysis, classification and tagging based on the category models. Finally, Section V describes a computing device which implements some embodiments of the invention.

I. Building Relationship Data

In order to further develop the knowledge base of the system, some embodiments generate various types of relationships between various categories and store these in the knowledge base of the system. Some relationships are manually defined by a user, or a system administrator, while others are defined through an automated process. The automated relationships are primarily detected by analyzing the classified documents in some embodiments. This classification, as mentioned above, classifies each document retrieved as either relevant or not relevant to many different categories stored by the system. Section IV below describes in detail one particular process for performing such document classification.

Together, this collection of relationship information stored in the knowledge base helps provide a real-time, dynamically changing portrait of the business and competitive marketplace for a given category. The system may use this relationship information for a variety of different purposes. For example, during the monitor generation operations, the system uses the relationship information to suggest additional categories to a user to include in a monitor. In addition, during the document detection and retrieval operations for a given monitor, the system uses the relationship information in some embodiments to help detect information that may be relevant to a particular category included in a monitor.

Different types of relationships can be created between different types of categories. Some examples of the different types of relationships between categories include relationships between companies and other companies (competitor, subsidiary, parent, partnership, etc.), companies and business lines, companies and people (CEO, Vice President, Director, Employee, etc.), companies and industries, companies and topics, people and industries, topics and industries, and other variations. The process of creating relationships between categories may vary based on both the type of relationship and the type of category being related.

For each type of relationship, the system uses a variety of algorithms designed to detect that particular type of relationship. Some relationships may be defined between two categories by analyzing the documents that have been classified as relevant to both categories. This process is described in detail below in subsection "A. Associating Categories with Other Categories." Some more specialized types of relationships may use a different algorithm that is more appropriate for the particular situation and context. Subsection "B. Competitor Analysis" below describes one such specialized algorithm that detects and defines competitor relationships between various companies. This process analyzes companies and business line data to identify business lines co-occurring between two companies, the importance of the business lines to the companies, the number of documents related to both the companies and the business lines, etc., to determine whether two companies are competitors. Methods for creating these types of relationships of some embodiments are described in detail in the U.S. patent application Ser. No. 12/831,237, filed Jul. 6, 2010 entitled "Business Lines", which is incorporated herein by reference (hereinafter "the '237 application").

A. Associating Categories with Other Categories

Figure 2:
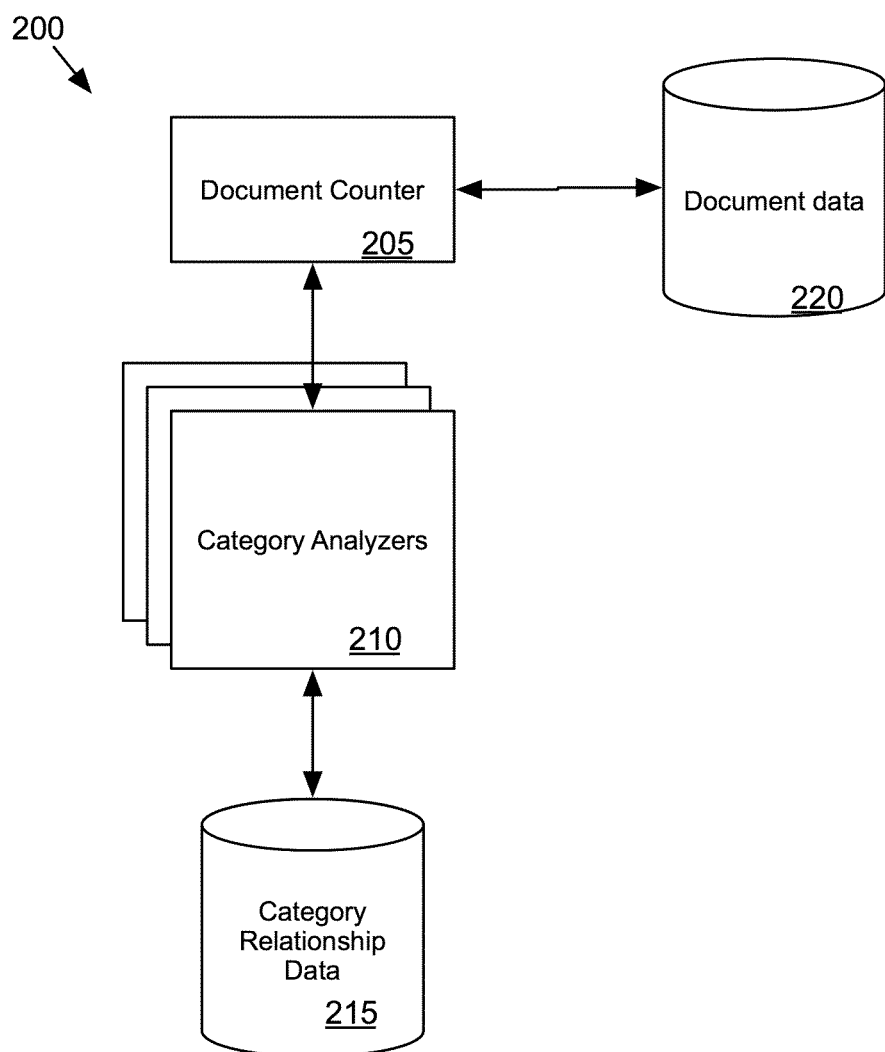
FIG. 2 conceptually illustrates the software architecture of a system of some embodiments for building relationships between categories.

As mentioned, some embodiments associate categories with other categories by defining different types of relationships between various categories (e.g., competitors of a company, business lines of a company, etc.), which are then stored in the knowledge base of the system. In some embodiments, the system continuously revisits and updates these relationships (e.g., by examining the relevancy of new documents to the different categories). The system uses the information in the knowledge base to recommend additional categories to a user to include in the user's monitor. FIG. 2 conceptually illustrates the software architecture of a portion of a system 200 of some embodiments for building relationships between categories. The system 200 includes a document counter 205, a set of category analyzers 210, a category relationship data storage 215 and a document data storage 220.

The system 200 of some embodiments includes several different category analyzers 210, with each analyzer used to specify a particular type of relationship between particular types of categories. Category analyzers may specify a variety of associations (e.g., relationships between two companies, relationships between a company and its business lines, relationships between companies, people, topics, and industries, relationships between an industry and a company, relationships between a parent company, and its subsidiary companies, etc.). This list is a sample of the various different category associations that may be defined by different category analyzers in some embodiments in order to create the relationship data for the knowledge base of the system.

For each particular type of relationship defined by the analyzer, the system applies a different algorithm to detect and define the particular relationship. In some embodiments, the document counter 205 sums the total number of documents that are relevant to both a first category and a second category. The document counter 205 receives a first category, then identifies all of the documents related to the first category that are also related to a second category.

The category analyzers 210 of some embodiments use this information to determine whether the second category is related to the first category. In some cases, the category analyzers 210 for different relationships include thresholds for determining whether the second category relates to the first category. When the sum of co-related documents exceeds a threshold, the category analyzer 210 defines a relationship between the first category and the second category and stores this relationship information in the category relations data 215. The threshold number may vary based on a number of factors, such as the nature of the relationship, the type of categories being related, or the nature of the industry. The system 200 may iterate through all distinct potential category/category combinations to identify the entire set of relationships for the stored data in the system.

Once the category analyzer 210 establishes a relationship for a given set of categories, it stores the relationship in the category relations data 215. Together with the document data 220, this category relations data forms a portion of the knowledge base of the system used to generate monitors.

Some embodiments also allow an administrator to manually define relationships between various categories by entering the relationship information into the knowledge base of the system. Some embodiments define relationships between certain categories using standardized industry classifications. For example, some embodiments may classify a company into one or more segments, sectors, and industries. These segments, sectors, and industries may be derived from a particular financial industry classification (e.g., that used by a particular stock exchange or financial services provider). In some embodiments, segments (e.g., "Technology") include one or more sectors (e.g., "Telecommunications" and "Computer Hardware"), which in turn include one or more industries (e.g., "Personal Computers" and "Data Storage Devices"). Each company may be classified into one or more grouping at each level. In addition, other such groupings may be used (e.g., the Industry, Supersector, Sector, Subsector grouping used by Dow Jones).

In some embodiments, the system may collect this standardized information from various external databases and use this information to create various relationships between the company and an industry to store in the knowledge base (e.g., by using information related to a particular ticker symbol for the company). In some embodiments, the system will further augment or supplement these standardized industry relationships with certain secondary industry relationships for the company and other industries that are defined using various automated algorithms and based on information collected from the incoming documents.

Figure 3:
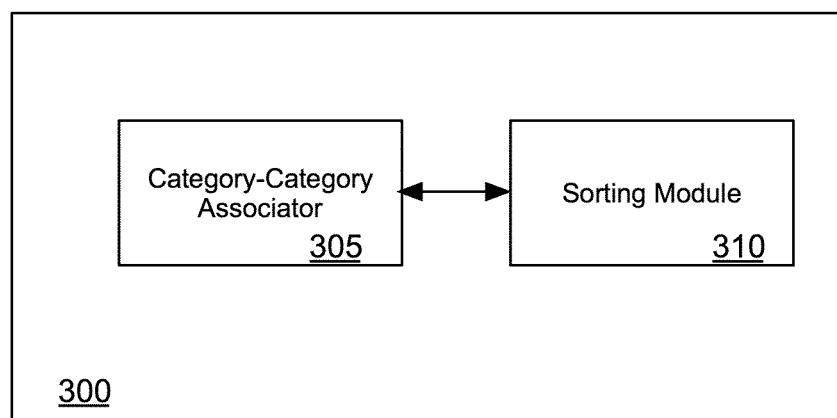
FIG. 3 conceptually illustrates the software architecture of a system of some embodiments for generating a sorted order for a set of relationships between two categories.

In some embodiments, the system may calculate various weights and scores that may be used to order the relationships of a particular type for a category. FIG. 3 conceptually illustrates a category analyzer 300 of some embodiments for generating a sorted order for a set of relationships between one category and several other categories (e.g., a generic example of one of the category analyzers 210). The category analyzer 300 includes a category-category associator 305 and a sorting module 310.

In some embodiments, the category-category associator 305 determines whether a first category of a first type is related to a second category of a second type. In some embodiments, the associator 305 sends a category-category pairing to a document counter, which returns the number of co-relevant documents. The category-category associator 305 then determines whether the number of documents is above a particular threshold for the categories. In some embodiments, the associator 305 stores a list of categories of the particular type that it is testing for relationships (e.g., a list of business lines) and the different thresholds of co-tagged documents for each of the categories. In other embodiments, this information is stored in a model for the category (e.g., a model for the business lines). In yet other embodiments, the threshold does not vary between the different categories within the particular category type, and only a single threshold is stored. When the number of co-tagged documents for a pairing is above the threshold, the category-category associator 305 stores this association in the category relations data (e.g., storage 215).

Each relationship may have a numerical weight (e.g., from 0-100, or least to most related) that indicates the strength of the relationships between the categories being related. The sorting module 310 may use different algorithms to calculate weights for each relationship, which may then be used to sort or rank the relationships. The particular weighting algorithm used will vary based on the type of relationship being examined for a particular category-category association produced by the category-category associator 305. For instance, some embodiments sort the relationships for a particular category based on the number of documents related to each relationship category and the particular category (e.g., each of the business lines for the company). Depending on the particular type of relationship, some embodiments may execute other algorithms to calculate weights and to determine the sorted order.

For example, the sorting module 310 of some embodiments might examine the title and position information of each employee in order to calculate a weighting score for each employee. The score may then be used to produce a hierarchical corporate ranking for the employee within the corporate structure. Some embodiments may calculate the weighting score of the employees based on the number of documents that mention the employees' name, using this as an indication of the employees' influence within the company. For each particular type of relationship, the sorting module 310 applies a particular sorting algorithm based on the particular factors related to the relationship.

Figure 4:
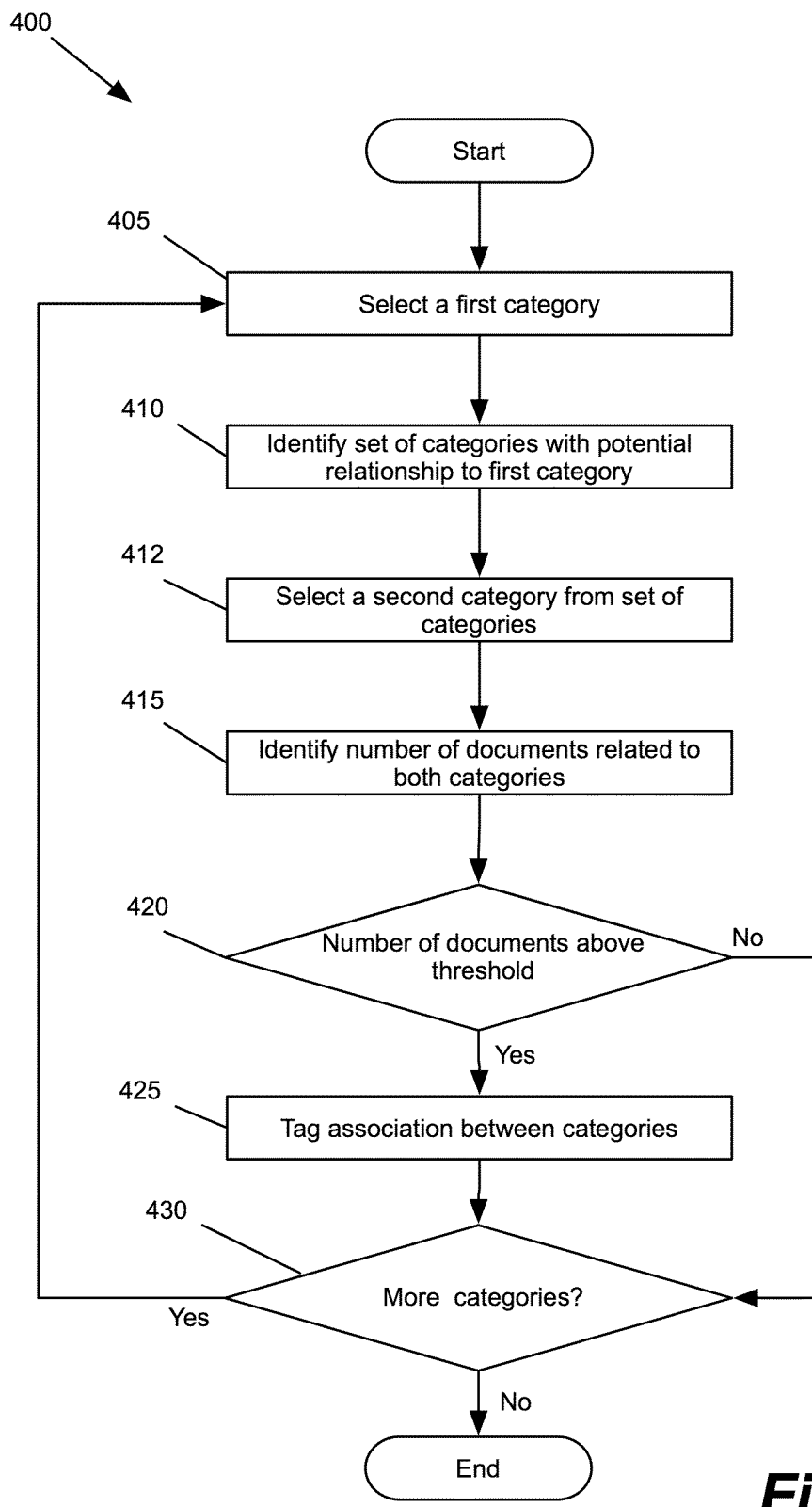
FIG. 4 conceptually illustrates a process for associating one or more categories.

FIG. 4 conceptually illustrates a process 400 for associating one or more categories. In some embodiments, the system 400 performs this process (or a similar process) to analyze, for example, the set of companies to determine their association with the set of business lines. In some embodiments, the system repeats process 400 for each category within a first category type until every category of the first category type is analyzed for a relationship with all categories of a second category type (e.g., analyzing a company for relationship with all different business lines).

In some embodiments, the process 400 relates two or more categories by analyzing documents that were tagged as relevant to both categories (e.g., documents tagged by process 4000, described in detail below in Section IV). The process 400 outputs an identified relationship between two categories when a sufficient number of documents are tagged as relevant to both the categories.

In some embodiments, the process 400 is executed after documents are tagged and stored (e.g., after the system 4400 evaluates a set of documents). In some embodiments, the process 400 is executed as tagged documents are stored while in other embodiments process 400 is run as a batch process at certain time intervals (e.g., executed for each category on a daily, weekly, or monthly basis).

As shown, the process 400 begins by selecting (at 405) a first category from a set of categories (e.g., all categories of a first category type). The order of selection of the categories within the set varies with some embodiments. Some embodiments may select the categories in alphabetical order while others may select them randomly. The category is selected from a data structure, such as a database, a text file or an XML file listing the categories, etc.

The process 400 then identifies (at 410) a set of categories with potential relationships to the selected first category. These might be all categories of a particular second type (e.g., all of the business lines stored by the system, all topics stored by the system, etc.) In some embodiments, when the process has been run previously such that the first category is associated with a group of categories, these categories are not evaluated again for the first category. Other embodiments re-evaluate these categories for the first category to determine whether the relationship should still exist.

The process 400 then selects (at 412) a second category from the set of categories with potential relationships to the selected first category. Next, the process 400 identifies (at 415) the number of documents that are tagged as relevant to both the first category and the second category. In some embodiments this involves querying a document database to identify the number of documents with scores above a certain threshold for both categories (e.g., using document counter 205).

The process 400 determines (at 420) whether the number of documents tagged as relevant to both the first and second categories are above a threshold number. The process 400 of some embodiments imposes a threshold value because if only a single document out of many is relevant to both the first and second categories, it is unlikely that the categories are related. Thus, the process 900 of some embodiments requires that a threshold number of documents be tagged as relevant to both categories before the categories are associated (e.g., related or tagged) with each other.

The threshold number of documents required to relate two categories varies in some embodiments. In some embodiments, the threshold varies based on the specific types of categories being related. For example, for a category related to a particular industry that is more likely to include background noise, a higher threshold is used to reduce false associations. The financial industry is one example of an industry for which a higher threshold might be desirable. For instance, merger and acquisition activity between two tech companies (e.g., Microsoft and Yahoo) could lead to a document being tagged as relevant to one or both of the companies as well as the business line of merger financing. With a lower threshold, one or both of the tech companies involved in the merger could be tagged as operating in the merger financing business, and thus a higher threshold may be used. In addition, some embodiments set higher threshold for particular companies that are expected to be involved in such industries—thus, the system might use a higher threshold to associate a business line with the merchant bank involved in the merger. In some embodiments, when a company is tagged as operating in a financial business line (e.g., merger financing), then its threshold for being tagged with any other business lines is increased. The financial industry is only one example of an industry for which the association threshold could be adjusted; similar adjustments may be made for other industries as well.

In addition, some embodiments base the threshold number of documents on the total number of documents evaluated. Thus, when the document database includes, for example, one million documents, a different threshold of co-tagged documents is required than when the document database includes three thousand documents. Some embodiments use a threshold based on the number of total documents tagged to a category. For instance, a small startup company may have a very small number of documents tagged as relevant to the company. However, if 95% of these documents are also tagged as relevant to a particular category, it is likely that the startup company is related to that category despite the total number of co-relevant documents not being all that high.

Some embodiments evaluate a temporal dimension of the co-tagged documents with respect to the threshold number prior to defining a relationship between categories. For instance, when a large number of documents have been co-tagged to two particular categories for only a limited or short time period (e.g. a few days), it is unlikely that these categories are related on a long-term basis. This situation may occur, for example, if two companies engage in a one-time deal with each other (e.g., a merger or acquisition between two companies), which may produce a large number of co-tagged documents that exceed the threshold number, but only for a particular temporary short time period. These companies would not have a consistent on-going relationship with each other beyond this one-time deal. Thus, the process 400 in some embodiments requires the threshold number of documents that are co-tagged for both categories be documents that are gathered over at least a certain ongoing time period (e.g., weeks, months, etc.) before the categories are associated with each other.

When the number of documents is above the threshold for the categories, process 400 tags (at 425) the first category as related to the second category. In some embodiments, this entails storing a reference to the related category in a data structure for the category (e.g., storing the reference to the second category in a field of a database entry for the first category).

The process 400 then determines (at 430) whether there are any further categories to be evaluated for the currently selected first category. As mentioned above, some embodiments cycle through each category in the set of categories for the selected first category to determine whether to associate the categories with the first category. When more categories remain to be evaluated for the selected first category, the process returns to 410 to select the next category to be evaluated for the first category.

When all categories have been analyzed for the first category, the process 400 proceeds to determine (at 435) whether there are any further categories remaining for which other categories should be evaluated. Some embodiments run through process 400 for each category stored in the system, or each category of the same type as the first category (e.g., each company), which may be thousands of categories. When more categories remain, the process returns to 405 to select the next category. When all categories have been evaluated, the process ends.

Some embodiments may raise a flag if the process does not identify any association for a particular category. In some embodiments, an administrator or editor of the system is then notified to manually identify and enter associations for the category. Some embodiments may re-run the process 400 after a specified period of time once more documents are evaluated for a category with no associated categories. In addition, some embodiments perform process 400 periodically to update the category and its relationships as new documents are obtained and evaluated.

B. Competitor Analysis

Figure 5:
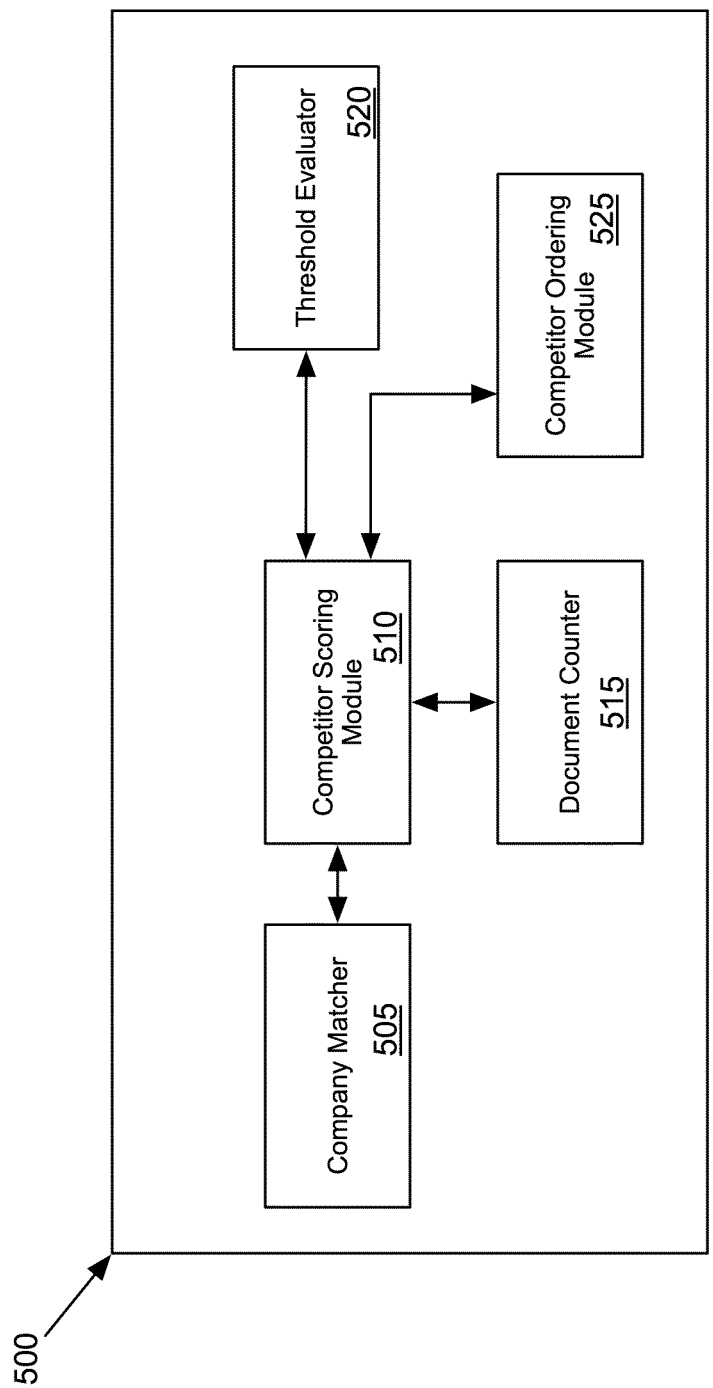
FIG. 5 conceptually illustrates the software architecture of a system that identifies and orders competitors of a set of companies.

As mentioned above, some types of relationships between categories use a different algorithm that is more appropriate for the particular context. These algorithms are more appropriate in detecting the particular type of relationship for the particular types of categories. One example is the process creating competitor relationships between companies. Unlike the category-category associations described above in subsection A, this process is used specifically to detect competitor relationships between a selected company and other companies and thus may not be applicable to the other types of categories, including topics, industries, or people. FIG. 5 conceptually illustrates the software architecture of a competitor analyzer 500 (e.g., one of the category analyzers 210) that identifies and orders competitors of a set of companies. The system 500 includes a company matcher 505, a competitor scoring module 510, a threshold evaluator 520, and a competitor ordering module 525.

The company matcher 505 identifies potential competitors for a selected company. For a selected company, some embodiments identify each other company that shares at least one business line. In some embodiments, the business line data structures store a list of each company operating in the business line. Thus, the company matcher can identify a business line of the selected company from the selected company's data structure, then identify all other companies operating in the identified business line from the data structure for the business line. The company matcher 505 passes a pairing of a first company and a second company (that is a possible competitor of the first company) to the competitor scoring module 510.

The competitor scoring module 510 calculates a competitor score for the second company to ascertain its importance to the first company as a competitor. The competitor score may be determined on a number of factors. Some embodiments identify the number of business lines in which the two companies compete and the relative importance of the business lines to the first company. To determine the relative importance of the business lines, some embodiments use the document counter 515 (which may be the same as document counter 205 of FIG. 2) to determine the number of documents co-tagged with the first company and the business line. Some embodiments also use the document counter 515 to determine the number of documents co-tagged with the two companies, which is another factor used by some embodiments of the competitor scoring module 510 to determine a competitor score.

The threshold evaluator 520 receives a competitor score from the scoring module 510 and determines whether the score is above a threshold for listing the second company as a competitor of the first company. Some embodiments use a constant threshold, while other embodiments vary the threshold based on various factors. For instance, some embodiments require a higher threshold for a company operating in numerous business lines so that only the top competitors will be identified, rather than having hundreds of competitors.

When the competitor scoring module 510 has evaluated all of the possible competitors for the first company (as determined by the company matcher 505), the list of competitors and scores is sent to the competitor ordering module 525. The competitor ordering module 525 orders the competitors and stores the ordered competitor information in the company data (which may be part of the category relations storage 215). In some embodiments, the ordered list of competitors for the first company is stored in the data structure for the first company.

Figure 6:
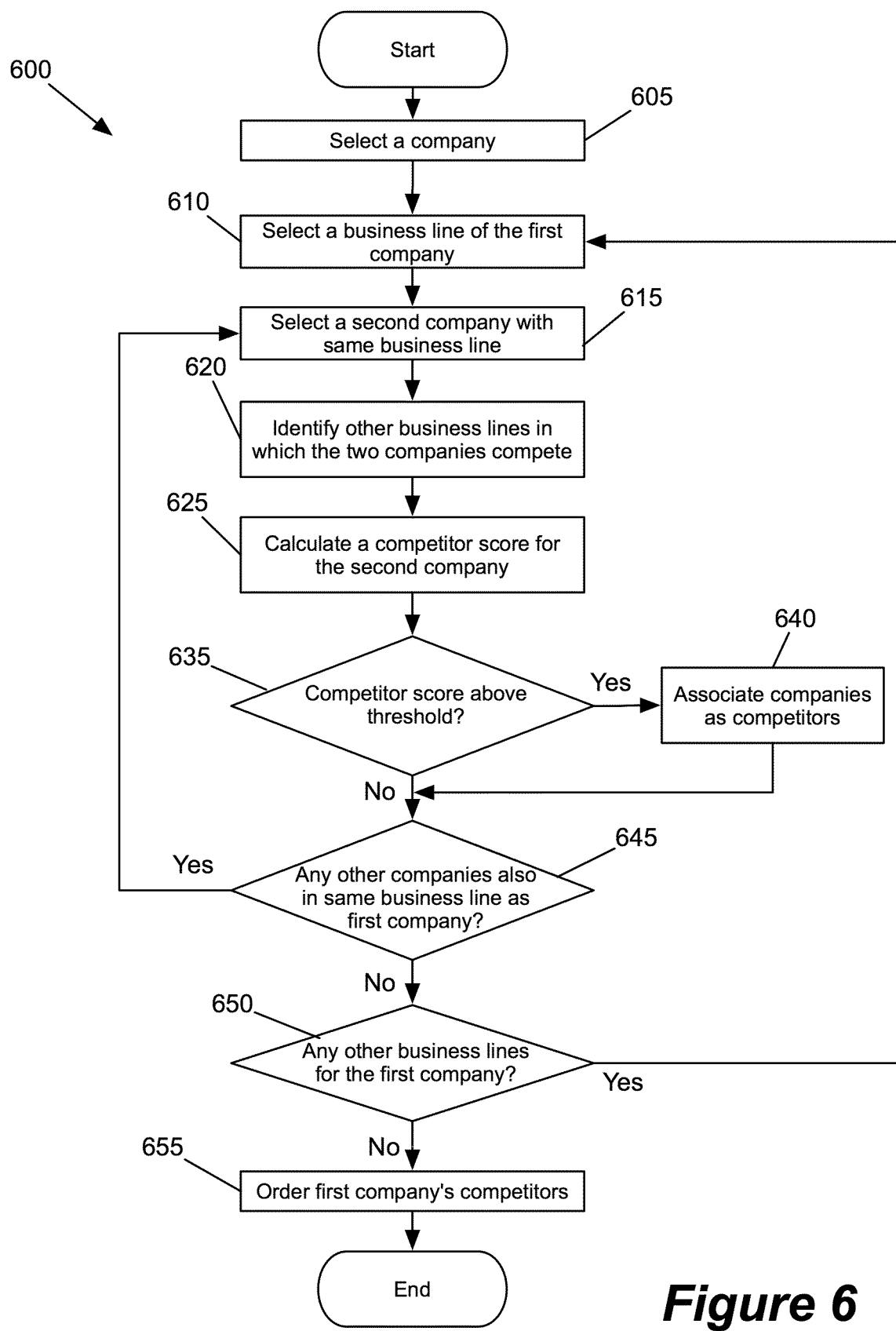
FIG. 6 conceptually illustrates a process of some embodiments for identifying and ordering competitors of a selected company.

FIG. 6 conceptually illustrates a process 600 of some embodiments for identifying and ordering competitors of a selected company. In some embodiments, the competitor analyzer 500 performs process 600. Some embodiments periodically update competitive relationships and therefore periodically run process 600.

As shown, the process 600 begins by selecting (at 605) a company for which competitors will be analyzed. Some embodiments perform process 600 for each company in the system for which at least one business line is identified. The process then selects (at 610) a business line in which the first company operates. Some embodiments use a stored data structure (e.g., a database entry) for the company to identify the company's business lines. When the first company is not associated with any business lines, some embodiments use a process such as process 400 to identify business lines for the company.

The process 600 then identifies (at 615) a second company that also operates in the selected business line. Some embodiments identify the companies which operate in a business line from a data structure for the business line (e.g., a database entry). When there are multiple companies operating in the business line, different embodiments select the companies in different orders (e.g., randomly, alphabetically, etc.). In some embodiments, a module such as the company matcher 505 performs the above operations to identify potential competitors for the first company.

Next, the process identifies (at 620) other business lines in which the two companies compete. Some embodiments compare the business lines stored in the first company's data structure with the business lines stored in the second company's data structure to identify the overlapping business lines.

The process 600 then calculates (at 625) a competitor score for the second company. Different embodiments calculate this score differently. Some embodiments increase the score when the number of business lines in which both companies operate is larger. Some embodiments factor in the relative importance of the business lines to one or both of the companies. For instance, when the second company operates in the most important business line of the first company, this may be more important of a competitor than a different company that operates in the two least important business lines of the company. The number of companies operating in each business line is a factor used by some embodiments. When there are fewer companies in a business line, the few competitors in the business line will often be very important competitors for the first company.

Some embodiments calculate a score for each overlapping business line based on the relative importance of the business line and/or number of companies in the business line, and sum all of the scores for the overlapping business lines to determine a competitor score. In order to identify the relative importance of the business lines, some embodiments access the business line and company data structures. In addition, the document data may need to be accessed in order to identify the relative importance of the business lines if this information is not stored in the company data structure.

The process then determines (at 635) whether the competitor score is above a particular threshold. Some embodiments use a single threshold for all companies determined by an administrator of the system. Other embodiments vary the threshold, for instance to require a higher threshold for a company operating in numerous business lines so that only the top competitors will be identified, rather than having hundreds of competitors. In addition, a company that only operates in one business line may not generate scores as high (depending on how the relative importance of the business line factors in to the score), so some embodiments use a lower threshold when a company has fewer business lines.

When the competition score is above the threshold, the process 600 associates the selected potential competitor as a competitor of the first company. Some embodiments store this information in the data structure for the selected company once the process determines that the competition score is above the threshold. Other embodiments store the association and competition score in temporary storage, such as RAM, until the competitors can be ordered. The competitor association is a one-way relation in some embodiments. That is, company A may be listed as a competitor of company B even if company B is not listed as a competitor of company A. Some embodiments store a two-way relation (e.g., when company A is associated as a competitor of company B, company B is automatically determined as a competitor of company A).

The process then determines (at 645) whether there are any other companies in the currently selected business line of the first company. When the current business line is not the first business line to be evaluated for the first company, some companies that operate in the business line may have already been evaluated for a competitive relationship with the first company on account of competing in a different business line that was already evaluated. Some embodiments keep track of which companies have been evaluated as potential competitors, whether associated with the first company as a competitor or not, and avoid wasting resources by evaluating a potential competitor more than once.

When additional potential competitors remain in the currently selected business line, the process 600 returns to 615 to evaluate another company as a potential competitor. When all companies tagged as operating in the business line have been evaluated, the process determines (at 650) whether the first company operates in any other business lines. When additional business lines remain that could hold potential competitors, the process returns to 610 to select a new business line and evaluate potential competitors in the new business line.

When all business lines (and thus all potential competitors) have been evaluated, the process 600 orders (at 655) the first company's competitors. Some embodiments order the competitors based on the competition scores for those competitors. In addition, some embodiments impose a maximum on the number of competitors (e.g., 100). When more than the maximum number of competitors are above the threshold score, only the top competitors (e.g., top 100) are stored as competitors of the first company after ordering. Other embodiments do not impose any cap on the number of competitors of a company. The order of the competitors is stored in the data structure for the first company, and is used in the later display of information about the first company to users of the system.

After ordering the competitors of the first company, the process 600 ends. Some embodiments perform the process for each company stored in the system, which may be thousands of companies. The process 600 may run periodically in some embodiments to re-order competitive relationships, determine new competitive relationships or remove companies that are no longer competitors.

Figure 7:
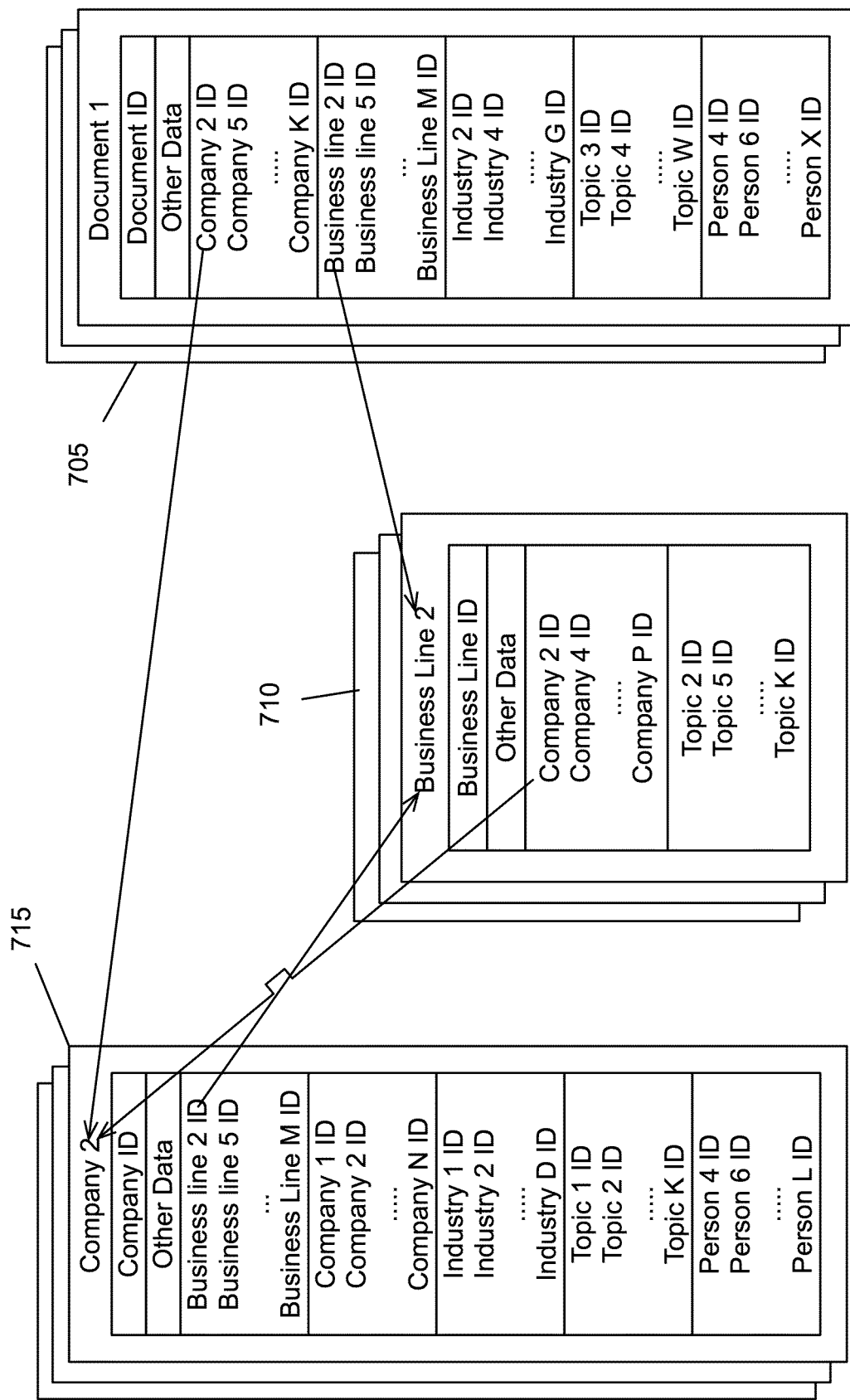
FIG. 7 conceptually illustrates the data structures of some embodiments of business lines, companies, and documents.

The knowledge base of the system stores the various types of relationships that have been gathered by the system using various different data structures. Some embodiments create a data structure for each category and use references (e.g., pointers, links, etc.) to other categories in order to define the relationships between the two categories. FIG. 7 conceptually illustrates the data structures of some embodiments of business lines, companies, and documents. The company data structure 715 and business line data structure 710 are similar to the data structures used for the other category types, including industries and topics, and therefore these category types are not shown in these illustrations. A document data structure 705 includes a document ID and a list of categories (business lines, companies, industries, topics and people) to which the document has been determined relevant. The document data structure 705 also includes other data, such as a link (e.g., URL) at which the document may be found. In some embodiments, the lists of categories, including the list of business lines, companies, topics, industries, and people within the company data structure include references to the data structures for these categories. For example, the reference for Business Line 2 refers to the data structure 710 for Business Line 2 and the reference for Company 2 refers to the data structure 715 for Company 2. These references may also include various weights and scores that indicate the strength of the particular relationship between the categories. In some embodiments, these are one-way references (i.e., the business line data structure 710 does not refer back to the document 705.

The business line data structure 710 includes a business line ID, a name for the business line, other data (e.g., alternative names for the business line, a threshold for associating the business line with a company, etc.), and a list of companies and topics associated with the business line. In some embodiments, this lists of companies and topics include references to the data structures for the companies and topics. For instance, the reference for Company 2 refers to the data structure 715 for Company 2.

The company data structure 715 includes a company ID, other data (e.g., facts of the company, stock information about the company, etc.), and a list of categories related to the company, including the business lines, companies, industries, topics and people in which the company operates, as determined by the category analyzers described above. For instance, the reference to Business line 2 refers to the data structure 710. In some embodiments, these references are stored as pointers to the other data structures. As described above, in some embodiments, this list of categories includes weighted references to the data structures for the categories.

Figure 8:
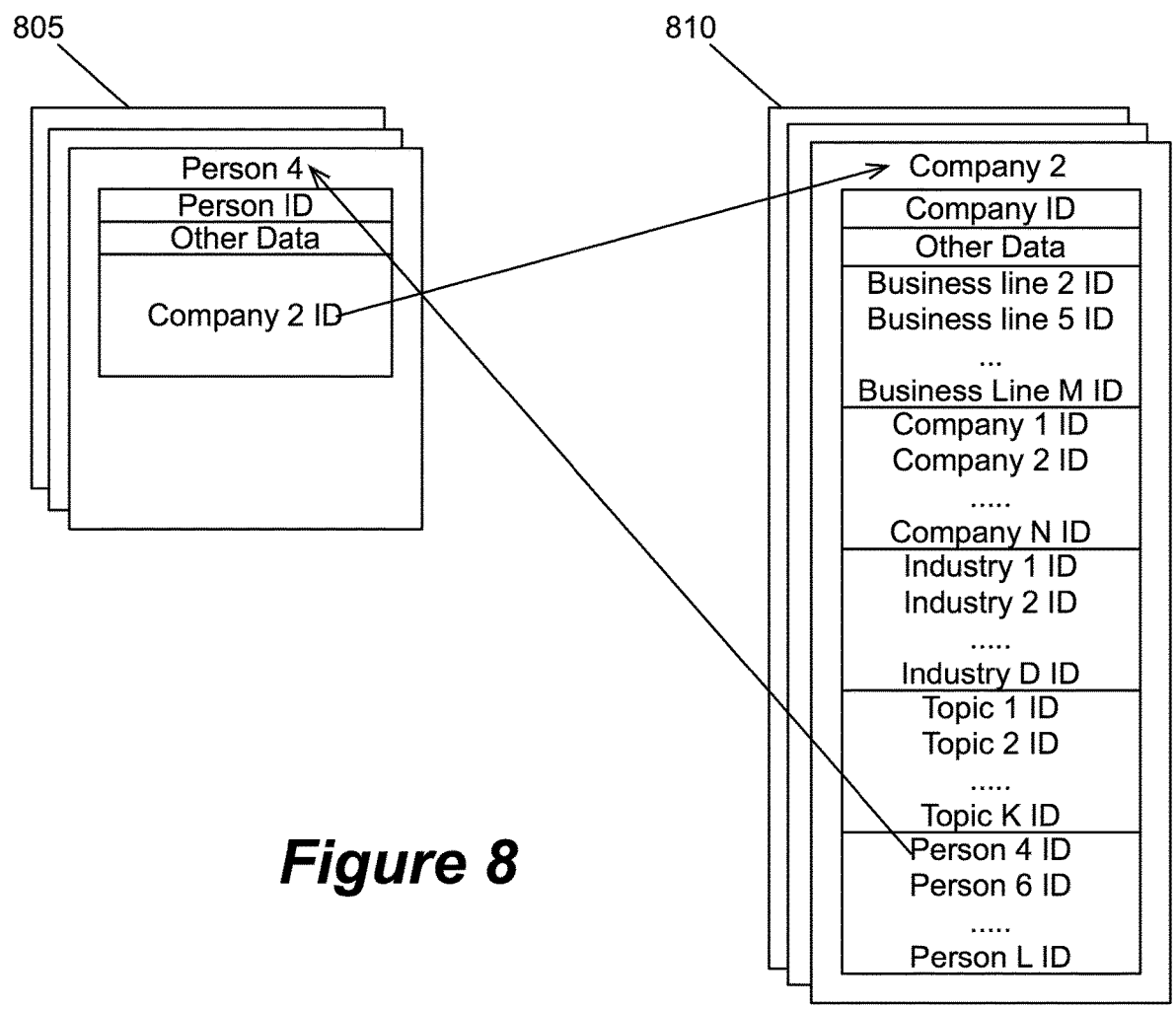
FIG. 8 conceptually illustrates the category data structure of some embodiments for people and companies.

FIG. 8 conceptually illustrates the category data structure of some embodiments for people and companies. These data structures are similar to the data structures described above in FIG. 7. In some embodiments, a person data structure 805 includes a person ID, other data with information such as the position, title, and credentials of the person, and a company ID with a list of the companies to which the person is related.

In some embodiments, the company ID includes weighted references to the data structures for the companies. For example, the reference for Company 2 refers to the data structure 810 for Company 2. Likewise, the company data structure 810 includes a reference for Person 4 that refers to the data structure 805 for Person 4.

Figure 9:
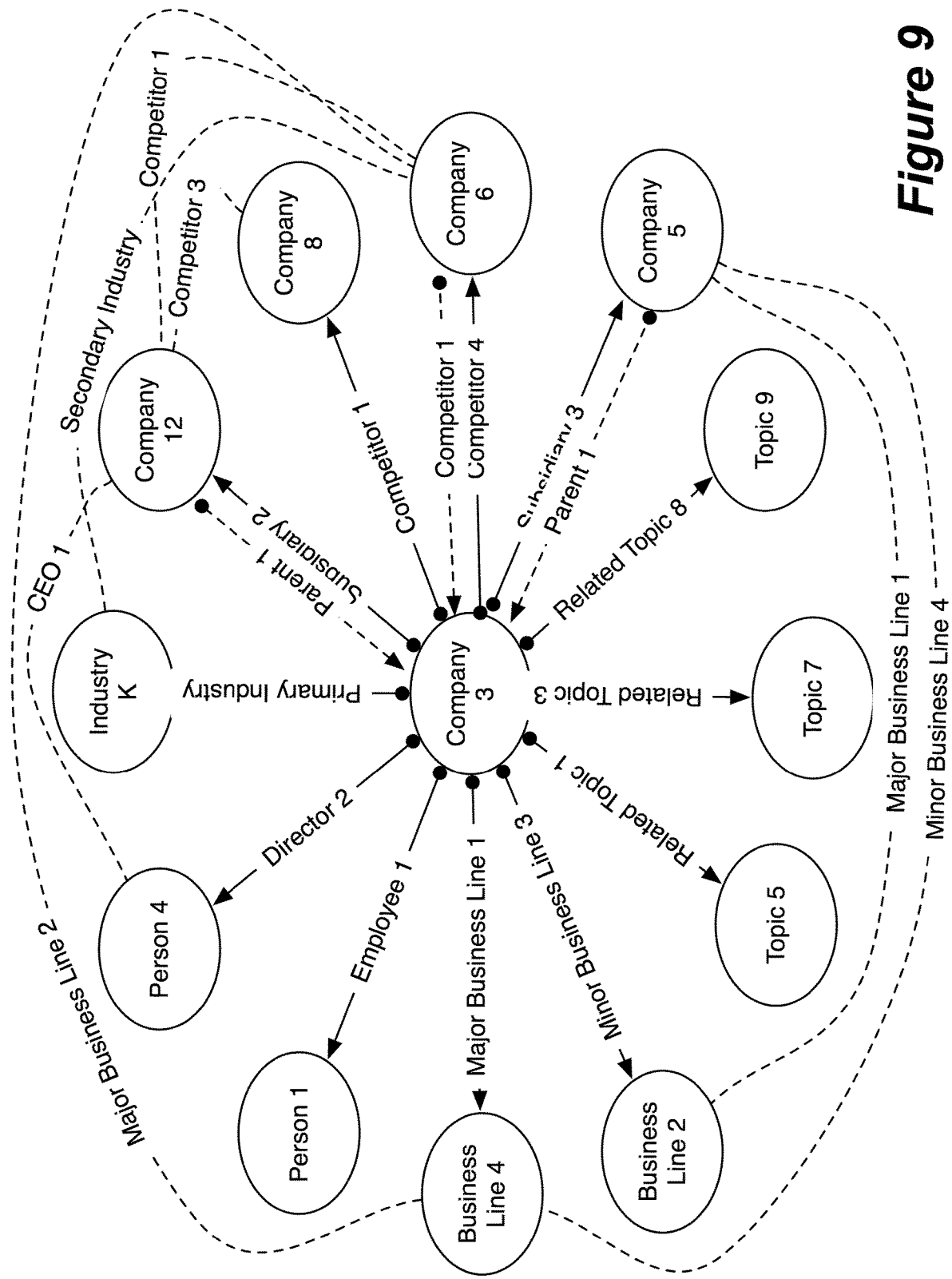
FIG. 9 conceptually illustrates a knowledge base of the system and the variety of different types of relationships that may be defined between various categories.

FIG. 9 conceptually illustrates a portion of a knowledge base and the variety of different types of relationships that may be defined between various categories. This figure provides an alternative illustration of the relationship data structures discussed in FIG. 7-8 and uses a hub, spoke and wheel arrangement to depict the categories and relationships in the knowledge base (sometimes referred to as a business web graph). This figure provides an example of only a few categories and some of the types of relationships that may exist for a particular category. The complexity of the relationships illustrated in this figure increases rapidly as more categories are added and different types of relationships defined and thus a larger more realistic illustration of the knowledge base for a company existing in the real world becomes impractical. Although many of the examples set forth and described below are related to business categories, the knowledge base may be implemented for any variety of subject matters, including topics related to sports, entertainment, education, or any other genre suitable for information management.

FIG. 9 illustrates the different categories as labeled with generic names (e.g., Company 3, Industry K, etc.). One of ordinary skill in the art will recognize that these labels could correspond to particular corporations (e.g., "Boeing Corporation", industries (e.g., "Aerospace"), etc. FIG. 9 illustrates the knowledge base from the perspective of a particular company (Company 3), illustrated at the center (or hub) of the figure and the different relationships between this company and other categories. Each relationship stored for this company is illustrated as an arrow or spoke, originating at the hub and extending to the other categories located at the exterior, or wheel, of the figure. The other categories may include other companies, industries, topics, business lines, and people to which Company 3 is related. Each spoke is labeled with the particular type of relationship between the categories. Some embodiments may also include various numerical values to indicate different relevancy scores, weights, and rankings for the particular relationship for the particular category. The sorted rankings may be derived based on the calculated weights for each relationship. Furthermore, the weights may be used to indicate the degree of relatedness between two categories and may range from, for example, 0 to 100 (with 100 being the most related weighting value).

Company 3 has numerous relationships to other categories. Company 3 is related to a particular industry, and several companies, topics, people, and business lines. For instance, Company 3 operates primarily in Industry K. Company 12 is a subsidiary of Company 3. In some embodiments, the knowledge base also defines a relationship for Company 12 to indicate that Company 3 is the parent company of Company 12, as illustrated by the "Parent 1" arrow from Company 12 to Company 3.

In some embodiments, the system calculates the various numerical weights for each particular relationship within a relationship type to indicate the strength of the particular relationship between the primary category and other categories. For example, Company 3 may have multiple different subsidiaries and some embodiments of the system rank each of the subsidiaries using various ranking methodologies as well as provide a weighting score (e.g., from 0 to 100) to indicate the strength of the particular relationship defined for the categories. Some embodiments may use the weighting scores to provide a sorted rank for each category. The particular weightings may be based on a variety of factors. For example the weightings my be based on a subsidiaries financial impact to a parent company, the strength of an employees relationship with a company, the importance of a particular company to an industry, and other factors. In FIG. 9, Company 12 is labeled as "Subsidiary 2" to illustrate that it is the second ranked subsidiary of Company 3. Likewise, Company 5 is labeled "Subsidiary 3" to indicate that it is the third ranking subsidiary of Company 3.

Company 3 has a competitive relationship with Company 8. Likewise, the label, Competitor 1, between these categories could indicate that Company 8 is also the most important competitor of Company 3. However, there is no returning arrow or spoke originating from Company 8 to Company 3. This situation could exist if Company 8 does not view Company 3 as a competitor. For example, if Company 8 is a large publicly traded aerospace company such as Boeing Corporation and Company 3 is a small, privately held company that does business in the aerospace industry, than a one-way competitive relationship may exist in this type of situation. The privately held company could view Boeing Corporation as major competitor, perhaps their number one competitor, whereas Boeing Corporation may not view, or even know of the existence of the privately held company. Other situations will establish a two-way competitor relationship for each company. For example, Company 3 has a two-way, bi-directional, competitor relationship with Company 6. Furthermore, Company 3 is the number 1 ranked competitor of Company 6 whereas Company 6 is the fourth ranked competitor of Company 3.

Company 3 may also be related to numerous topics. FIG. 9 illustrates that Company 3 is related to Topic 5, Topic 7, and Topic 9. As with the competitor rankings, each topic relationship may also include a sorted order or ranking for Company 3. For example, Topic 5 is labeled as "Related Topic 1" for Company 3. Thus, this topic may be considered to be the most relevant topic for Company 3. Different embodiments may determine these rankings according to different mechanisms. For example, some embodiments may rank each topic for a particular company based on the number of documents that are tagged for each category.

Company 3 may have a number of related business lines in which the company operates. As illustrated, Company 3 operates in a major business line, Business Line 4, and a minor business line, Business Line 2. The spokes between these categories also provide a sorted order or ranking for each business line. As described, these ranking are based on various weights and scores that are calculated based on different mechanisms. Some embodiments may rank each business line for a particular company based on the number of documents that are co-tagged for each particular category.

Lastly, Company 3 may be related to numerous people through a variety of different relationships. For instance, Person 1 is an employee of Company 3 and Person 4 is a director of Company 3. Each relationship between the person and the company may also contain a sorted order or ranking Some embodiments calculate weights and rank each person related to a company using various mechanisms and factors. For example, each person can be sorted based on their hierarchical position or title within the company.

FIG. 9 also illustrates several relationships between categories located on the wheel, which may exist between the various categories in the knowledge base. For instance, Person 4 is the CEO of Company 12. Company 6 is a competitor of Company 12. Company 12 is a competitor of Company 8. Company 5 operates in Business Line 2 and 4. One will recognize that these relationships are in no way exhaustive of the relationships that might exist within the business web graph. In many cases, some of the categories to which Company 3 is related (e.g., Company 5) would be related to additional categories that do not share a relationship with Company 3 at all (e.g., competitors of Company 5 in business lines in which Company 3 does not participate).

Although this figure illustrates Company 3 at the center as the hub company, any of the other categories can be used as the hub category to illustrate their perspective of the knowledge base and the various relationships that may exist between the particular hub category and other categories. FIG. 9 illustrates the knowledge base as a type of business web graph that organizes the competitive landscape that a particular company may operate in and the variety of relationships that a particular category, in this case a company, may have with other companies, industries, topics, business lines, and people. By organizing information in this manner (i.e., with numerous relationships of different types defined between the categories), the system is able to apply various monitors that can quickly detect and retrieve information related to very specific subject matters for a particular category.

II. Monitor Generation

In order to enable a user to receive documents relevant to a particular category or group of categories on a regular basis, some embodiments apply individual monitors that have been customized for the user to the knowledge base to automatically detect and retrieve requested information. In some embodiments, each monitor includes a set of customized parameters used to precisely define and focus the type of information that would most likely be relevant for the user with which the monitor is associated. The parameters are customized for each monitor in part based on the user's objective for the monitor and the set of categories that the user is interested in monitoring.

Figure 10:
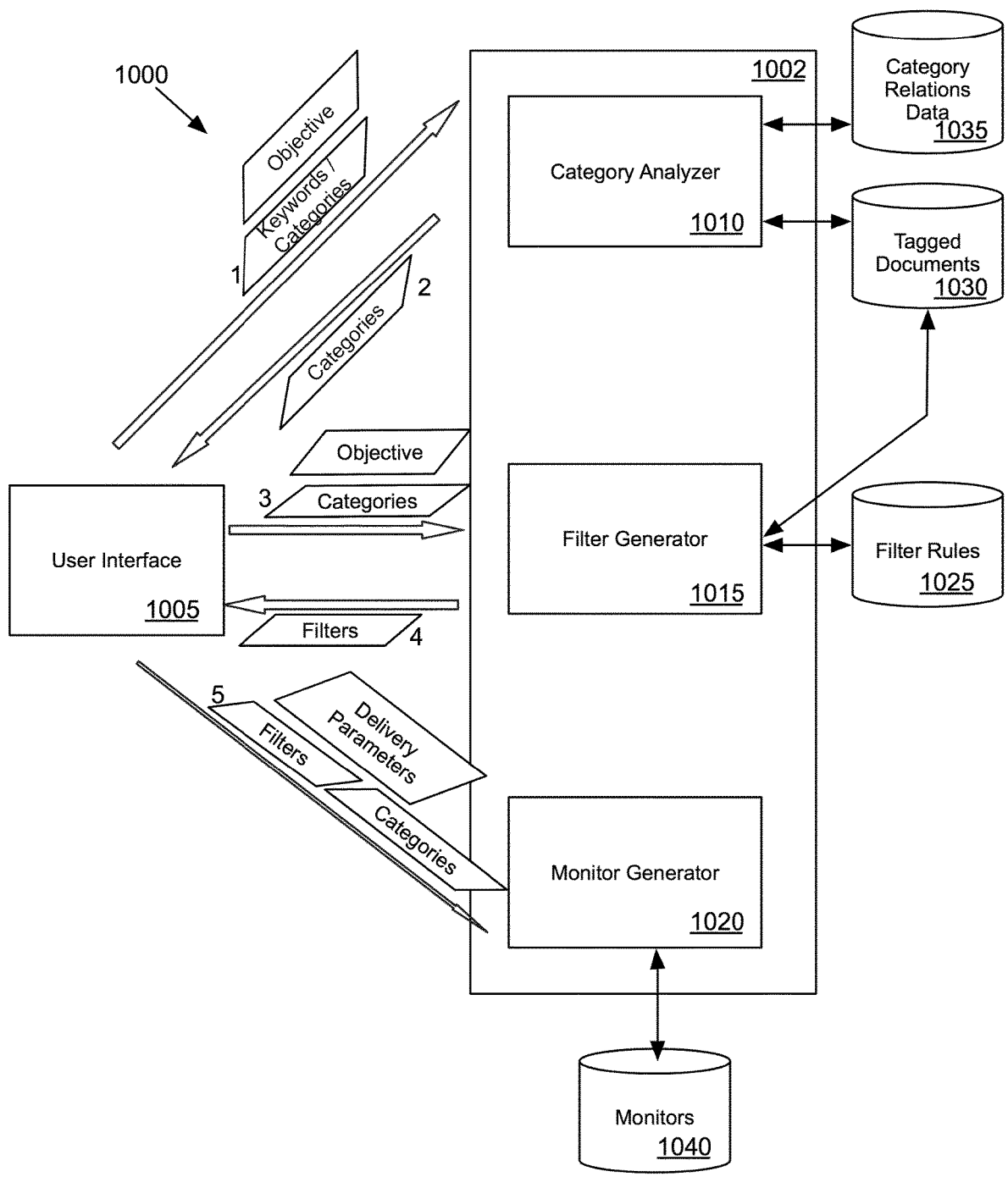
FIG. 10 conceptually illustrates the software architecture of the document monitoring system of some embodiments.

FIG. 10 conceptually illustrates the software architecture of the system 1000 for generating a monitor of some embodiments. The system 1000 customizes each monitor according to the user's objectives and interests in order to detect and retrieve relevant documents from the knowledge base (tagged documents storage 1030 and category relations data 1035) for the user. FIG. 10 illustrates that the system 1000 includes a user interface 1005, and a monitor generation module 1002 that includes a category analyzer 1010, a filter generator 1015 and a monitor generator 1020. The system 1000 also includes a filter rules data storage 1025, a tagged documents data storage 1030, a category relations data storage 1035, and a monitors data storage 1040. The system 1000 illustrated in FIG. 10 may be a part of the overall system 100 described in FIG. 1. Likewise, the monitor generation module 1002 may be the same as the monitor generator 115 illustrated in FIG. 1.

The user interface 1005 provides a mechanism by which a user communicates with the system 1000 in order for the monitor generation module 1002 to gather information for use in defining a monitor for the user. The information gathered through the user interface 1005 includes the user's objective for creating the monitor, the user's areas of interest and set of categories (e.g., companies, topics, industries, people, etc.) that the user would like to monitor, the user's delivery preferences, and certain other information necessary to customize the monitor. Some embodiments generate a graphical user interface (GUI) for collecting and presenting this and other information to a user. The system generates the GUI and transmits the GUI through a network (e.g., the Internet) to the user, who views the GUI through an application (e.g., a web browser) operating on the user's device (e.g., laptop computer, personal desktop computer, smart phone or other handheld device, etc.). The device receives user input through an input device (e.g. a cursor controller, a mouse, a touchpad, a trackpad, or a keyboard, etc.), which the device translates into commands sent through the GUI to the system 1000. The user logs into the system 1000 in some embodiments, and is provided with the ability to search for information on a particular category as well as to generate the monitor.

In some embodiments, the user interface 1005 allows a user to select among several pre-defined objectives. For instance, these objectives might include a portfolio or stock related analysis (e.g., for a financial advisor), a customer-related analysis (e.g., for a marketing or sales person), or a competitor-related analysis (e.g., for a corporate manager). The user interface 1005 also provides the user the option to create and define a new objective. Some embodiments ascertain a user's objective based on information gathered from a user's profile. For example, some embodiments will analyze a user's job title, employer or company name, e-mail address, and other profile information to infer the user's objective for the monitor. For example, a user with a job title of "Financial Analyst", or who is employed by a financial firm (e.g., Goldman Sachs, JP Morgan, etc.), or who has an e-mail address issued from a financial firm (e.g., JohnDoe@GoldmanSachs.com) will likely be interested in a finance related objective. Likewise, a user with a job title of "Sales" or "Marketing" who is also employed by an airline company (e.g., Boeing) will likely be interested in marketing related information specific to the airline industry. Based on each particular objective, the monitor is customized to return only the type of information that would be relevant to a user for the given objective.

For instance, for a portfolio or stock analysis objective, the monitor may be customized to return documents that are important to a user engaged in financial analysis of a portfolio of stocks. For a typical user with this objective, the system 1000 customizes certain parameters of the monitor in order to return documents that would be considered important for financial analysis of companies. The typical types of information relevant for this objective may include company financial statements, investment analyst reports, rating agency reports, SEC filings, and other stock or financial documents. Furthermore, as the stock market and stock prices are quick to incorporate any news and information, a user with this particular objective will likely prefer to be notified the instant any news or important information impacting a company in their portfolio is detected by the system 1000. Thus the monitor delivery parameters may be automatically customized to alert the user the instant the system 1000 detects any new information regarding a company in the user's portfolio. Furthermore, the documents displayed will be ordered based on the types of information that would be most relevant for financial analysis.

Likewise, for a competitor analysis objective, a user will likely be interested in documents that are related to the competitors of a particular company and certain types of information that may have an impact on these companies and the competitive marketplace. For example, a user may be interested in a particular company and its competitors. Therefore, the monitor may be customized to return information and documents related to both the user specified company and its competitors. The monitor may also return documents containing information that may impact the competitive landscape that these companies operate in. This information may include documents containing news coverage about the company and its competitors, press releases, competitors' financial statements, analyst reports and ratings, and various other types of information relevant to or that may impact the company and its competitors.

For a user with a customer analysis objective, the monitor may be customized to return documents that a typical user with this objective would likely consider to be relevant. Documents in this area may include those containing information that can be used by a salesperson to expand a customer or client base, including marketing reports, operating activities, expansion plans, customer reviews, consumer reports, economic indicators, market growth forecasts and any other relevant information used for analyzing potential customers and target accounts. A user may also be interested in the current customers of a company, or the current accounts of a company. Likewise, information regarding a company's current suppliers, vendors, service providers may be highly relevant for a user with this particular objective. The monitor may be customized to detect this type of information from a multitude of sources and for a variety of different information content within each document.

In addition to ascertaining the user's objective for the monitor, the user interface 1005 also ascertains the areas of interest (companies, topics, industries, people, etc.) that a user would like to monitor. A user specifies their particular areas of interest by selecting a set of categories to include in the monitor, some initially input by the user and some recommended by the system 1000. The categories may include any variety of search terms, and may include company names, industry names, topic names, names of people, etc. that a user is interested in monitoring. In some embodiments, the user interface 1005 also suggests certain terms to the user (including suggested categories or search terms), through, for example, an auto-complete search feature, that will assist the user in formulating their search query terms. The auto-complete search feature suggests, as the user enters query terms, both terms containing the entered text as well terms similar to the entered text that may be relevant to the user. The system 1000 suggests the particular query terms using the information stored in the knowledge base (e.g., the category relations data 1035 and tagged documents storage 1030).

The user interface 1005 also receives information from the user regarding the user's delivery preferences for receiving information gathered by their particular monitor. These delivery preferences specify the manner in which the documents are delivered (e.g., via e-mail, login to a website, etc.) how many documents should be delivered, and how these documents should be displayed (e.g., as HTML, PDF, etc.) The user may also specify a particular time schedule (hourly, daily, weekly, etc.) for receiving new documents, including the exact time and frequency to send the reports containing the documents. Some embodiments notify a user the instant any new information is detected and gathered by the system. The user interface 1005 also permits a user to specify various content options for the reports (e.g., concise, detailed, etc.), and the document display order within the reports (e.g., alphabetical, sorted, most recent, etc.). In some embodiments, the document display order will be sorted based on the user's profile information and objective. For example, an engineer working for an aerospace company will likely be interested in research reports, scientific journals, technical documents, etc. Thus, the document display will place these types of documents with the most valuable information at the top of the document list. For a financial analyst working for the same aerospace company, this person will likely be interested in company earnings reports and other analyst reports. For this particular user, the document display order will place these types of documents at the top of the list of documents returned by the monitor. For each particular user profile and objective, the monitor will deliver or display documents according to a particular order and format that is most relevant for the particular user.

In some embodiments, the monitor setup information is received through the user interface in stages. That is, the user interface provides a first set of options to the user, who inputs the requested information. This information is passed to the monitor generation module 1002, which performs a stage of analysis and sends information back to the user interface for display to the user.

After receiving initial information from the user (i.e., the objective and a first set of keywords and/or categories), the user interface 1005 passes this information to the category analyzer 1010 in order for the analyzer to recommended additional categories to the user which may be included in a finalized set of categories for the monitor. The category analyzer 1010 uses the user-specified keywords and categories to analyze the category relations data 1035 and the tagged documents storage 1030. The category relations data 1035 and the tagged documents storage 1030 together provide the knowledge base developed by the system through the operations described in the previous section.

Based on the user's objective and the list of user specified query terms and categories, the category analyzer 1010 recommends other categories that the user may want to monitor for new documents. The category analyzer 1010 performs various processes in different embodiments in order to determine which additional categories are most likely to be relevant to the user. One such set of processes for recommending additional categories is described in detail below with reference to FIGS. 36 and 37.

In some embodiments, the category analyzer 1010 takes into account the user's objective for the monitor and the user-specified query terms. For instance, for a portfolio analysis objective, the category analyzer 1010 only recommends companies, and in some embodiments recommends only companies that closely match the user specified query terms. A user involved in portfolio analysis will typically know exactly which companies are included in their portfolio and likewise will not be interested in viewing information regarding any of the other categories, including people, topics, industries, as well as companies not within their portfolio. Thus, the category analyzer excludes these types of categories from the recommended set of categories when the user specifies a portfolio analysis objective. In some embodiments, therefore, the category analyzer 1010 only recommends companies that fit the search terms. In addition, some embodiments include companies with subsidiary or parent relationships to the companies that fit the query, and/or the top competitors of these companies.

Likewise, the category analyzer 1010 may recommend a different set of categories for a competitor and market influences objective, even with the same category and/or keyword input received through the user interface. For such an objective, the category analyzer of some embodiments recommends additional companies, as well as additional topics, industries, and people that may be relevant to the user. Using the category relations data 1035 and the tagged documents 1030, the category analyzer 1005 returns other categories that have defined relationships with the user specified categories. For example, if the user inputs a particular market topic for monitoring, the category analyzer 1005 may then examine the category relations data 1035 for all the relationships that exist for that particular market topic by accessing the data structure (e.g., database entry, instantiated object, etc.) for the market topic.

The category analyzer 1010 recommends the additional categories identified to the user through the user interface 1005 whereby a user may then elect to include or exclude these from the finalized set of categories to include in the monitor. Some embodiments provide only a subset of all of the related categories stored in a particular category's data structure, (e.g., only the top 30 categories) for each relationship type for a particular category. For example, for a particular market topic, this may include the top 30 companies within the market topic, the top 30 industries effected by the market topic, the top 30 people related to the market topic, or any of the other relationships that may exist for a particular topic.

In the case of a user specified company, for example, the category analyzer 1005 will examine the category relations data 1035 to identify the list of the top 30 competitors of the specified company, the top 30 related topics, the top 30 business lines of the company, the top 30 industries to which the company is related to, etc. The category analyzer 1005 may also provide information regarding any parent companies or subsidiaries of the specified company, any partnerships that the company may partake in, the most important people related to the company, etc. In some embodiments, the category analyzer automatically selects a set of categories for the monitor. In other embodiments, the identified additional categories are displayed to the user as suggestions, with the user also able to select categories (e.g., other competitors, business lines, topics, etc.) or remove the recommended categories from the monitor.

With the set of categories to monitor finalized, the monitor generation system 1000 next defines an optimal set of filters for the monitor. These filters represent explicit inclusions and exclusions of documents from those delivered to a user for the created monitor based on various criteria. The set of filters may include various types of filters (i.e., filters that include or exclude documents according to various criteria), including topic filters that include or exclude documents relating to various specific business issues (e.g., product initiatives, corporate governance, etc.), content type filters that include or exclude documents based on their content type (e.g., SEC filings, blogs, press releases, etc.), region-based filters that include or exclude documents that represent coverage of the selected category in various regions (e.g., states, countries, continents, etc.).

The user interface 1005 passes the information gathered by the system 1000, including the user's objective for creating the monitor and the finalized set of categories to include in the monitor, to the filter generator 1015 in order to generate the optimal set of filters for a user's monitor. The filter generator 1015 applies a set of filter rules 1025 to analyze this information in order to identify an optimal set of filters for the monitor. For each particular user's objective, the filter rules 1025 specify a different collection of filters that together provide the optimal filters for the particular objective.

For example, a user that wants to use the monitor for the purpose of conducting a portfolio analysis will likely prefer certain types of information from certain specific sources. Therefore, the filter generator 1015, using the filter rules 1025, may generate a set of filters that will filter documents based on the user's profile which includes the user's preferences. The filter rules 1025 may specify a set of filters that include certain business topic filters, certain content type filters and certain region based filters. The set of business topic filters may include filters that distinguish documents based on the following topics: issues regarding management and board changes, regulatory issues, litigation matters, M&A activity, market share information, analyst ratings, analyst comments, and certain other business topic filters. In this situation, the system sets these business topic filters to detect and include documents that contain this type of information since a typical user interested in conducting financial analysis of a company is likely to consider these documents as relevant to their analysis. Furthermore, the filters may include, for example, filters that differentiate between different types of documents from different sources that are typically used for conducting financial analysis. For example, these content type filters may be set to include a company's financial statements (e.g., SEC Form 3, 4, 5, 8-K Filings, 10-Q Filings, 10-K Filings, etc.) and other regulatory documents that have been filed with the Securities and Exchange Commission ("SEC") and other credible sources of information (e.g., company web-site, credible analyst web-sites, etc.). The content type filters may exclude other irrelevant sources of information or sources that lack credibility (e.g., blogs, message boards, etc.)

Figure 38:
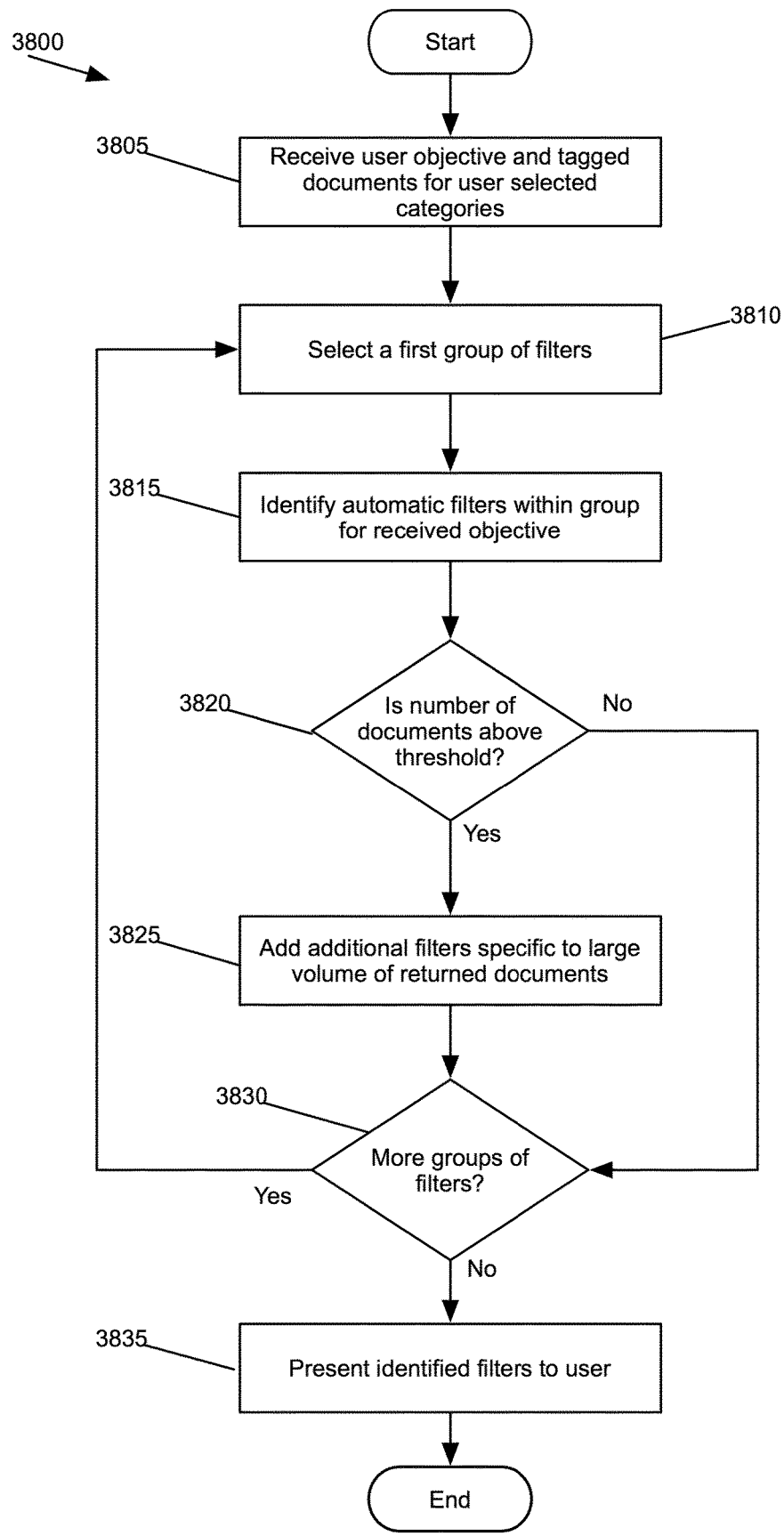
FIG. 38 conceptually illustrates a process of some embodiments for selecting a set of filters to apply to a monitor.

In some embodiments, in order to determine the optimal set of filters to apply for a monitor, the filter generator 1015 may also consider the quantity and quality of documents that would be produced for the user's monitor. The filter generator 1015 analyzes the database of tagged documents 1030 to determine the total collection of documents available for the set of categories in the monitor. Based on the quantity and quality of information available, the filter generator 1015 adjusts the selected set of filters until the system 1000 is able to produce an optimal number of documents that are the most relevant for the monitor. The filter generator 1015 executes numerous simulations to forecast the number of tagged documents that would be retrieved from the tagged documents storage 1030 by the system 1000 for a given set of filters. Based on the quantity and quality of tagged documents 1030 being filtered in each simulation, the filter generator 1015 may either expand or restrict the set of filters until the application of a given set of filters is able to produce an optimal quantity of documents that includes only the most valuable information. For example, if after a particular simulation that applies a particular set of filters, the system 1000 produces a large volume of documents for the monitor that have a certain degree of relevance, the filter generator 1015 may then adjust the set of filters in a subsequent simulation to add additional filters to help reduce the number of documents to only those documents that are most relevant or have the highest relevance score for the particular monitor. The filter generator 1015 applies the filter rules to determine which additional filters to apply or exclude for each subsequent simulation. FIG. 38, described below, provides a more detailed analysis of the filter generation process of some embodiments.

The filter generator 1015 passes the optimal set of filters to the user interface 1005 in order to present the filters to the user. The user may elect to further modify this set of filters. In some embodiments, the filter generator 1015 automatically selects a set of filters for the monitor without receiving any user modifications to the set of filters. In other embodiments, the optimal set of filters are displayed to the user as suggestions, with the user also able to select additional filters (e.g., additional business topics, source types, and regions filters, etc.) or remove certain suggested filters from the monitor.

After finalizing the optimal set of filters, the user interface 1005 passes the gathered information to the monitor generator 1020 in order to generate the user specified monitor. To generate each monitor, the monitor generator 1020 analyzes various sources of information, including information gathered from the user interface 1005 and information derived from a user's profile. In some embodiments, the monitor generator 1040 automatically selects certain delivery parameters based on an analysis of a user's profile and behavioral patterns. For instance, for a user that primarily access information through an application or web-site login into the system, the monitor generator 1040 may not select e-mail as a delivery mechanism. For a user that does not log into the system, but primarily views information through an e-mail application (e.g., Microsoft Outlook, Gmail, Yahoo Mail, etc.) running on a portable device (e.g., smartphone, tablet, etc.), the monitor generator 1020 may automatically select e-mail as a delivery mechanism by which to send reports from the monitor.

Furthermore, the monitor generator 1040 may continuously analyze a user's behavioral activities to recommend new delivery options that best match the user's activities. Using this information, the monitor generator 1020 sets the various parameters of the monitor data structure and stores each monitor in the monitors data storage 1040.

In some embodiments, the user may at any time modify their particular monitor (or monitors) through the user interface 1005 which retrieves the monitor from the monitor data storage 1040 and applies the modifications to the monitor's settings and parameters. For example, the user may modify their monitor to add or delete categories, adjust the set of filters, rename or reorder the monitor, or change the delivery settings. The system may then begin applying the monitors on a regular basis (as specified by the delivery parameters), or as the documents are retrieved and classified (if specified), or whenever a user requests updated results (e.g., through the user interface 1005).

The operation of the monitor generation system 1000 will now be described. The user interface 1005 receives information from a user regarding the user's objective for creating the monitor. The objective may be selected from a list of pre-defined objectives, such as portfolio analysis, competitor analysis, or customer analysis or can be a customized objective. The user interface 1005 also receives information from the user regarding the categories that the user would like to monitor. The user enters various query terms, including keywords and categories, into the user interface 1005 for the system 1000 to analyze. The system 1000 analyzes the query terms for other related categories, which will vary based on the particular objective. For example, for a competitor analysis type of objective, the user may monitor categories relating to companies, topics, industries and people, and thus the system 1000 analyzes the query terms for all other related categories within these category types. For a portfolio analysis type of objective, the user will typically monitor only individual companies and thus the system 1000 only recommends other companies for this particular objective.

The user interface 1005 next communicates this information to the category analyzer 1010. The category analyzer 1010 receives the user objective and a list keywords and categories. The category analyzer 1010 analyzes this information along with the category relations data it retrieves from the category relations database 1035. The category analyzer 1010 recommends additional categories, which can include additional companies, topics, industries or people that the user may also be interested in monitoring. In some embodiments, the category analyzer 1010 automatically pre-selects for the user certain very likely categories that are most likely relevant for the user, but the user has the option to de-select these recommended categories. The category analyzer 1010 returns a recommended list of categories, including the pre-selected categories, to the user interface 1005 to be presented to the user. The user has the option to select additional categories to be included in the monitor and/or de-select certain recommended categories to be excluded from the monitor.

The user interface 1005 next communicates the updated category information to the filter generator 1015. The filter generator 1015 receives the complete list of categories and the user's objective from the user interface 1005. The filter generator 1015 analyzes the list of categories and the particular objective using the filter rules 1025. The filter generator 1015 also analyzes the current database of tagged documents 1030 to determine an optimal set of filters to apply to produce an optimal quantity of documents for the monitor. The filter generator 1015 returns the set of recommended filters to the user interface 1005. In some embodiments, the user can then modify the recommended set of filters to apply additional filters or remove certain pre-selected filters. Once the user has completed their modifications to the filters, the user interface 1005 sends the finalized set of filters, along with the final list of categories to the monitor generator 1020. The user interface 1005 also receives certain delivery parameters to be applied to the monitor from the user. The delivery parameters may include the frequency of notifications to send the user, the medium through which these notifications will be sent (i.e., e-mail, website log-in, rss feed, etc.).

The monitor generator 1020 receives the finalized list of categories, list of filters and user's delivery parameters from the user interface 1005. The monitor generator 1020 uses this information to set the various parameters in the monitor data structure to correspond to these received values. The monitor generator 1020 stores the user's customized monitor in a monitors data storage 1040. Each monitor in the monitors data storage 1040 may then be used by the system to return relevant documents that are detected during the various system operations, including the ongoing document retrieval and classification operations.

Figure 11:
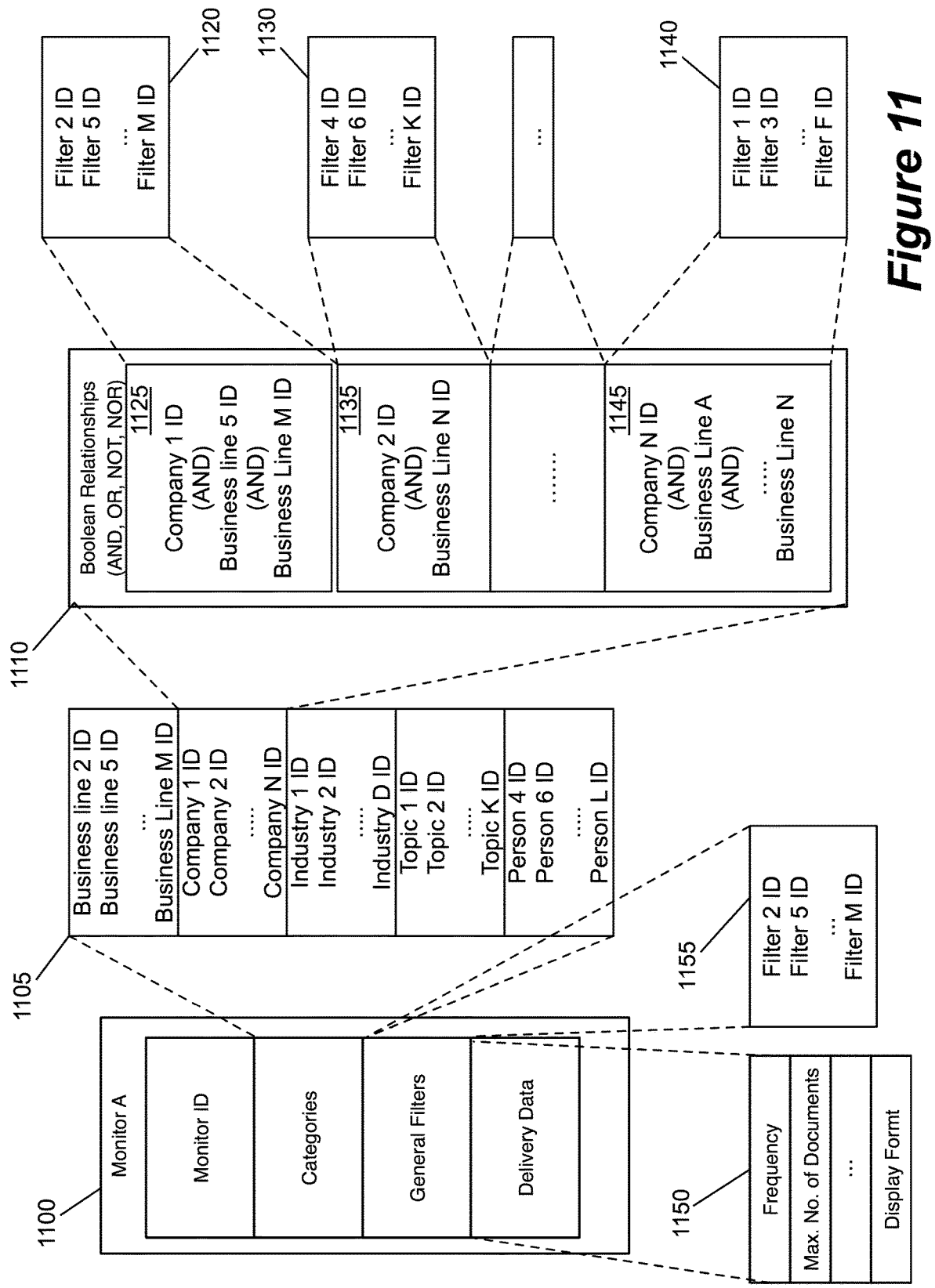
FIG. 11 conceptually illustrates a monitor data structure of some embodiments.

FIG. 11 illustrates a monitor data structure 1100 of some embodiments. The system uses the monitor data structure 1100 in order to identify documents that are related to the monitor. The monitor data structure 1100 includes a unique Monitor ID, a categories data structure 1105 of set of categories to be monitored, filters data structures 1155, 1120, 1130 and 1140, and the document delivery parameters data structure 1150 specifying the user's delivery preferences.

The categories data structure 1105 includes a list of categories to include in the monitor. The categories include a list of all of the business lines (Business Lines 2-M), companies (Companies 1-N), industries (Industries 1-D), topics (Topics 1-K) and people (Person 4-L) that the user has selected to include in the monitor during the monitor setup process. The categories included in each user monitor may be modified at any time to add additional categories or remove existing categories. In some embodiments, the system automatically modifies the categories included in the monitor to add or remove categories to reflect new relationships that may be defined in the knowledge base based on new information that was not available at the time the user initially setup their particular monitor. Some embodiments may alert the user of new categories that would be relevant for a user to add to their monitor and give the user the option to add some or all of the categories or leave their monitor unchanged.

In some embodiments, the user may further define logical relationships among the specified categories using additional restrictions, such as Boolean logic. As shown in some embodiments, the monitor data structure 1100 stores these relationships in the relationships data structure 1110 as logical relationships between categories using common Boolean operators, including "AND, OR, NOT, NOR, XOR" etc. A user may define a Boolean relationship between a group of categories. For example, the Boolean data structure 1125 returns documents that are relevant to only Company 1 (AND) Business Line 5 (AND) Business line M. Thus a document that does not contain information relevant to all three of these categories will not be returned to the user. By allowing the user to define with greater specificity the relationships between various categories using various logical constructs and Boolean logic, the user can further define and pinpoint the exact type of information they are seeking through their monitor.

The filter data structures 1155, 1120, 1130, and 1140 specifies the set of filters that are applied by the monitor. Each individual filter included in the set of filters determines whether to include or exclude a particular document based on a variety of factors. Filters can be specified to include or exclude documents according to various criteria, as described above, including topic filters that include or exclude documents relating to various specific business issues, various content type filters, and various region-based filters.

Some embodiments allow a user to specify a set of filters (1120, 1130, and 1140) for each particular category or sub-set of categories in the monitor. The filter data structures (1120, 1130, and 1140) are applied to the individual categories, or the defined Boolean relationships for a group of categories as illustrated in FIG. 11. For example, a user may apply the particular set of filters 1120 to the group of categories 1125, the set of filters 1130 to the group of categories 1135, and the set of filters 1140 to the group of categories 1145. This monitor also applies a set of filters 1155 to all of the categories included in the monitor. The user can define any combination of filters and categories based on their particular preference and objective for their monitor.

The deliver data structure 1150 specifies various deliver parameters for the monitor. The delivery data structure 1150 includes the frequency of notifications and reports to send to the user, the maximum number of documents to include in each report and the display format of the reports, among other information. The system uses information from each monitor data structure 1100 to identify and retrieve documents from the knowledge base and external sources that meet the parameters of a particular monitor and are thus relevant to the user. The system sorts the display order of the documents based on the relevance of the document to the particular monitor. In some embodiments, the system will display only the documents with the most valuable and relevant information and sort the documents based on a weighting score for the document.

III. Monitor Generation Process and User Interface

In order to generate a monitor, some embodiments provide a series of GUI displays used to specify certain aspects of the monitor. The monitor generation and setup process of some embodiments may be described in three particular stages. During the first stage of the monitor generation process, the user specifies their objective for creating a monitor and a set of categories to include in the monitor. During the second stage, the user further defines their objective for the monitor by selecting an optimal set of filters to be applied by the system in order to return only the most relevant documents to the user. During the third and final stage of the monitor generation process, the user specifies their delivery preferences for their monitor, including the medium through which they will receive notifications and reports from the monitor, the format of these reports, and the frequency that these reports will be delivered.

Figure 12:
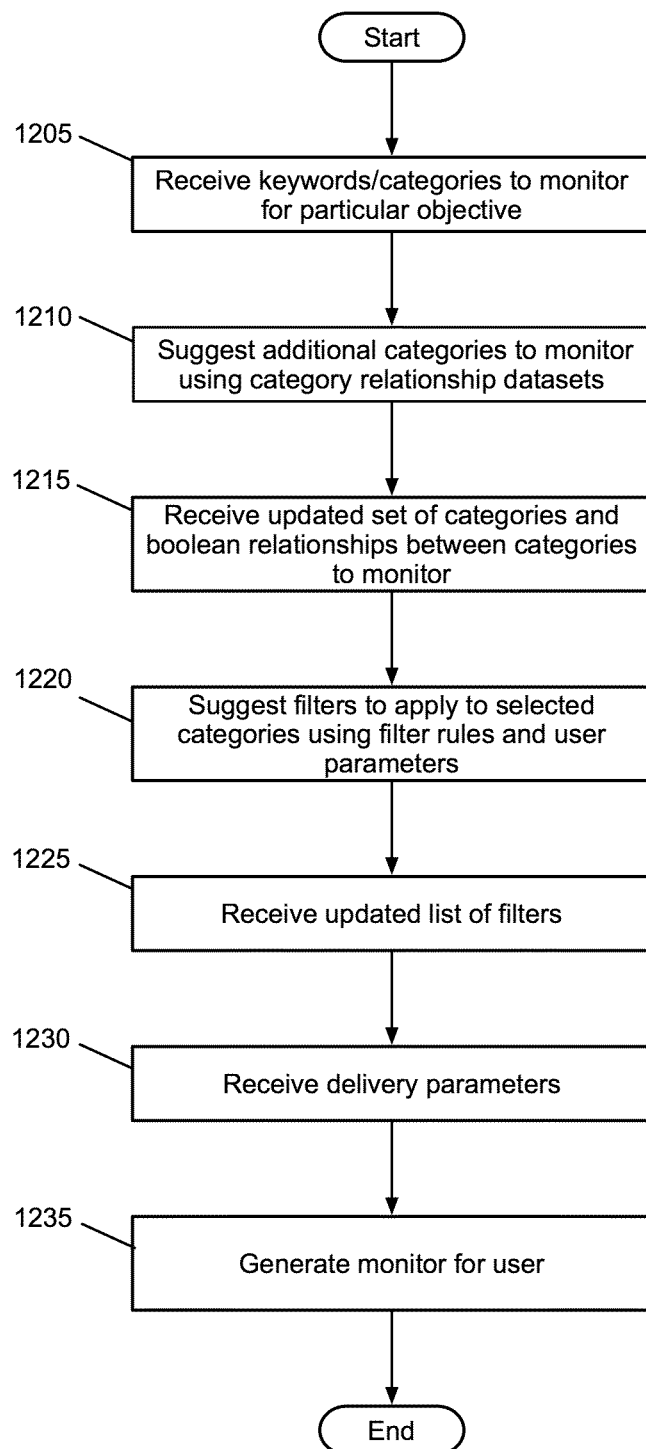
FIG. 12 conceptually illustrates a process by which a user creates and initializes a monitor.

FIG. 12 conceptually illustrates a process 1200 of some embodiments for generating a new monitor according to user input. The process 1200 will be described by reference to FIGS. 13-33. FIGS. 13-33 illustrate the generation of a monitor through the graphical user interface (GUI) of some embodiments. The illustrated GUI is one example of a user interface for the monitor setup process, but one of ordinary skill in the art will recognize that some embodiments may use a different GUI. Furthermore, different user objectives may produce different displays within the GUI at different stages in the process.

As shown, the process begins by determining (at 1205) a user's objective for creating the monitor and receives at least one keyword or category to monitor. In some embodiments, the user may select among several pre-defined objectives. For instance, these objectives might include a portfolio or stock related analysis (e.g., for a financial advisor), a customer-related analysis (e.g., for a marketing or sales person), or a competitor-related analysis (e.g., for a corporate manager). In some embodiments, the user has the option to create and define a new objective. For each particular objective, the monitor will only return documents that a user is likely to consider as relevant for their objective.

Figure 13:
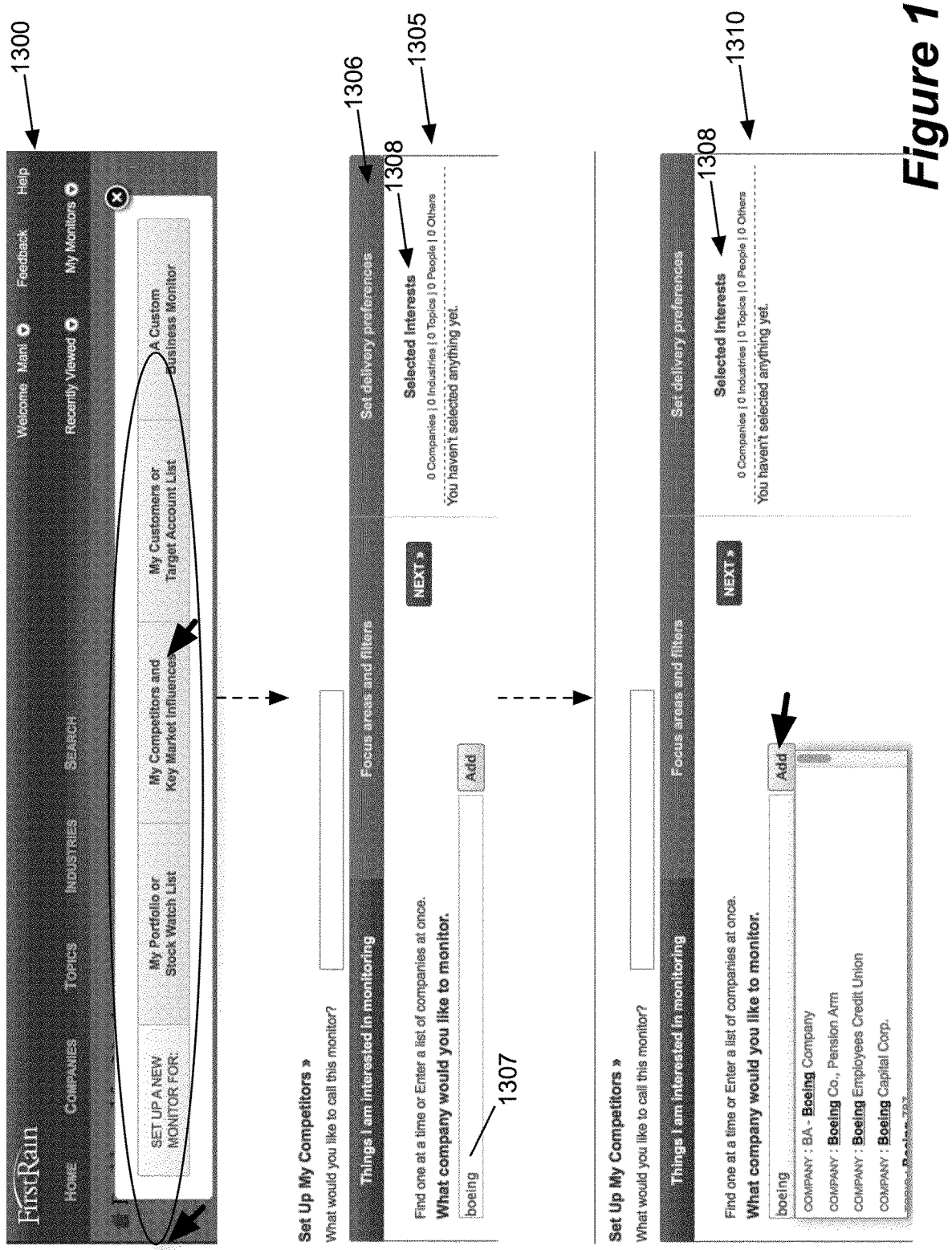
FIG. 13 conceptually illustrates a graphical user interface (GUI) that is displayed during a monitor setup process for selecting an objective for the monitor.

(At 1205) The objective, as illustrated by GUI 1300 in FIG. 13, may be determined using one of a set of pre-defined objects or it may be a custom user-specified objective. In some embodiments, the system determines a user's objective in part based on the particular portal through which the user enters the monitor setup process. During the initial stage, the GUI 1300 illustrated in FIG. 13 displays four portals, each corresponding to a different objective, including three pre-defined objectives and one custom portal for defining a new objective. For example, FIG. 13 illustrates that the user may select from three pre-defined objectives, although the system may provide other objectives that are not illustrated in this figure. The sample pre-defined objectives illustrated in GUI 1300 include: (1) "My Portfolio or Stock Watch List", (2) "My Competitor and Key Market Influences", and (3) "My Customers and Target Account List". Based on the user's selection of a particular objective, for example, from the various objectives illustrated in GUI 1300, the system executes a different monitor setup process and thus present a different series of GUIs that are specific to the objective. For each particular objective, the system generates a different set of monitor parameters, including different categories and different sets of filters that will best achieve the user's objective.

For a "My Portfolio or Stock Watch List" type of objective, the system may set the monitor parameters specifically at retrieving documents that may be relevant to a user that is interested in conducting financial analysis of a particular company or a group of companies or for related matters. Likewise, the system may select filters for the monitor that are likely to return the types of documents that are most relevant to a typical user conducting financial analysis. For a "My Competitors and Key Market Influences" type of objective, the system may select monitor parameters that will detect and retrieve documents that may be relevant to a user interested in tracking competitors of a company, or tracking certain key market influences that have an effect on the competitive marketplace. The list of competitors may include a list of direct competitors or business influences input by the user (e.g., partnerships, joint ventures, non-competitor entities influential in the market segment, industry standards organizations), or a list of indirect competitors recommended by system after analyzing the competitive marketplace for a particular company. Furthermore, the system may recommend relevant industries, topics, and people that impact the competitive marketplace. For a "My Customers or Target Account List" type of objective, the system may set the monitor parameters specifically for retrieving documents that may be relevant to a user interested in analyzing a current list of customers or a list of possible new prospective customers. For a "Custom Business Monitor" objective, the system allows a user to define a customized objective specific to their preferences. The user may customize each specific aspect of the monitor parameters, including the particular set of categories to monitor, the individual filters to apply in the monitor, and the particular delivery settings for the monitor.

Once a user has selected their initial objective for the monitor, the system displays GUI 1305 in FIG. 13 whereby a user may enter query terms and categories (including keywords, companies, industries, topics, and people) for the areas they are interested in monitoring. GUI 1305 illustrates the user interface for entering the query terms. The GUI 1305 displays a setup display bar 1306 that indicates the three stages of the monitor setup process. The three stages in the setup display bar 1306 include a "Things I am interested in monitoring" stage, a "Focus areas and filters" stage, and a "Set delivery preferences" stage. The setup display bar 1306 also indicates the particular stage that the user is currently in in the monitor setup process by displaying a blue highlighted tab for the current stage. Setup display bar 1306 indicates that the user is currently in the "Things I am interested in monitoring" stage of the monitor setup process. GUI 1305 also displays a search bar 1307 and a selected interests display area 1308. The user may enter query terms into the search bar 1307 for the system to analyze. The selected interests display area 1308 displays a list of all the categories divided by each of the category types (companies, industries, topics, people, and other) that will be included in the monitor.

The user enters a list of keywords or categories they are interested in monitoring into the GUI search bar 1307. Depending on the user's objective for the monitor, the system will analyze the user input for different related category types, including related companies, topics, industries, or people that the user may also be interested in monitoring and that are relevant for the particular user's objective.

The process (at 1210) next analyzes the received query terms and/or categories and suggests additional categories for the monitor. GUI 1305 illustrates the user entering the query term "boeing" into the search bar 1307. In some embodiments, the search bar has an autocomplete function, such that once the user starts typing in a name, various options are presented. For example, in GUI 1310, the user has searched for "boeing". After typing the first few letters "boe" into the search bar 1307, the GUI 1310 presents the user with a list of possible categories, including the company "Boeing Company". In addition, as shown in GUI 1310, some embodiments denote each category in the list with a corresponding category type label of "Company", "Topic", "Industry" or "Person". In this example, "Boeing Company" is labeled "Company:" to illustrate that Boeing is of the company category type from the set of category types (e.g., company, topic, industry, people). After typing in the letters "boe" into the search bar 1307, the user is also presented with other categories that may be selected, including "Boeing Co., Pension Arm" and "Boeing Capital Corp", among others. In this example, each other category suggested is also a company, however these suggestions may include other category types that are not illustrated in GUI 1310, including industries, topics, and people. The user may then select the "Add" icon to add the particular category to the list of selected categories for the monitor. Once the user adds the category to the monitor, it will be listed in the selected interests display area 1308 to indicate that the category is now included in the monitor.

In order to suggest additional categories to monitor, the process (at 1210) also analyzes the knowledge base, including the category relationship data and the tagged documents database to identify the relationships that have been defined between the user received categories and other categories stored in the knowledge base. The process (at 1210) executes various category analyzers that use different processes to detect the additional categories that may be relevant to the user. One such process for identifying additional related categories to provide to a user is described in detail below with reference to FIGS. 36 and 37.

FIG. 14 illustrates a GUI 1400 that displays the set of recommended categories for "Boeing Company". FIG. 14 also displays the search bar 1307, the selected interests display area 1308, and a recommend categories display area 1415. The recommended categories display area 1415 displays the list of the recommended categories, divided by the category types of "Companies", "Topics", "Industries" and "People". Each category listed in the recommended categories display area 1415 is an additional category that the system has identified as likely to be relevant to the user's interests and objective.

As described above, the system recommends each category in the list of recommended categories by analyzing the stored relationship information in the knowledge base of the system, including the category relations data storage. In some embodiments, the system recommends only categories classified as highly relevant to the user specified categories, while in other embodiments the system recommends categories classified in other tiers. In some embodiments, the particular order in which the categories are presented to the user may be based on various sorting algorithms, including algorithms that calculate the importance of the recommended category to the selected category. For example, within the companies category type, the GUI 1400 may list the recommended companies in the recommended categories display area 1415 based on the importance of the relationship between the selected company and the recommended company. Likewise, within the people category type in the recommended category display area 1415, the GUI 1400 may list the recommended people based on the importance of the person's position or title within a particular company, or the importance of the person as related to a particular industry or topic that the selected company is related to. In this example, the categories listed for Boeing Company in the recommended category display area 1415 in FIG. 14 include various companies, topics, industries and people. The companies include Airbus S.A.S, United Launch Alliance, LLC, Dassault Aviation SA, Groupe Insutriel Marcel Dassault S.A., BAE Systems PLC, and various other companies. The topics include Boeing 787, Aerospace Industry Outlook, Defense Contracts, Commercial Aerospace Industry, Airbus 389, and Airbus 350, among others. The industries include Aerospace/Defense Industry—Major Diversified, Industrial Goods Sector, Aerospace/Defense Segment, among numerous others. The suggested people include Dennis A. Mullenburg, James F. Albaugh, R Sam Deford, among various other.

Figure 15:
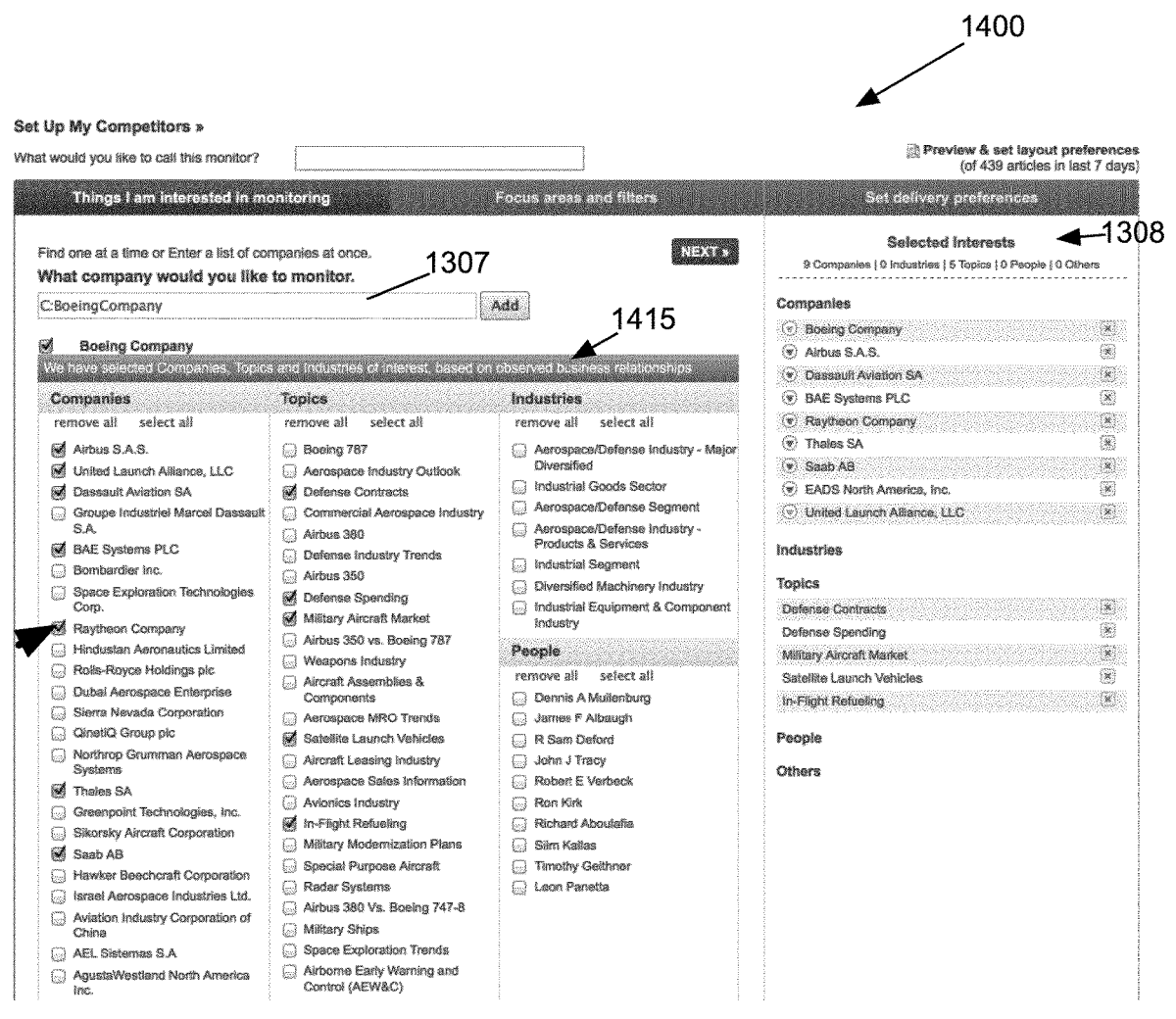

In some embodiments, the system pre-selects certain categories (companies, topics, industries, and people) that it determines are the most likely to be relevant to the user. FIG. 14 illustrates the pre-selected categories for Boeing Company listed in the recommended categories display area 1415 include Airbus S.A.S., Dassault Aviation SD, Raytheon Company, Defense Contracts, and numerous other categories. The user may then elect to remove these pre-selected categories or add additional categories to the finalized list of categories to include in the monitor. FIGS. 14 and 15 illustrate the user selecting an additional company and de-selecting a pre-selected company to include in the monitor.

FIG. 14 illustrates the user selecting the company "United Launch Alliance" which will add this company to the list of selected categories to include in the monitor. FIG. 15 illustrates the GUI 1400 after the user has selected to add the recommended company. The selected interests display area 1308 now lists "United Launch Alliance" in the list of companies to include in the monitor. FIG. 15 also illustrates the user de-selecting the recommended company, "Raytheon Company", which will remove this company from the monitor. FIG. 16 illustrates that "Raytheon Company" has been removed from the list of companies listed in the selected interests display area 1308 and thus will no longer be included in the monitor.

Figure 17:
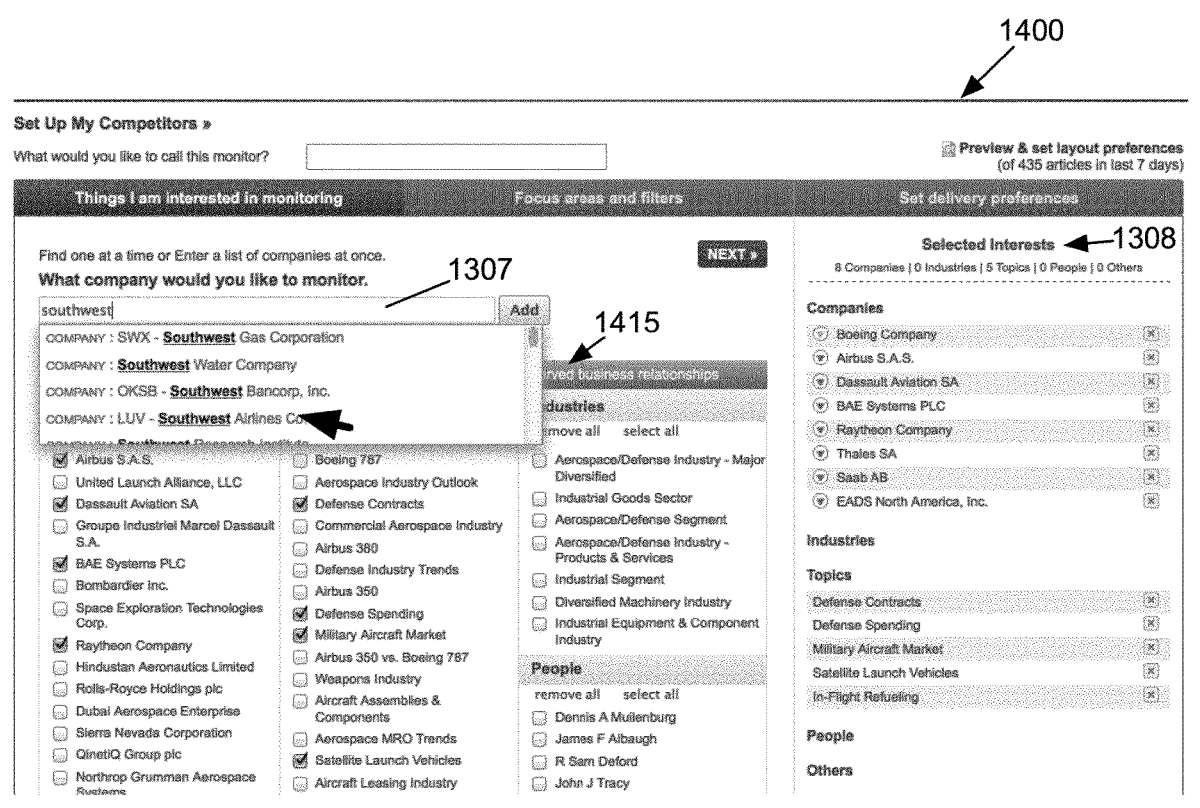
Figure 18:
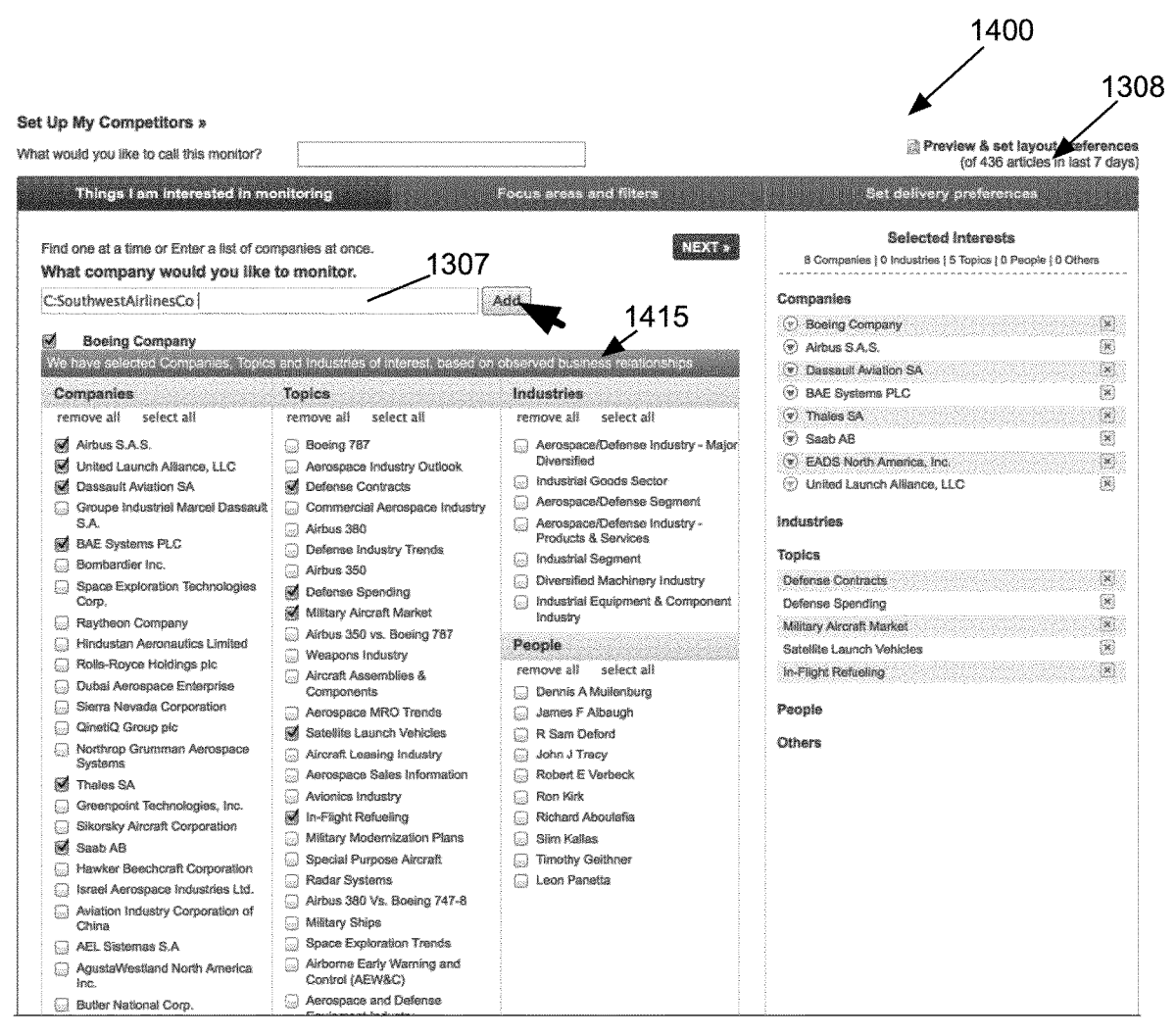

FIG. 17 illustrates the user adding, using search bar 1307, another company to the list of categories to monitor. The system permits a user to add any variety of categories to their monitor to satisfy their particular preferences. In FIG. 17, the user is entering into the search bar 1307 another company that is not listed in the recommended category display area 1415. For this particular objective, the user may add any variety of categories and category types to the monitor. The user has entered the query term "southwest" in the search bar 1307 which causes the autocomplete function to present a list of various companies. FIG. 18 illustrates the user selecting the company "Southwest Airlines Co" to add to the monitor.

Figure 19:
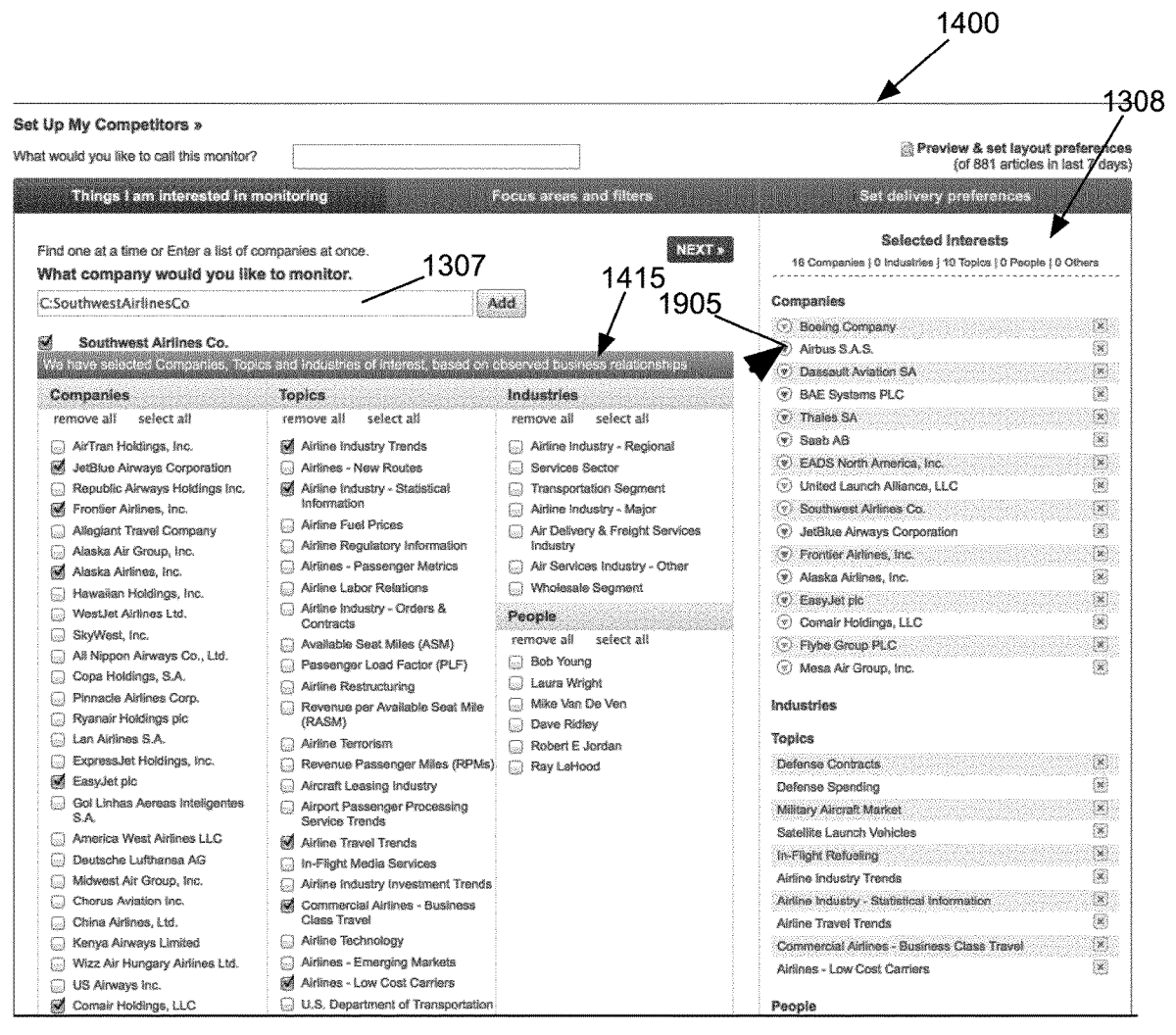

FIG. 19 illustrates the GUI 1400 after the user has added Southwest Airlines to the list of categories to monitor. The system modifies the recommend category display area 1415 to now display a list of categories, including companies, topics, industries and people that are related to Southwest Airlines Co. These recommended categories are different to those recommended for Boeing Company. For Southwest Airlines Co., the system has recommended numerous companies, topics, industries and people that it determines are related to Southwest Airlines Co. by analyzing the knowledge base. The recommended companies include AirTran Holdings, Incs., JetBlue Airways Corporation, Republic Airways Holding Inc., Frontier Airlines, Inc. and numerous others. The recommended topics include Airline Industry Trends, Airlines—New Routes, Airline Industry—Statistical Information and numerous others. The industries include Airline Industry—Regional, Services Sector, Transportation Segment, and numerous other industries. The recommended people include Bob Young, Laura Wright, Mike Van De Ven and various others. As described above, the user may select additional categories and de-select the pre-selected categories to include in the monitor. FIG. 19 also illustrates the system's pre-selected categories for Southwest Airlines Co. in the recommended categories display area 1415, including JetBlue Airways Corporation, Alaska Airlines, Inc., Airline Industry Trends, and Airline Travel Trends, among various others. The user may de-select these pre-selected companies according to their particular preferences.

For each selected company listed in the selected interests display area 1308, the user can also select the individual business lines of the company that they are interested in monitoring. FIG. 19 illustrates the user selecting the business line icon 1905 for Airbus S.A.S. FIG. 20 illustrates two stages of the GUI display 2000 and 2005 for selecting a particular business lines of a company to monitor. For each particular company, the system displays the business lines in which the company operates. In some embodiments, the system pre-selects certain business lines to include in the monitor. The system determines which business lines to pre-select in part by using a set of filter rules, as described above. GUI 2000 illustrates several of the business lines for Airbus S.A.S. which includes Aircraft Refurbishment Services, Aircraft Modernization & Maintenance, Business Jet, Commercial Aircraft, Military Aircraft, and various other business lines. The system has pre-selected eight of these particular business lines to include in the monitor. GUI 2000 illustrates the user de-selecting the business lines "Aircraft Modernization & Maintenance (AM&M)" from the business lines to include in the monitor. GUI 2005 illustrates the business line display area and that "Aircraft Modernization & Maintenance (AM&M)" is no longer selected as a business line to include in the monitor. GUI 2005 also illustrates the user selecting the "Done" icon to exit the business line GUI display area.

Figure 21:
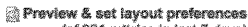
FIG. 21 conceptually illustrates a GUI that is displayed after the user has completed selecting the particular business lines they are interested in monitoring for a particular company.

FIG. 21 illustrates the GUI 1400 after the user has completed selecting the particular business lines they are interested in monitoring for a particular company. The user can then select the "NEXT" icon illustrated in FIG. 21 to proceed to the second stage of the monitor generation and setup process.

Figure 22:
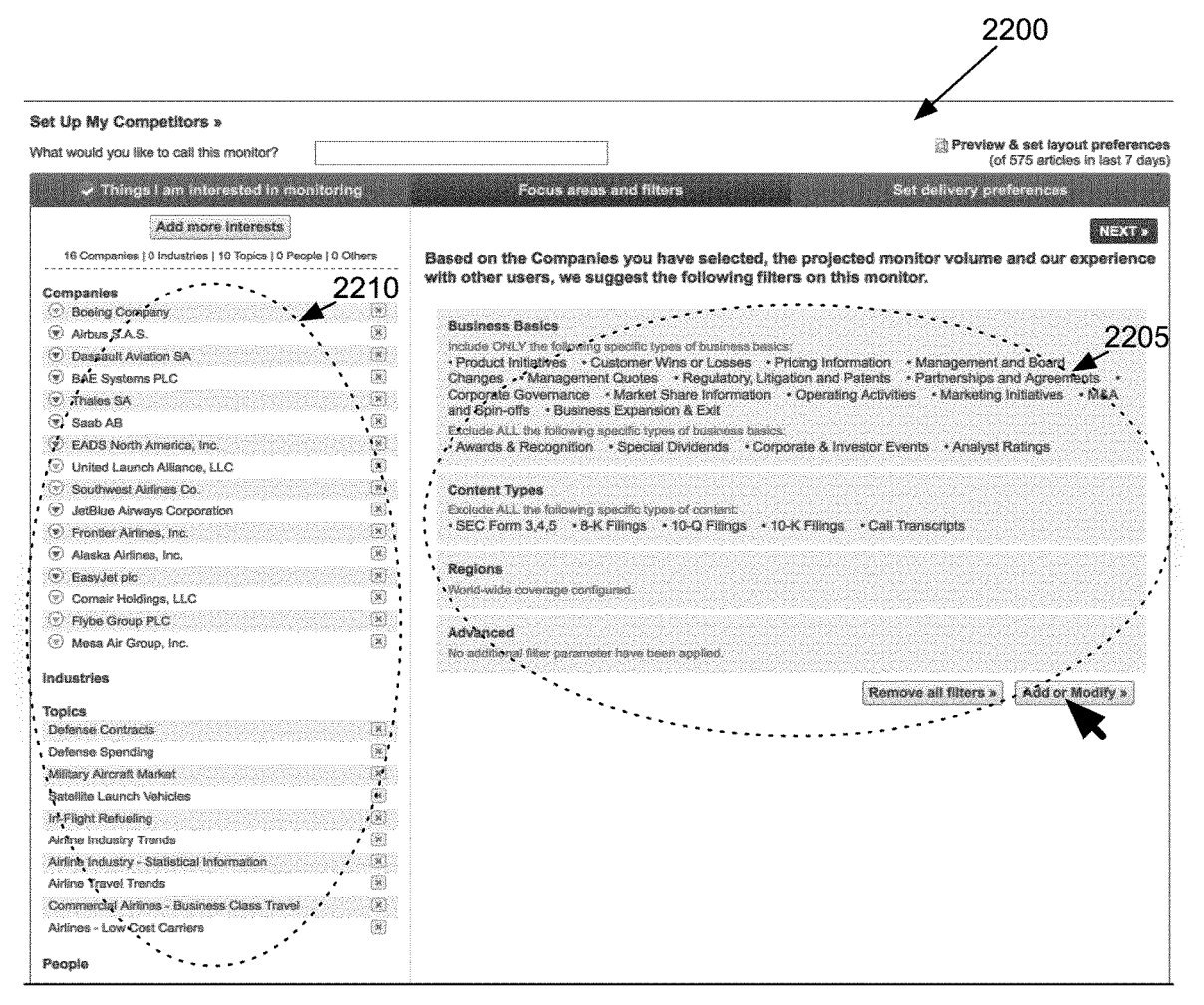

Referring back to FIG. 12, the process (at 1215) next receives the finalized list of categories to include in the monitor and gathered from the user. Using this finalized list of categories, the process (at 1220) suggests an optimal set of filters to apply to the selected categories. FIGS. 22-28 illustrate the user modifying a set of filters for the monitor. GUI 2200 is displayed during the second stage of the monitor setup process during which the user can specify the set of filters to apply in the monitor. FIG. 22 illustrates a GUI 2200 that displays the suggested set of pre-selected filters for this particular monitor. The GUI 2200 display area includes a filter display area 2205 and a selected categories display area 2210. The process (at 1220) determines a suggested set of filters, displayed in the filters display area 2205, using a set of filter rules in conjunction with the user specified parameters and preferences. The user may then modify, by adding or deleting the filters, the selected set of filters.

The filters display area 2205 displays the selected filters, some pre-selected by the system, others selected by the user, that are included in the particular monitor. The filters are grouped into four major categories including Business Basics, Content Types, Regions, and Advanced. Within each category of filters, the system may recommend a set of pre-selected filters that best achieve the user's objective.

GUI 2200 in FIG. 22 illustrates the filter display area 2205 with the initial set of preselected filters that the system has selected to apply for the monitor. The pre-selected filters for this monitor include certain Business Basics filters that include or exclude documents relating to various specific business issues, including: product initiatives, customer wins or losses, pricing information, management and board changes, management quotes, regulatory, litigation and patents, among numerous other filters listed. The filters display area 2205 for the monitor includes various Content Type filters that include or exclude documents from various sources, including in this example, filters that will exclude all SEC Form 3, 4, 5, 8-K Filings, 10-Q Filings, 10-K Filings, and Call Transcripts. The filter display area 2205 indicates that this particular monitor does not apply any region-based filters or any of the Advanced filters. The system executes various processes and applies a variety of factors when determining which particular filter to include the pre-selected set of filters for the monitor. One particular filter generation process is discussed in detail below with reference to FIG. 38.

Figures 23, 24:
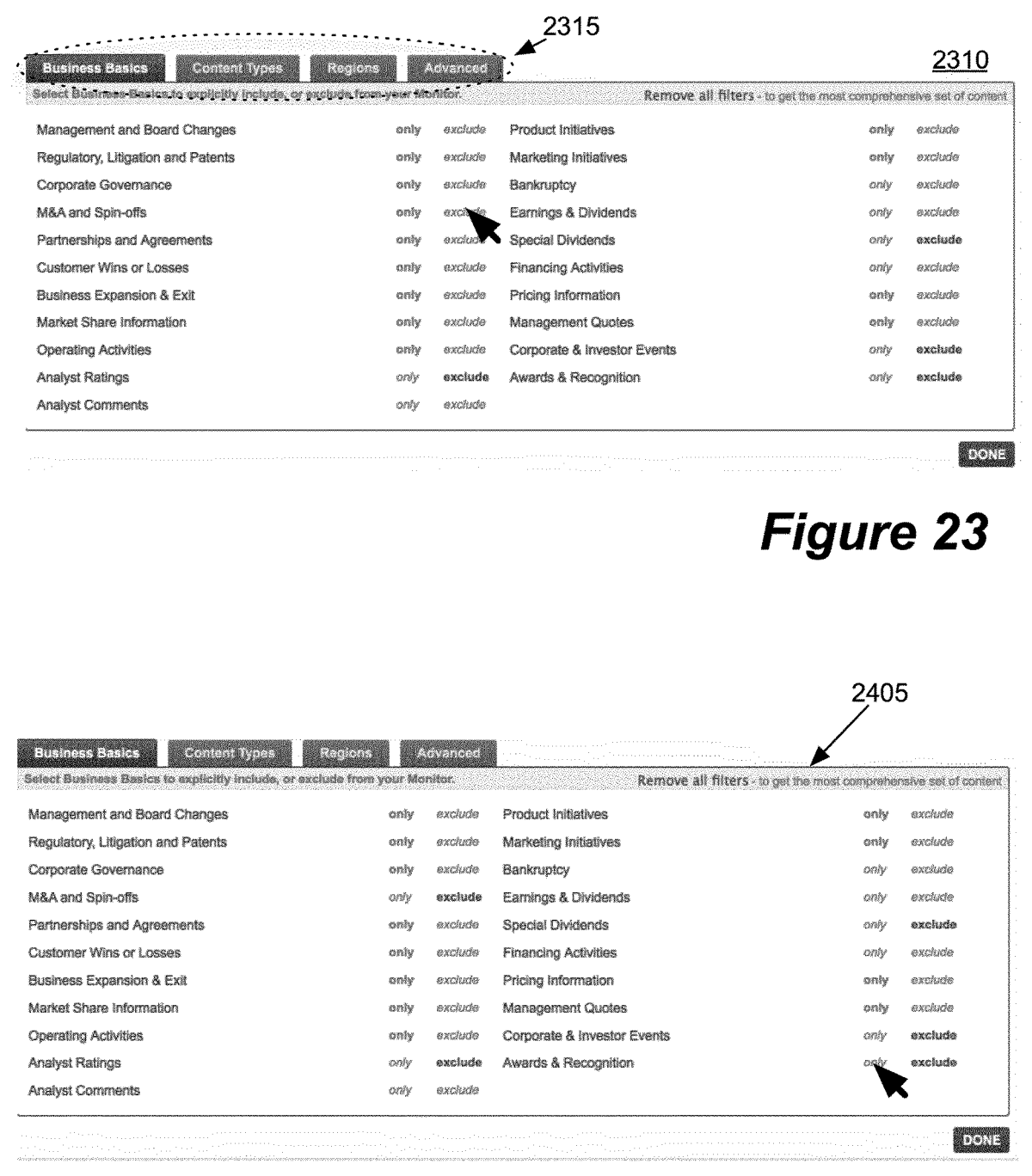

The user may review the pre-selected filters in the filter display area 2205 to determine whether they are sufficient or overly restricting for their particular objective and interests. The user has the option to remove certain filters or add additional filters for the monitor in order to broaden or narrow the scope of the monitor. FIG. 22 illustrates the user selecting the "Add or Modify" icon in order to modify the pre-selected set of filters. GUI 2310 illustrated in FIG. 23 displays a GUI for modifying filters. FIG. 23 illustrates a filter tab 2315 corresponding to four major filter types with a highlighted blue tab corresponding to the current type of filters displayed in the filter display area. The "Business Basics" filters filter information based on a variety of business and financial issues related to a company. This list of filters includes filters that will include or exclude documents based on whether they are related to management and board changes, regulatory, litigation and patents, corporate governance, merger and acquisition activities, partnerships and agreements, customer wins or losses, analyst ratings, and numerous other filters related to various other business topics. The user may either include "only" or "exclude" documents related to the subject matter of the particular filter. FIG. 23 illustrates certain filters have been selected as "only", including Management and Board Changes, Corporate Governance, and Analyst Ratings, among numerous others. The user may modify to include or exclude a particular filter. FIG. 23 illustrates the user selecting to exclude the "M&A and Spin-Offs" filter.

FIG. 24 illustrates GUI 2405 after the user selects to exclude "M&A and Spin-offs" from the filtering activities. FIG. 24 also illustrates the user selecting to include "Awards and Recognitions" in the set of filters for the monitor. GUI 2510 in FIG. 25 illustrates the user selecting the "Content Types" tab to switch between the major types of filters. FIG. 26 illustrates GUI 2605 with the "Content Types" tab selected and the set of filters that allow the user to filter documents based on the particular content type of the document. For example, the user has the option to either include "only" or "exclude" press releases, news wires, blogs, industry sources, various Securities and Exchange Commission filings, call transcripts, medical journals, and various other filters. In some embodiments, the system pre-selects certain of these content type filters using various algorithms and the filter rules described above.

Figures 27, 28:
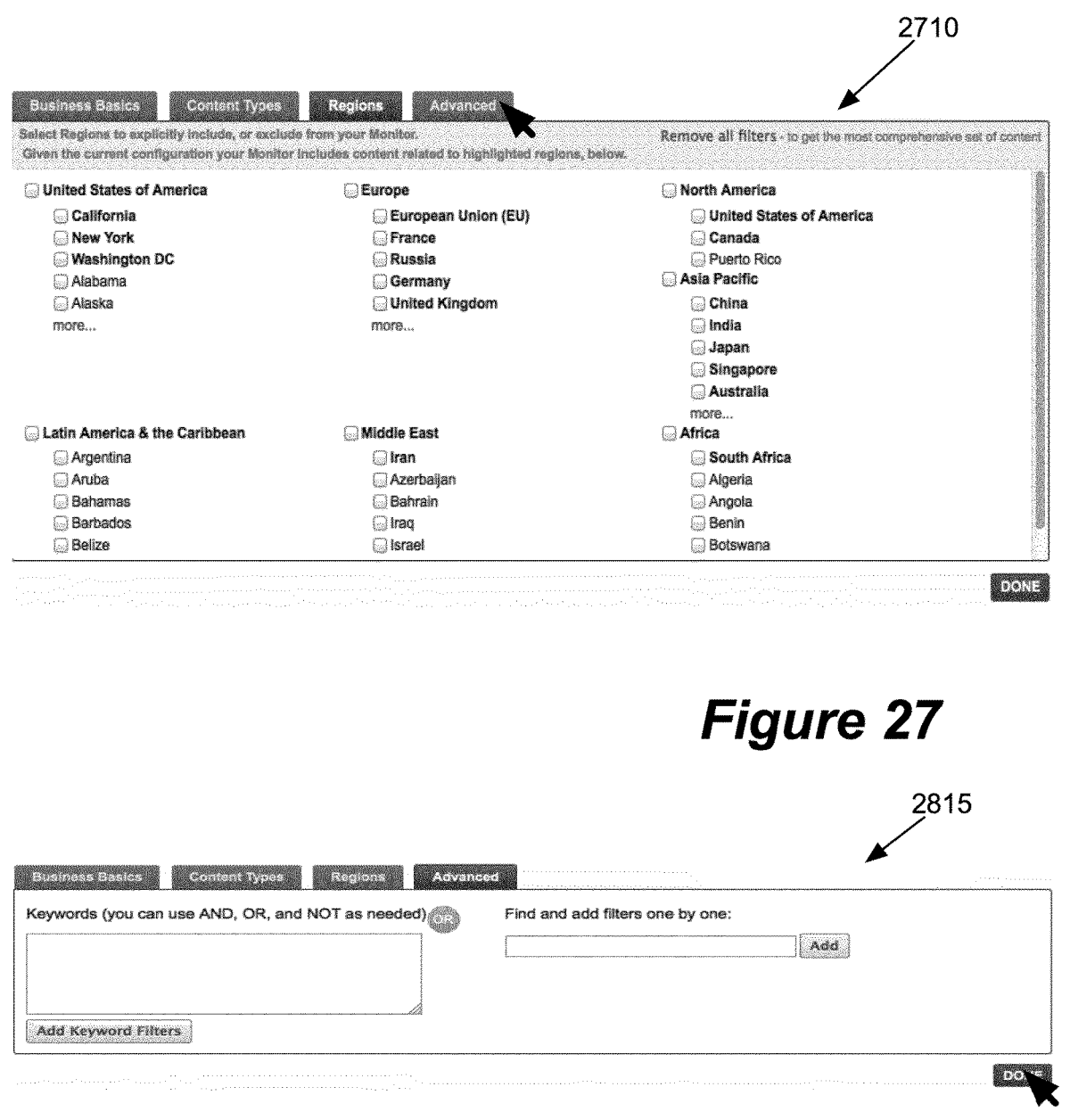

GUI 2710 in FIG. 27 illustrates the filter display area after the user has selected the "Regions" tab. The user can select this tab to customize the monitor to a specific geographic region of the world that they are interested in monitoring.

For example, a user interested in a company's activities in a particular region can elect to include filters that pertain to that specific region. GUI 2815 in FIG. 28 illustrates the filter display area after the user has selected the "Advanced" tab. GUI 2815 illustrates a search bar where a user can specify customized filters using various search terms and/or Boolean logic. These filters are also included in the monitor and used during the document monitoring activities. After the user has selected and finalized their preferred set of filters, the user may proceed to the third and final stage of the monitor setup process by selecting the "Done" icon. By allowing a user to customize the set of recommended filters, the user is able to define with a greater degree of specificity their particular objective and the particular areas they are interested in for the monitor.

FIG. 29 illustrates the GUI 2200 after the user has updated the set of filters that they wish to include in the monitor. The filter display area 2905 now displays an updated list of filters to reflect the added and modified filters. The filter display area 2905 now lists "M&A and Spin-Offs" under the set of filters that "exclude" this specific type of business basic filter. The filter display area 2905 also lists "Awards & Recognitions" under the set of filters that "include only" this type of business basic filter. FIG. 29 also illustrates the user selecting the "NEXT" icon to proceed to the final stage of the monitor setup process.

Figure 30:
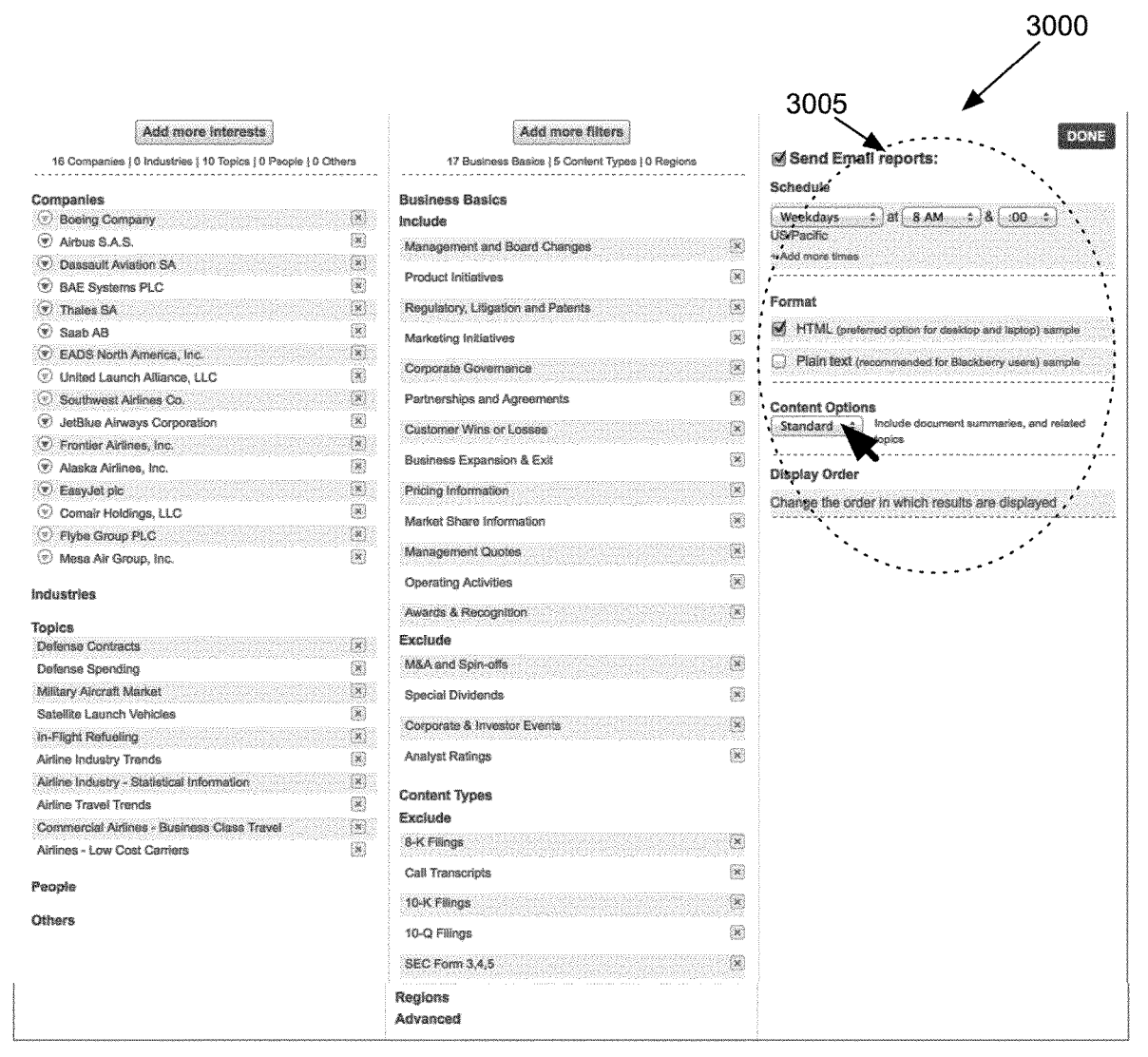
Figures 31, 32:
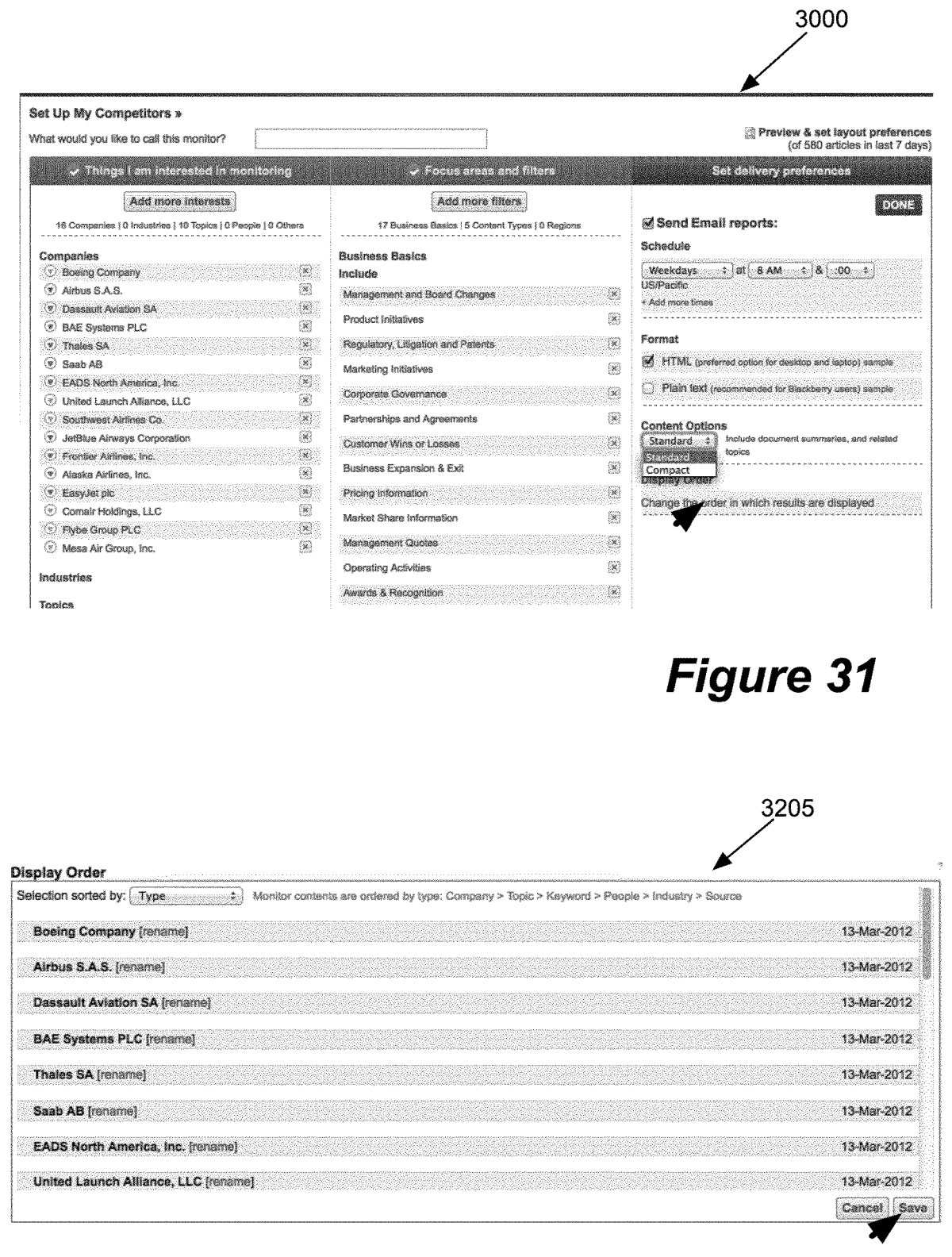

Referring back to FIG. 12, the process (at 1225) next receives this updated list of filters to store in the monitor data structure. The process (at 1230) next receives the delivery parameters of the user, as illustrated in FIG. 30. FIG. 30 illustrates the GUI 3000 with the delivery display area 3005 for specifying the delivery parameters for the monitor. Here, the user can select the medium through which they receive the documents and/or reports, the format of these documents, and the time schedule to receive the reports. GUI 3000 also illustrates that the user may select to have the reports e-mailed to their e-mail account. The user may also specify the day and time to send these e-mails, the format (HTML or plain text), and various other content options. FIG. 30 illustrates the user selecting the "Content Options", to modify these delivery settings. FIG. 31 illustrates GUI 3000 displaying the different content option settings, which can be presented in either a compact or standard format. The user can also change the order in which the results are displayed. FIG. 32 illustrates the GUI 3205 that permits a user to make changes to this order. A user may change the particular display order of the companies within each report, provide different names for the categories, and apply other formatting options.

The process (at 1235) next sets the values for the different monitor parameters of the monitor data structure which the system will use to return tagged documents that are relevant to the monitor's parameters. At any time during the monitor setup process, the user can elect to go back to any particular stage in the monitor setup process. FIG. 33 illustrates GUI 3000 and the final stage of the process after the user has set their monitor's delivery preferences. The user may also specify a name for their monitor in the monitor name text area 3305. FIG. 33 illustrates the user entering "Airline Competitor Monitor" in the monitor name text area 3305 of GUI 3000. FIG. 33 also illustrates the user selecting the "Done" icon which saves the monitor into the monitor storage and allow the system to begin using the monitor in order to return relevant documents to the user.

Figure 34:
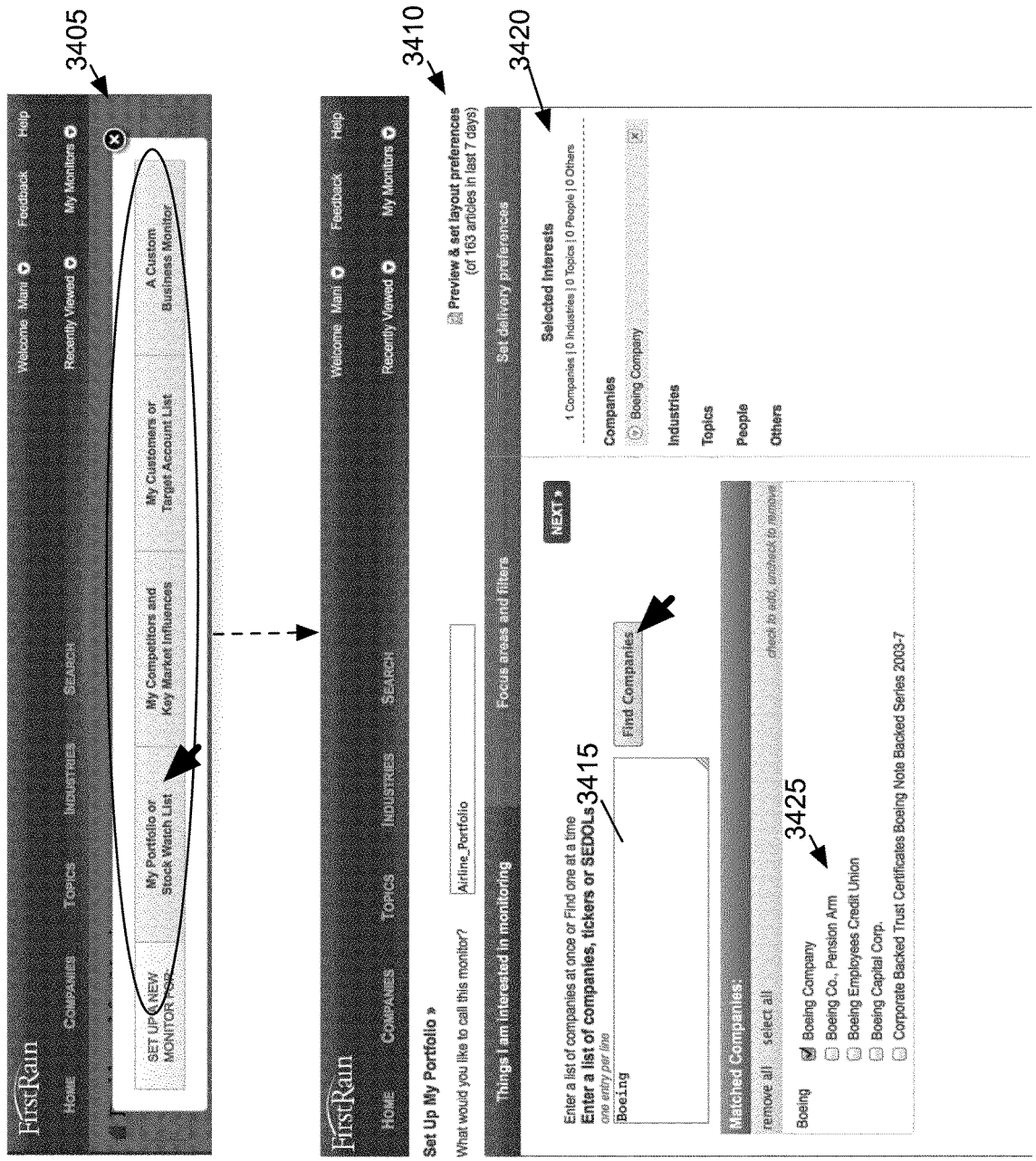
FIG. 34 conceptually illustrates a GUI that is displayed if the user selects the "My Portfolio or Stock Watch List" type of objective.

During the initial stage of the monitor setup process described above in FIG. 13, the user had selected the "My Competitors and Key Market Influences" portal, which thereby determined a particular series of setup GUIs that were displayed for this particular objective. FIG. 34 illustrates the GUI 3405 that is displayed if the user selects the "My Portfolio or Stock Watch List" type of objective. FIG. 34 illustrates a GUI 3410 that displays a search bar 3415, a selected interests display area 3420 and a set of matched companies display area 3425 similar to the GUI display area in FIG. 13. However, when the user enters the company "boeing" into the search bar 3415, they are presented with only the exact company name in the matched companies display area 3425. For this objective, the system does not recommend additional topics, industries or people to the user since these categories are typically not relevant to a user interested in doing a financial analysis of a company.

Figure 35:
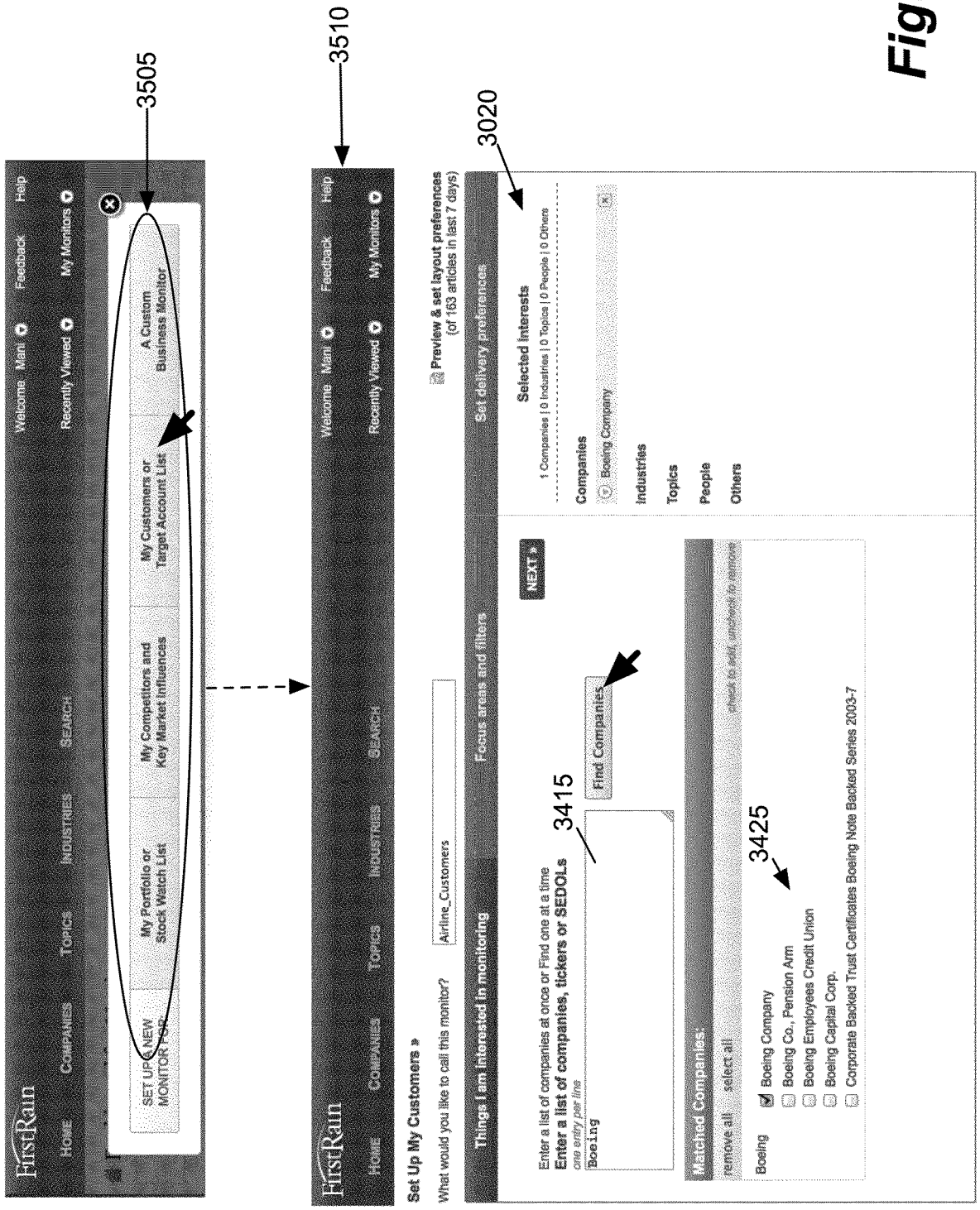
FIG. 35 conceptually illustrates a GUI that is displayed if the user selects the "My Customers or Target Account List" type of objective.

Similarly, FIG. 35 illustrates the user selecting the "My Customers or Target Account List" portal. FIG. 35 illustrates a GUI similar to the GUI in FIG. 34. Like FIG. 34, when the user enters "boeing" into the search bar 3415, they are presented with only the exact company in the matched companies display area 3425. The system does not recommend additional companies, topics, industries or people since these category types are typically not relevant to a user with this objective.

Figure 36:
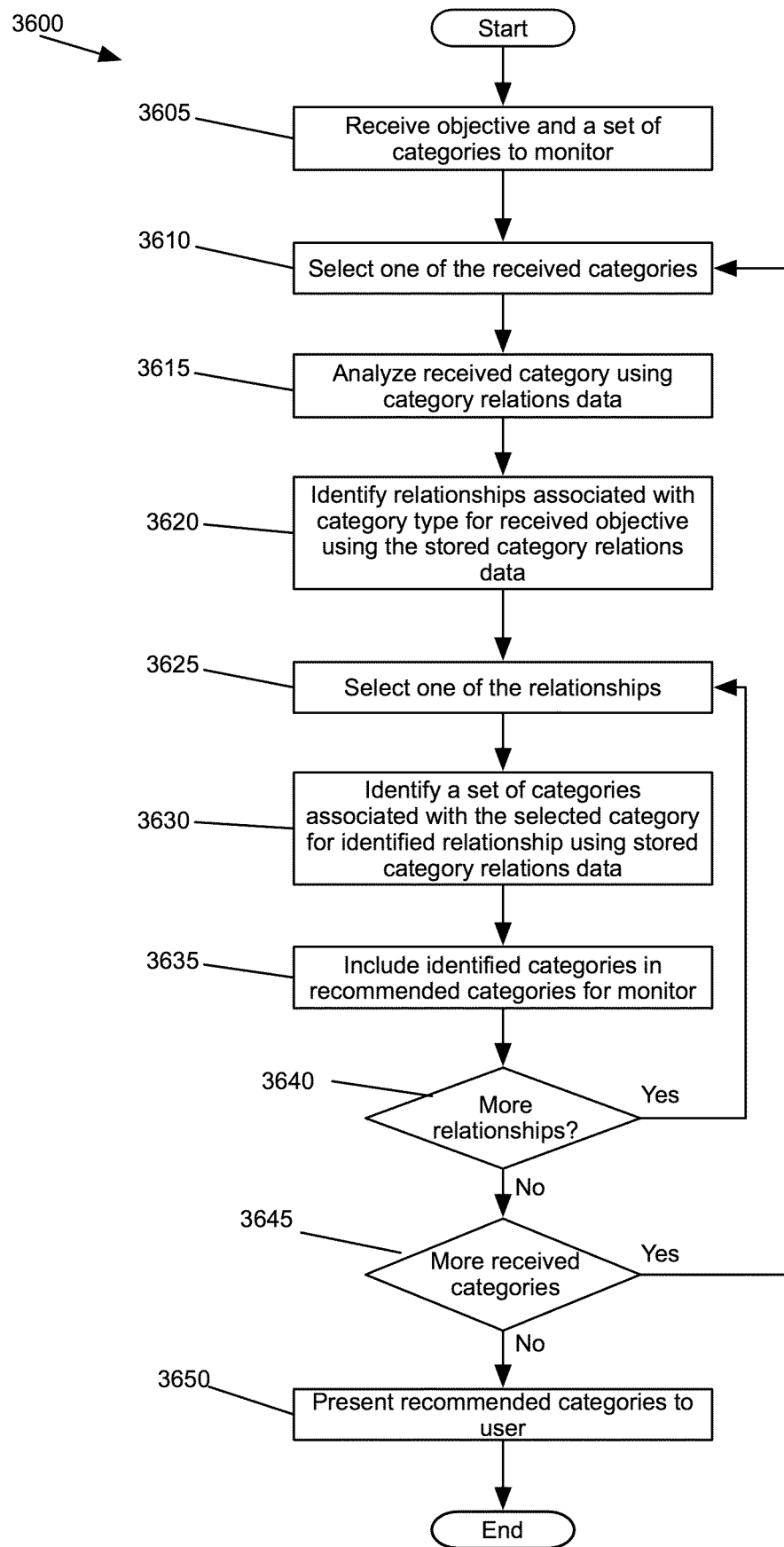
FIGS. 36-37 conceptually illustrate a two stage process of some embodiments for recommending additional categories to a user to include in a monitor.
Figure 37:
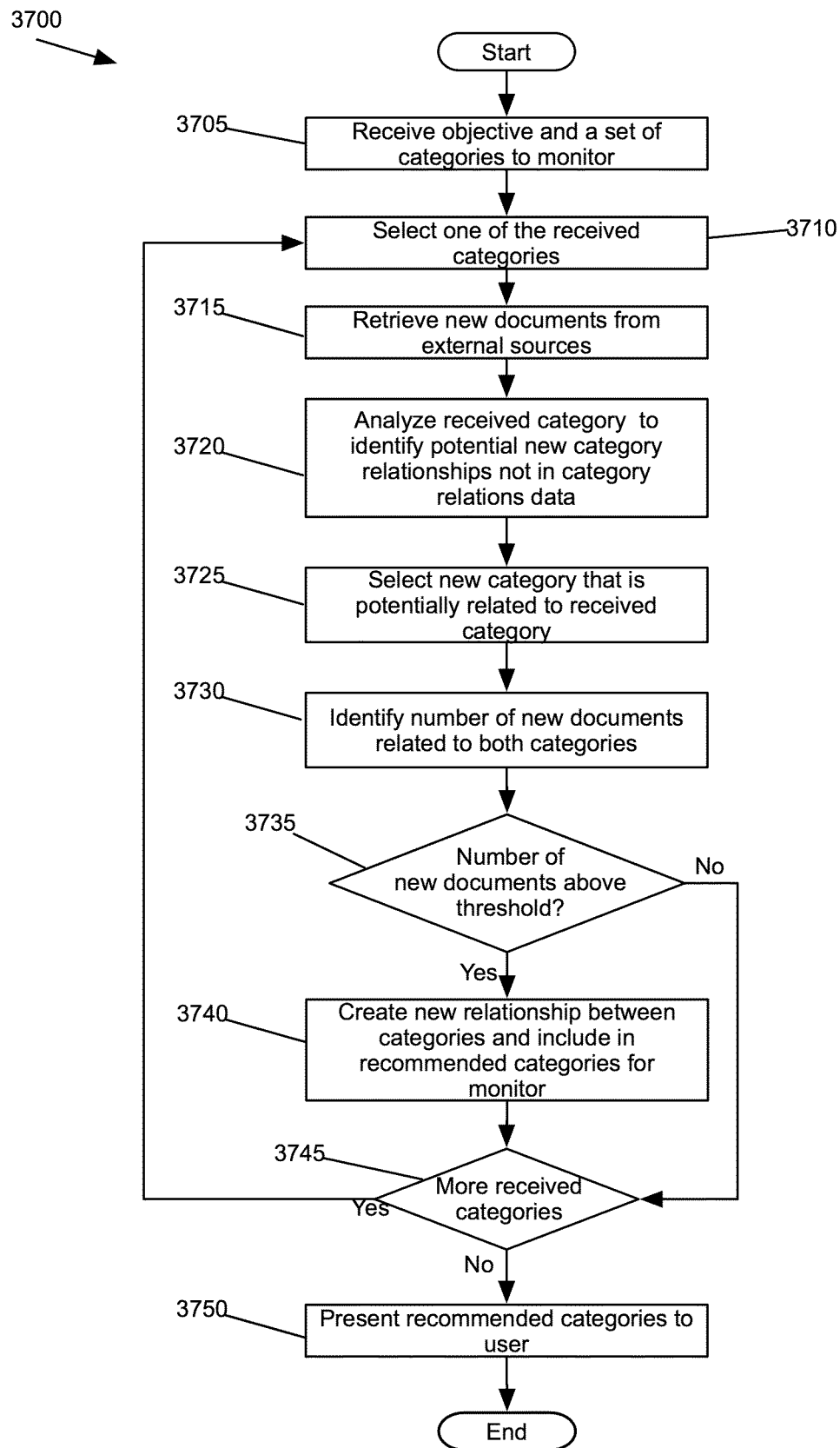

FIG. 36-37 illustrate a two stage process of some embodiments for recommending additional categories to a user to include in a monitor. FIG. 36 illustrates the process of analyzing the internal knowledge base of the system to determine the additional categories to recommend while FIG. 37 illustrates the process of analyzing external sources, (e.g., the Internet, $3^{rd}$ party databases, etc.) to identify new relationships and categories to recommend to a user. As described, the system uses various mechanisms to determine which additional companies to recommend to the user. In some embodiments, the system executes each of these processes simultaneously while in other embodiments, the system first executes process 3600 and then executes process 3700.

FIG. 36 illustrates the process for analyzing the knowledge base to identify other categories to recommend to a user. The process 3600 initially receives (at 3605) a user's objective for a monitor and a list of categories to monitor. The objective can range from certain pre-defined objectives to a user customized objective. Likewise, depending on the particular objective for the monitor, the categories can range from various companies, topics, industries, and people.

The process (at 3610) selects one of the received categories. The process can select the particular category using a variety of mechanisms. Some embodiments select each category based on the alphabetical order of the received categories. Some embodiments select a category randomly or based on other attributes.

For the selected category, the process next (at 3615) analyzes the knowledge base for the particular category using the category relations data stored in the knowledge base. The category relations data contains the relationship information of the other categories that are related to the selected category. The category relations data may include other companies that are related to the selected category. These companies could be related based on a variety of relationships, including a competitor, subsidiary, parent, among other potential existing relationships. The selected category can also include a variety of topics, industries, and people to which the category relations data has defined a relationship for the received category.

For each of these related categories, the process (at 3620) identifies the relationship associated with the particular category type for the received objective. The relationship could include a competitor relationship, a related topic, a related person, a related business, a related industry, and numerous other relationships.

The process (at 3625) next selects one of the identified relationship types. The process may select a particular relationship using various mechanisms, including based on an alphabetical order of the relationships, based on the importance of the relationship to the particular objective, and various other mechanisms. Some embodiments examine only certain relationships based on the particular objective. For example, for a user objective related to competitor analysis, the system will only examine the competitor relationships stored in the knowledge base for the particular category.

The process next (at 3630) identifies a set of categories associated with the selected category for the identified relationship. The process analyzes the category relations data stored in the knowledge base to ascertain all other categories for the particular relationship. For example, for a competitor relationship, the process identifies all companies that are a competitor to the selected company.

The process then (at 3635) includes all of the identified categories (e.g. companies) in the recommended list of categories to monitor. Some embodiments return only a certain number of categories for a particular relationship. For example, with a company with a large number of competitors, the process may select the top 30 competitors to recommend. The process next determines (at 3640) whether more unexamined relationships exist for the selected category. If more relationships exist, the process returns (3625) to select another relationship for the particular category. Otherwise, the process determines (at 3645) if there are more received categories that are left to examine. If there are more categories, the process returns to select (at 3610) another category from the received set of categories. If the process has examined all of the received categories, the process (at 3650) provides the recommended categories to the user.

FIG. 37 illustrates a second stage process of some embodiments for detecting and recommending additional categories to a user to include in a monitor. Process 3700 recommends additional categories based on new relationships that are detected from external sources that have not yet been defined in the knowledge base of the system. In some embodiments, the category relations data stored in the knowledge base may not reflect the most recent information available on the Internet and thus may only reflect market information as of a certain time period. For example, the knowledge base maybe current as of one or two or three days prior to the current date. In order to detect the most recent relationships that may exist in the marketplace, in some embodiments, the system examines external sources for new information gathered to ascertain any new relationship data that may be relevant for a particular user and not yet reflected in the knowledge base.

As in process 3600, the process 3700 initially receives (at 3705) a user's objective for a monitor and a list of categories to monitor and selects (at 3710) on of the received categories using similar mechanisms to those described in FIG. 36.

The process (at 3715) next retrieves and analyzes new documents from external sources including the Internet. The process may retrieve documents using a document retriever, e.g., a web crawler. In some embodiments, the process may search external sources for documents related to the received categories using various searching algorithms and search engines.

The process (at 3720) analyzes the retrieved documents and the received categories to identify potential new category relationships that may exist that are not yet reflected in the category relations data. For example, for a received category that is a company, the process may identify (at 3725) a new competitor based on an analysis of certain new documents. In order to determine whether or not to create a relationship, the process may use the various category analyzers. The process (at 3735) determines the number of new documents related to both categories. If the process determines that the number is above a threshold, the process creates a new relationship between the categories, includes the new category in the recommended list of categories for the monitor, and stores the new relationship in the knowledge base of the system. Otherwise the process determines (at 3745) whether there are more unexamined received categories.

If the process (at 3745) determines that more categories exist, then the process returns to select (at 3710) another of the received categories. Otherwise, the process (at 3750) presents the recommended list of categories to the user and end.

In addition to recommending categories, the system also recommend various filters. FIG. 38 illustrates a process 3800 of some embodiments for selecting a set of filters to apply to a monitor. As described above, the monitoring system may apply a variety of different sets of filters to different sets of categories in order to identify the exact types of documents that would be relevant to a user with a particular objective. Some embodiments apply a set of filters to all of the categories included in a monitor. Some embodiments may apply specific sets of filters to specific individual or groups of categories, depending on the particular user's preferences.

In order to determine the set of filters for a particular monitor, the process (at 3805) receives a user's objective for a monitor and the set of tagged documents that have been gathered by the system for the user specified categories in the monitor. The user's objective is primary factor for determining the set of filters to apply for the particular monitor. Other factors include the amount of information that is available for the set of user specified categories. The set of tagged documents received includes all of the documents that have been tagged by the system as relevant to a particular category included in the monitor, and thus consist of the largest possible collection of documents available for the monitor without any further filtering. The filters then are used to reduce this collection of documents to only those documents that are relevant to the particular user's objective for the monitor.

The process (at 3810) next selects a first group of filters. In some embodiments, the process initially selects the least restrictive set of filters for the particular objective. Some embodiments may apply a predetermined set of filters that are known to produce the optimal results for the given user preferences. The process identifies (at 3815) the automatic filters within the first group of filters based on the received objective. The process applies a set of filter rules that identify individual filters to apply for a particular objective. Once the process identifies the automatic set of filters, the process applies these filters to the set of tagged documents.

The process then determines (at 3820) whether the number of documents that remain after the filters have been applied is above a certain threshold number. Some embodiments apply a predefined threshold specific to particular objective. Some embodiments allow the user to set the threshold to correspond to the particular number of documents they would like to retrieve in their monitor.

If the number of documents is above the threshold, the process (at 3825) applies additional filters, specific to large volumes of returned documents, to reduce the number of documents to a number below the threshold value that retains only the most relevant documents with the highest relevancy scores for the monitor. The process next determines (at 3830) if more groups of filters remain to be examined. If more groups of filters remain, the process returns to select (at 3810) another group of filters. Otherwise, the process presents (at 3830) the identified set of filters to the user and ends.

Figure 39:
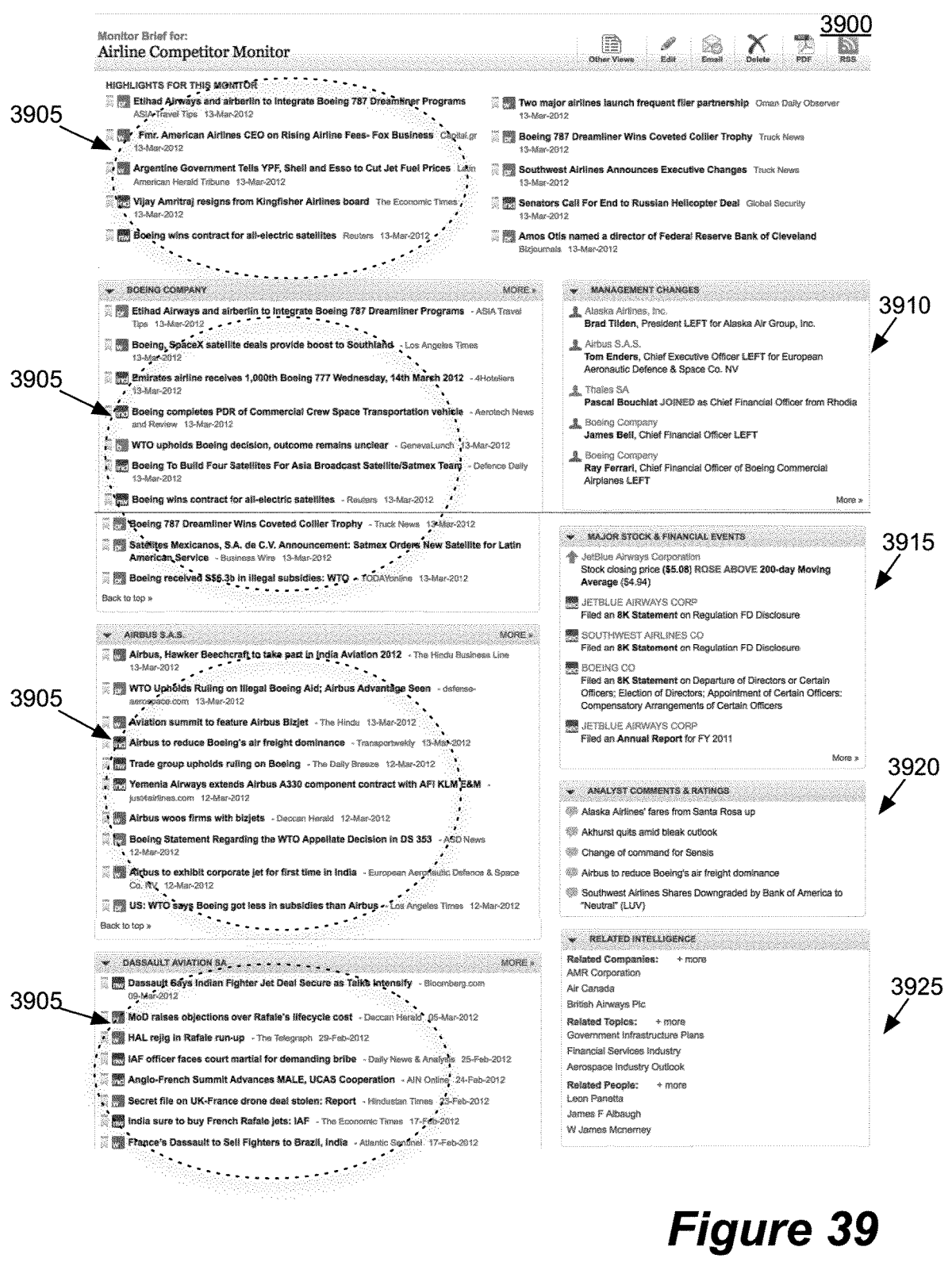

FIG. 39 illustrates an example of the GUI 3900 for presenting information for a particular monitor. The GUI 3900 displays each company with a list of various headings for relevant documents that have been detected by the monitor. The GUI 3900 also provides numerous other icons corresponding to different tools and features. The GUI 3900 provides various reporting tools, including different "views", editing tools, e-mail options, delete functions, PDF reports, and RSS feeds. The GUI 3900 also displays news regarding management changes in the management changes display area 3910, major stock & financial events in the events display area 3915, analyst comments and ratings in the ratings display area 3920, and related intelligence in the related intelligence display area 3925.

GUI 3900 displays the information that is presented for the Airline Competitor Monitor setup in FIGS. 13-33. This monitor includes various categories, including the user entered companies, Boeing Company and Southwest Airlines Co., and various recommended companies, including Airbus S.A.S., Dassault Aviation SA, among others. For each of these companies, the document display area 3905 lists links to documents that have been tagged as relevant to the particular category (e.g., Boeing, Airbus, Dassault Aviation etc.). In some embodiments, the order in which these documents are displayed in the list of documents may be based on various factors. The sorting mechanism may be based on the relevance and importance of the document to the particular monitor, the quality of content in the document, the date and how recent the document was made available, the source of the document, the credibility of the author of the document, and numerous other factors. The system uses various algorithms to determine the particular quantity and quality of documents that are displayed and the format that these documents are presented to the user based on the user's profile information and monitor parameters.

In some embodiments, the system will order and sort the documents that are displayed in the document display area 3905 based on the user's profile information and objective. For example, if a user's profile information indicates that they are an engineer, then this person will likely be interested in research reports, scientific journals, technical documents, and other scientific reports and thus the document display area 3905 will display these types of documents with the most valuable information at the top of the document list. A financial analyst will likely be interested in company earnings reports and other analyst reports and thus, for this particular user, the document display area 3905 will order the display of these types of documents at the top of the list of documents returned by the monitor. In some embodiments, a user's profile information also includes various behavioral patterns of the user. The behavioral patterns include the types of documents that the user frequently reviews and reads, the topics that the user most frequently shows an interest in, the time that the user spends reviewing the different types of documents, and various other factors. For instance, if a user frequently reads documents from a certain news source (e.g. Wall Street Journal), website (CNN), author, or other source, the system will order documents from these sources near the top of the list of documents to display in the document display area 3905. For each particular user profile and objective, the monitor will deliver or display documents according to a particular order and format that is most relevant for the particular user.

A user may select one of the documents to open a new web page or tab (or navigate in the current browser window) displaying the document available on the world wide web. For example, Boeing Company has 10 documents that are listed in the document display area 3905. These documents may be listed based on a calculated degree of importance of the document to the monitor. Each of these document references include the source of the document, the type of document and the date. For example, the first document listed in the document display area 3905 for Boeing Company is an article entitled "Etihad Airways and airberlin to Integrate Boeing 787 Dreamliner Programs". The article is dated Mar. 13, 2012 and the source of the article is ASIA Travel Tips. Each selected company in the monitor has a similar document display area 3905 with a list of relevant documents that have been detected by the monitor.

The related intelligence display area 3925 displays a list of related categories, including companies, topics, and people for the selected categories in the monitor. In some embodiments, these categories are ordered based on various factors related to the objective and categories selected in the monitor. For example, in some embodiments, companies are ordered based on the calculated importance as competitors to a selected company in the monitor (i.e., Boeing). In some embodiments, as displayed, the companies are ordered alphabetically. In addition, the related categories display area 3910 is expandable to list more categories. Furthermore, some embodiments allow the user to narrow the documents displayed in the display area 3905 to only documents that are tagged to the related category as well as the selected categories in the monitor.

The management changes display area 3910 displays a list of recent management changes within the company. For example, the first item in display area 3910 indicates that Brad Tilden, President of Alaska Airlines, Inc. has left for Alaska Air Group, Inc. Likewise the last item in display area 3910 indicates that Ray Ferrari, Chief Financial Officer of Boeing Commercial Airplanes has left Boeing Company.

The events display area 3915 displays recent major stock and financial events related to the monitor. The first item in the events display area 3915 is regarding JetBlue Airways Corporation stock price, which indicates that it closed at $5.08, which is above the 200-day moving average of $4.94. Other major stock and financial events listed include JetBlue Airways Corp filing an 8K Statement of Regulation FD Disclosure.

The ratings display area 3920 displays information regarding recent developments regarding a company's rating and related analyst comments. For example, the last item displayed in the ratings display area 3920 is entitled "Southwest Airlines Shares Downgraded by Bank of America to "Neutral" (LUV)." The monitor constantly monitors the Internet and other sources of information to provide the most up-to date information regarding issues that are relevant to a given user's monitor. For each of the different display areas described above, the user may select a "more" icon to receive more information regarding those particular areas.

IV. Document Classification

In order to develop the knowledge base of the system, some embodiments continuously identify and classify documents that are relevant to a particular category and tag the documents accordingly. For instance, some embodiments search various sources (e.g., the World Wide Web, Publish/subscribe, Push Technology, RSS) on a daily or continuing basis for new content and classify the content as relevant to a wide variety of categories (e.g., thousands of categories, including companies, business lines, industries, topics, people etc.).

Figure 40:
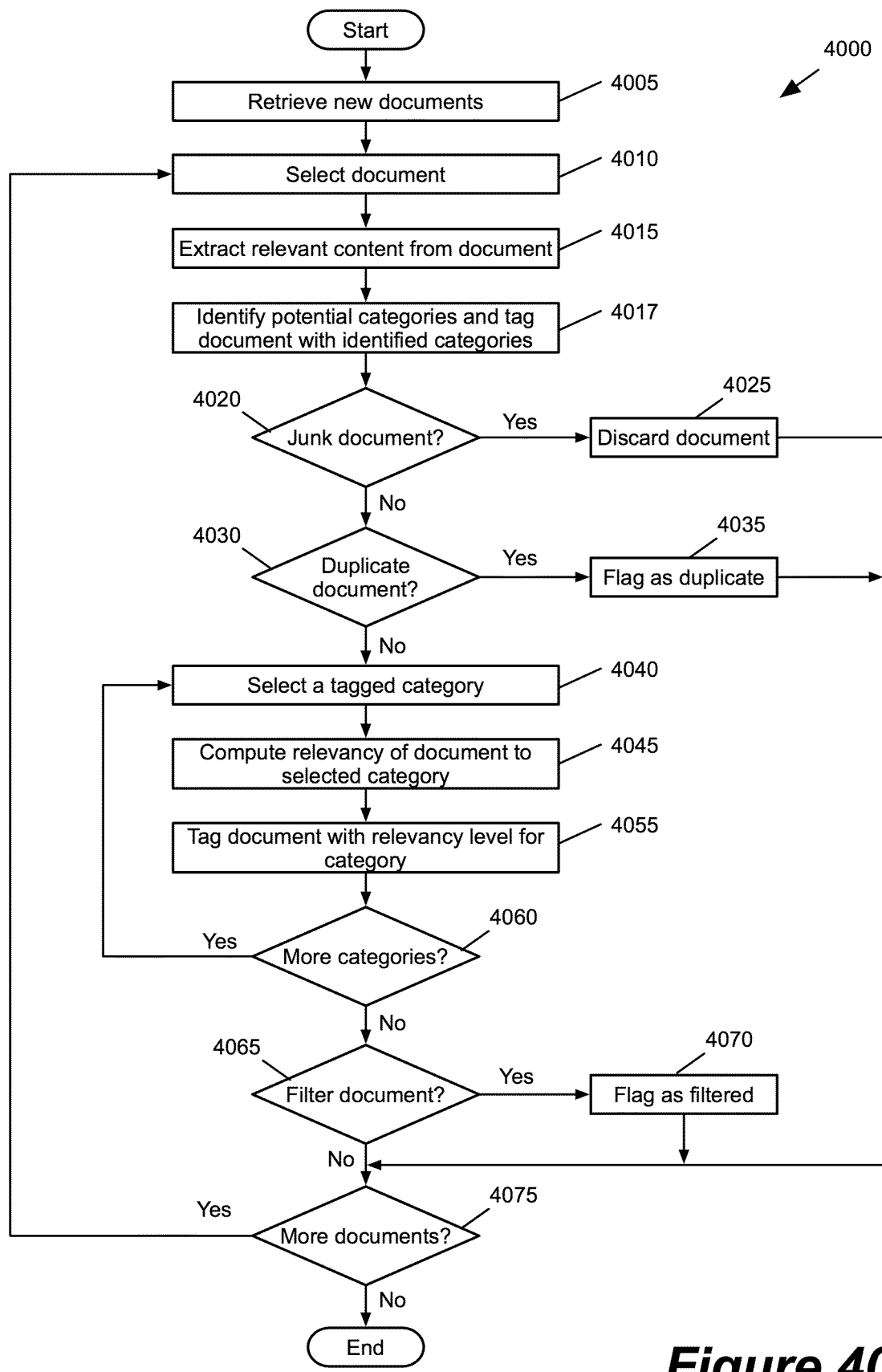
FIG. 40 conceptually illustrates a process of some embodiments for determining whether documents are relevant to a set of categories.

FIG. 40 conceptually illustrates a process 4000 of some embodiments for determining whether documents are relevant to a set of categories. In some embodiments, the process 4000 is performed by a research system on a regular (e.g., hourly, daily, etc.) basis or continuously as new documents are identified.

As shown, the process 4000 begins by retrieving (at 4005) one or more new documents. As mentioned, these documents may be retrieved from the World Wide Web in some embodiments. Some embodiments store copies of the retrieved documents in a database system (e.g., SQL database, NoSQL database, etc.) or store links to the documents in the database. When the documents (or links to the documents) are stored in a database, some embodiments wait until a specified time (e.g., every hour) to retrieve all new documents and evaluate and categorize the new documents as a group.

The process then selects (at 4010) a document for evaluation. Some embodiments select the documents randomly, while other embodiments select the documents in a particular order (e.g., the order in which the documents are detected by a web-crawler and stored in the database). In some embodiments, the documents are evaluated on the fly (i.e., as they are detected as new by the web-crawler), so the documents are evaluated in the order of detection.

The process then extracts (at 4015) relevant content from the selected document. A web document (e.g., an html document) often has various embedded information that is not relevant to the content of the article, such as advertisements, links to other articles or other portions of a website, etc. In some cases, the markup language of an html document is removed as well. Some embodiments use the markup language to identify relevant content (e.g., title and body paragraph tags). The relevant content of a document in some embodiments is the document's title and main body. Some embodiments perform the extraction upon retrieval from the web and store only the extracted content rather than the entire document.

Next, the process identifies (at 4017) potential categories to which the document may be relevant. Some embodiments examine, for the selected document, each category in the system and determine whether the document may be relevant to the category. Some embodiments make a binary decision based on the presence or non-presence of certain keywords whether the document is likely to be relevant to each of the categories. This enables the system to perform the more computation-intensive process of computing a relevancy score, described below at operation 4045, only for those categories for which the document may be relevant. For instance, a document about a new software product would most likely be classified as not potentially relevant to the auto industry, thereby saving the time of computing a score for the document's relevancy to the auto industry.

The process 4000 then determines (at 4020) whether the document is a junk document. Some embodiments eliminate specific types of documents as junk due to the likelihood that the document is not of interest to a user searching for a category. Examples of types of documents that are classified as junk by various embodiments include documents with excessive use of profanity or abuse words (e.g., when the percentage of such words is above a particular threshold), pornographic documents, documents older than a particular threshold date (i.e., documents that show up as new but can be identified as old based on an extracted date), documents with an offensive or inappropriate title, local incidents (e.g., shop fires, traffic accidents, etc.), sporting event results (i.e., soccer match or auto racing results may mention a team or driver's sponsors, but the document is not relevant to the sponsor companies), or general documents that may be identified based on titles (e.g., general business briefs, news roundups, etc.).

When a document is classified as junk, the process discards (at 4025) the document. This may involve removing the document from a database of documents, or flagging the document as junk. When a junk document is removed from the database, some embodiments enter the location of the junk document into a list or separate database, so that the junk document will not be retrieved again when crawling the web. After discarding the document, the process proceeds to 4075, described below.

When the document is not junk, the process determines (at 4030) whether the document is a duplicate of another document already evaluated. To identify duplicate documents, some embodiments compare titles, abstracts, authors, dates, keyword locations, and/or the entire text of documents. Some embodiments perform an initial check for duplicate titles (or another quickly checked indicator), then check more detailed content when the titles match. Some embodiments do not require verbatim similarly, so long as the documents are substantially similar. Often, duplicate documents come about due to a press release (i.e., from a company) or a newswire story (e.g., from Associated Press or Reuters).

When the document is a duplicate, the process flags (at 4035) the document as such by indicating a document group of which it is a part. Some embodiments store a group identifier in a database entry for the document that matches a group identifier for other documents of which the current document is a duplicate. Other embodiments store a reference to the first such document evaluated (which would not be flagged as a duplicate at the time). Some embodiments do not count duplicate documents towards a total number of documents determining whether an event has occurred, but nevertheless store the document. Some users of the system may wish to know how many times a document appears, and all the locations at which it appears. For instance, a marketing executive working for a particular company might want to be able to use the system to identify all instances of a press release about the particular company on the web. After flagging the document as a duplicate, the process 4000 proceeds to 4075, described below.

When the document is neither junk nor a duplicate, the process selects (at 4040) a tagged category for the document (i.e., one of the categories for which the document was tagged as potentially relevant at operation 4017). The process may select the categories in a random order or may select them in a systematic order (e.g., alphabetical, selecting certain types of categories first, etc.).

The process computes (at 4045) the relevancy of the selected document to the selected category. In order to compute a relevancy score for a category, some embodiments use a model for the category that looks for patterns of document elements (e.g., words) in a document and assigns a score for the document based on the presence of the patterns of document elements. For instance, some embodiments use a category model that assigns scores for particular keywords relevant to the category as well as the location in the document of the keyword (e.g., title, summary paragraph, body, etc.). Some embodiments use a category model that looks for particular pairs of keywords and words within a context (e.g., a particular number of consecutive words, the same sentence, the same paragraph, etc.) of the keyword, and assigns positive or negative scores to the document based on keyword sets found in the documents.

To identify documents as related to categories (e.g., business lines, industries, topics, companies, people, etc.) the system of some embodiments utilizes criteria that indicates relevance to that category (e.g., patterns of document elements that typically occur in a document that is related to a business line). In some embodiments, the criteria indicating relevance are embodied in a document classification model for the category, such as a business line or company model.

Some embodiments generate a model for each category. A model for a particular category contains data, such as patterns of document elements, which identifies a document's relevance to the particular category. Methods for generating models of some embodiments are described in detail in the U.S. patent application Ser. No. 12/772,168, entitled "Models for Classifying Documents", which is incorporated herein by reference (hereinafter "the '168 application").

Figure 41:
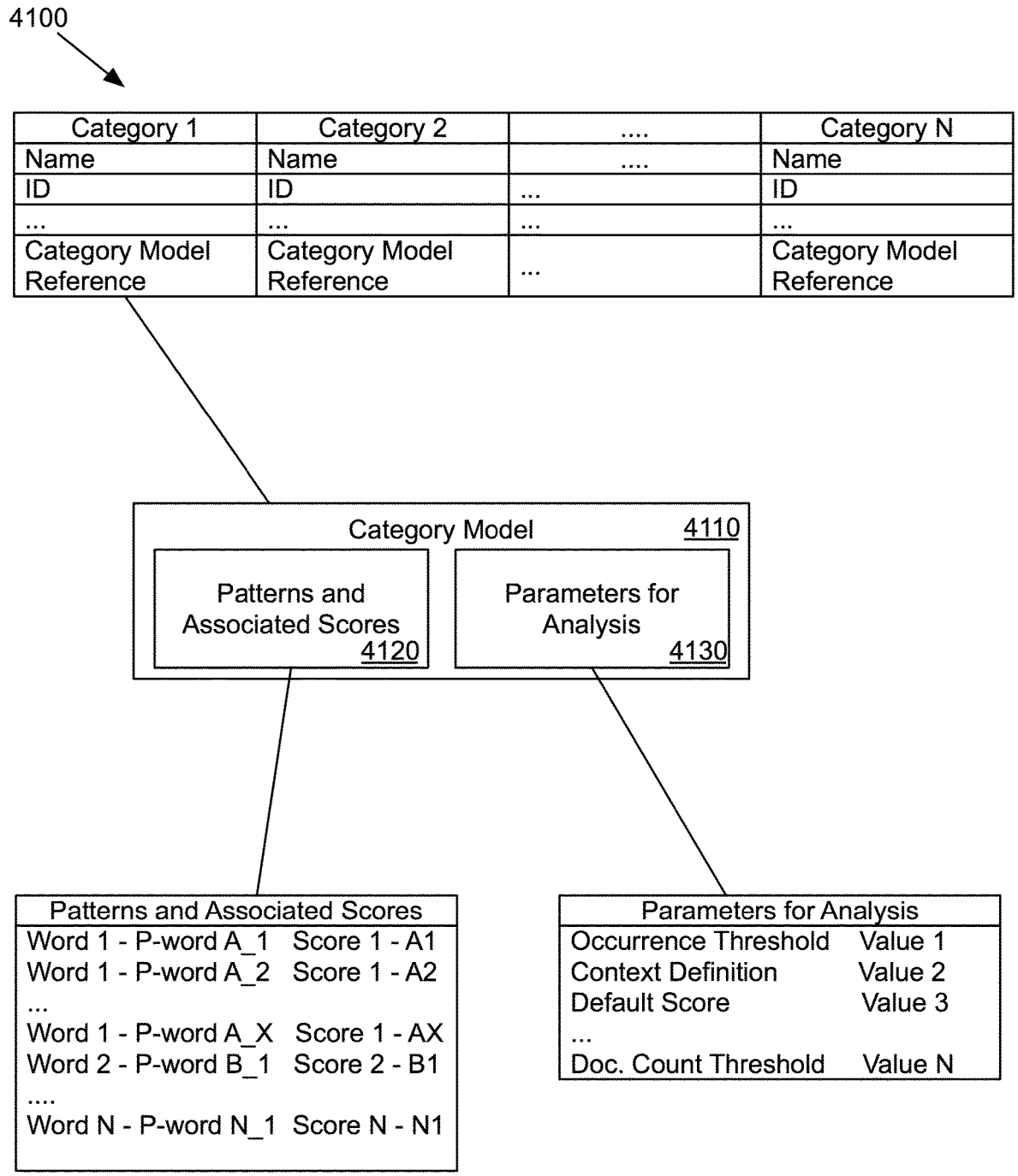
FIG. 41 conceptually illustrates a category structure in which each category of data structure has a referenced category model.

FIG. 41 conceptually illustrates a category data structure 4100 (e.g., a category database) in which each category of data structure 4100 has a referenced category model 4110. The category data structure 4100 includes multiple categories. Each category may have a unique identification, a name, alternative names, a referenced related model 4110, or any other data.

The illustrated category model 4110 contains data for identifying documents that are related to the category. In some embodiments, this data includes patterns of document elements with an associated score 4120 and parameters for analysis 4130. Some embodiments store the models as text files or markup files (e.g., XML files).

As discussed above, patterns of document elements may include a sequence of words appearing together, several words appearing within a particular proximity of each other, groups of word sets appearing within the context of each other, or any other pattern of document elements that could indicate a document's relevance to a category. FIG. 41 illustrates a category model 4110 that utilizes word set pairs for the pattern of document elements, together with a score, to form patterns and associated scores 4120, although other embodiments could use groups of more than two word sets within a context of each other.

Each word set pair from the list of word set pairs 4120 has a score that quantifies the likelihood that a document containing the word set pair will be relevant to the category. A higher score for a word set pair indicates that a document containing the word set pair is more likely to be relevant to the category for which the model 4110 classifies documents. In some embodiments, the scores can be positive or negative, and a negative score indicates that a document containing the word set pair is more likely to not be relevant to the category.

The parameters for analysis 4130 include various parameters used to define how the model will evaluate new documents. In some embodiments, the parameters for analysis 4130 may include an occurrence threshold, a context definition, a default score, and/or a document count threshold.

In some embodiments, the context definition determines when a first word set is in the context of a second word set. In some embodiments, the word set groups consist of an anchor word set and at least one context word set. Anchor word sets are word sets that are more likely to appear in a document that relates to the particular category as compared to a document that does not relate to that category. In some embodiments, context word sets are word sets that appear within the context of the anchor word sets. The determination of when a word set is in the context of an anchor word set depends on a context definition.

Different embodiments may use different definitions for the context of a word set and its relation to an anchor word set. Some embodiments define context by proximity, such that all word sets within a particular number of words of a first word set are within the context of that first word set. Some embodiments define all word sets within the sentence or paragraph of a first word set as within the context of that first word set. In addition, some embodiments allow different definitions of context for different word sets or different types of documents.

The occurrence threshold in some embodiments is the number of anchor word sets that must appear in a document for that document to be scored for potential relevancy. Some embodiments do not analyze a document that has a number of anchor word sets below the occurrence threshold, or assign the document a very low score (e.g., −999) such that it will not be tagged as relevant to the category.

The default score is a score that is assigned to a new word set group that is not found in the model. A new word set group may include an anchor word set and at least one context word set found in a document that does not occur in the list of word set groups 4130 of a model. Some embodiments set the default score to the twenty-fifth percentile score for all of the word set groups in the model, or some other statistical property of the score in the model. Other embodiments use a default score of zero or another value.

The document count threshold is a number of documents required for a category to be associated with another category, as will be discussed below. This parameter is not used in the determination of the relevancy of a document to the category, and is instead used in the determination of whether two categories are related. Therefore, some embodiments store the document count threshold elsewhere (e.g., as an entry for the category in the data structure 4100).

The classification of documents to various categories using such models is described in further detail in U.S. patent application Ser. No. 12/772,166, filed Apr. 30, 2010 and entitled "Classification of Documents" (referred to hereinafter as "the '166 application"), which is incorporated herein by reference.

Based on the computed relevancy score for the category, the process tags (at 4055) the document with a relevancy level for the category. Some embodiments define relevancy levels (e.g., low, medium, high) for each category as ranges of relevancy scores. The process determines which level the selected document falls into based on the computed relevancy score. The levels may be the same range of scores for all categories or may be varied across categories. Some embodiments enable an administrator of the system to manually set the scores. The ranges for at least some of the categories are set based on a volume breakdown of the documents, in some embodiments (i.e., a particular percentage of documents tagged to a particular category should be in the high, medium, and low relevancy levels).

In some embodiments, the tagging entails modifying a database entry for the document to include fields for the category, the score, and/or the level. Some embodiments do not store the relevancy level, but instead only store the document's score for each of its categories. The system can easily ascertain the relevancy level, for instance by using a look-up table. FIG. 42 conceptually illustrates a portion of a document database 4200 that stores relevancy information for a number of documents. As shown, the document database 4200 includes, for each document, a number of categories and the relevancy score for the category. For instance, Document 2 is relevant to Category B and Category D, while Document 3 is relevant to at least Category A, Category B, and Category C. One of ordinary skill will recognize that the relevancy information for a set of documents can be stored in a wide variety of data structures, and need not be stored in a database such as illustrated in FIG. 42.

The process 4000 next determines (at 4060) whether there are any more categories for which the selected document's relevancy should be evaluated. When the document is initially tagged with potentially relevant categories at operation 4017, the process evaluates the document for relevancy to each of these categories. When more categories remain, the process returns to 4040 to select a new category.

When a document has been evaluated for all categories, the process determines (at 4065) whether to filter the document for some purposes of the system (e.g., determining the new web volume associated with a category). Some embodiments filter out specific types of sources and content, such as message boards, job postings, research reports, product reviews, market updates, obituaries, e-commerce and coupon sources, etc. Some embodiments will also filter out very short or very long documents, documents classified as relevant to many companies (indicating that the document is likely an overview document), or other types of documents not indicative of an event.

When the process determines that the document should be filtered, the process flags (at 4070) the document as such. Some embodiments store a binary value in a database entry for the document (i.e., 0 for not filtered or 1 for filtered). Some embodiments do not store any value unless a document is filtered and store a flag in the database indicating that a document is filtered and should not be counted. One of ordinary skill in the art will recognize that a document filtered by the process 4000 (or a similar process) will not necessarily be filtered by a monitor for reporting new documents relevant to a category.

After the evaluation of the document is complete, the process determines (at 4075) whether any more documents remain to be evaluated. As mentioned, some embodiments process many documents at a time, while other embodiments run process 4000 (or a similar process) whenever a new document is identified. When additional documents remain, the process returns to 4010 to select the next document for evaluation. When all documents have been evaluated, the process 4000 ends.

Figure 43:
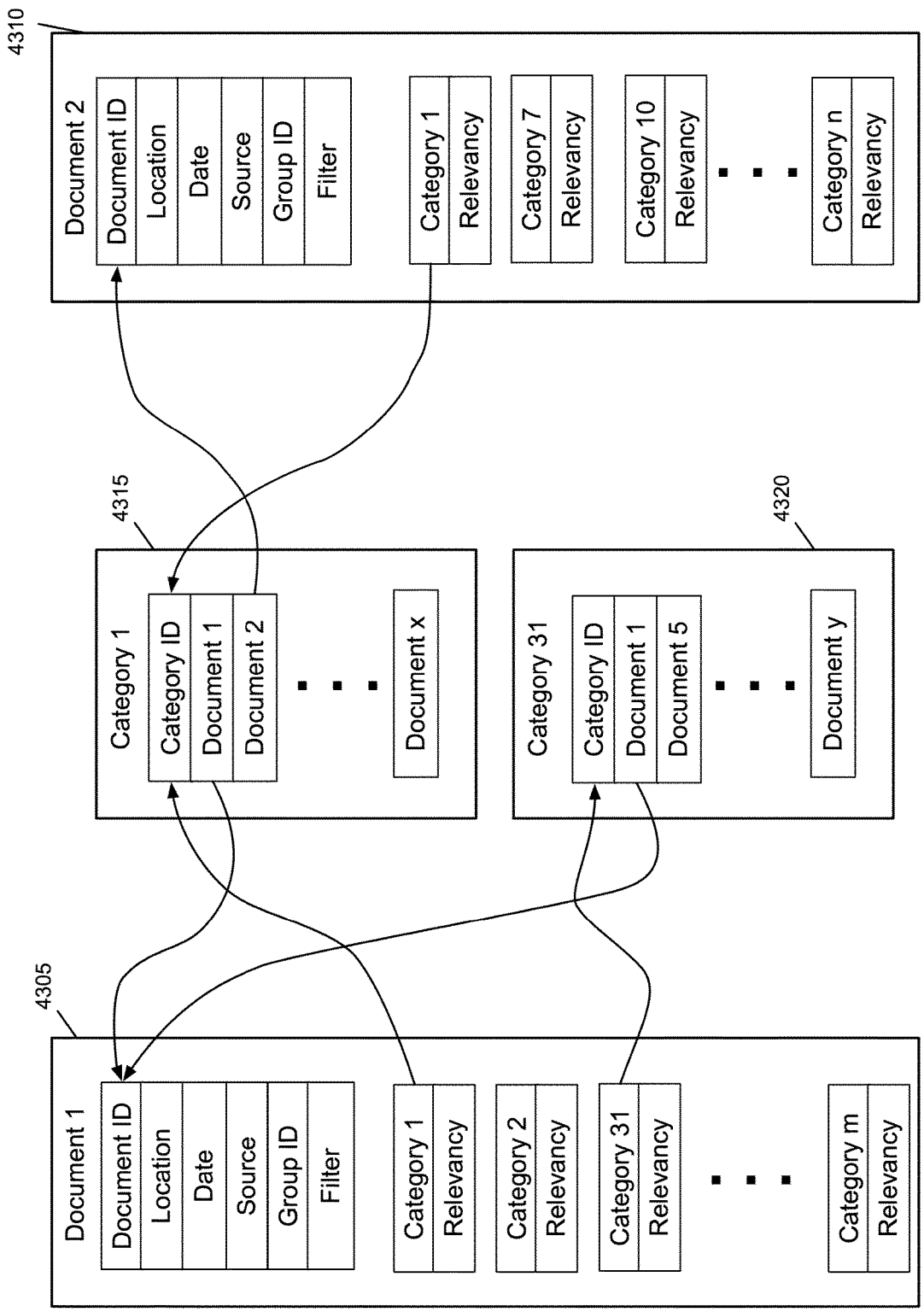
FIG. 43 conceptually illustrates an example of data structures for documents (e.g., entries in a document database) as well as corresponding data structures for categories.

As mentioned, some embodiments store information about the relevancy of documents to various categories, along with other information about the document, in a document database or other data structure. FIG. 43 illustrates an example of such data structures for documents (e.g., entries in a document database) as well as corresponding data structures for categories. Some embodiments include a category database and store a list of documents relevant to the category, as illustrated in FIG. 43. Other embodiments do not store a list of documents (i.e., do not store the document-category association in two directions), but do include data structures for categories (or vice versa).

FIG. 43 illustrates data structures 4305 for Document 1 and 4310 for Document 2. The data structures 4305 and 4310 each include a document identifier, a location, a date, a source, a group identifier, and a filtering flag. The document identifier of some embodiments is a unique identifier (e.g., a number or combination of numbers and letters) that uniquely identifies the document in the system. The location field identifies a location on the web (e.g., a Uniform Resource Locator) at which the document can be found. In the date field, some embodiments store the date on which a web-crawler found the document, while other embodiments extract a date from the document (e.g., via a dateline on an article) and store the extracted date when possible. The source field identifies the source of a document (e.g., the New York Times, Huffington Post, etc.). Some embodiments store the name of the source in the field, while other embodiments store a number that refers to a list of sources. The group identifier field identifies a group of duplicate documents. Rather than store a group identifier, some embodiments instead store a reference to a primary document (e.g., the first document found of a set of duplicate documents). The filtering flag is a binary field in some embodiments that identifies whether the document should be counted for other purposes (e.g., event detection).

In addition, the document data structures 4305 and 4310 include a list of categories to which the document is relevant and the relevancy scores for those categories. Document 1, for example, is relevant to Category 1, Category 2, Category 31, etc. In some embodiments, the categories are listed as references (e.g., pointers) to a category data structure. These references are illustrated in FIG. 43 by arrows from the category references to category data structures 4315 and 4320.

The category data structures 4315 and 4320 include a category identifier and a list of documents that are relevant to the category. As mentioned, in some embodiments the category data structures do not include such a list of documents, and the relevancy information is only stored in the document data structure. As described, some embodiments include other information in the category data structures.

Figure 44:
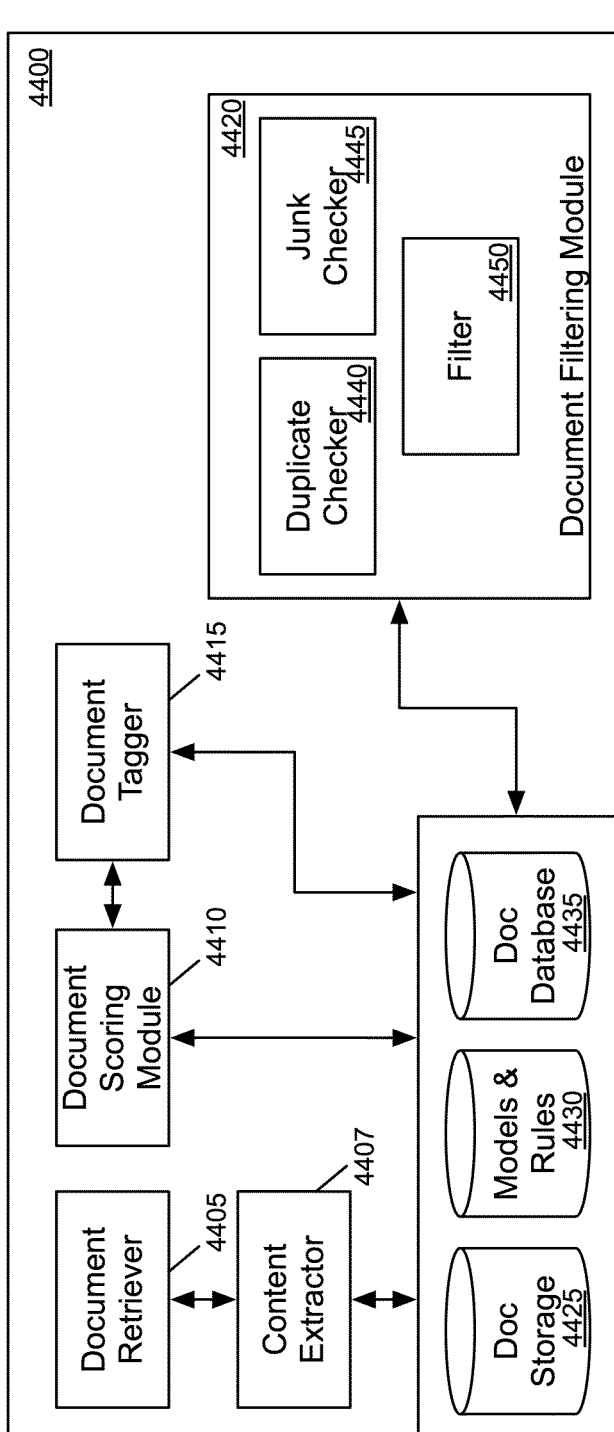
FIG. 44 conceptually illustrates the software architecture of a document classification module of some embodiments.

In some embodiments, the process 4000 (or a similar process) is performed by a set of modules that retrieve documents and classify the documents as relevant to a variety of categories. FIG. 44 conceptually illustrates the software architecture of a document classification module 4400 of some embodiments. In some embodiments, the document classification module 4400 is part of a system that uses the document relevancy information to detect events for various categories and presents the events and relevancy information to a user.

The document classification module 4400 includes a document retriever 4405, a content extractor 4407, a document scoring module 4410, a document tagger 4415, and a document filtering module 4420. FIG. 44 also illustrates a document storage 4425, a models and rules storage 4430, and a document database 4435. The document storage 4425 stores documents (e.g., copies of web pages or extracted title and body content). The models and rules storage 4430 stores models for each category for which document relevancy is tested, as well as filtering and junking rules. Examples of such models are described in the '166 application. The document database 4435 is a database that includes information such as illustrated in FIG. 42 or FIG. 43 for the documents stored in document storage 4425.

In some embodiments, the storages 4425-4435 are one physical storage. In other embodiments, all three may be in different physical storages, or may be split between two storages. For instance, some embodiments store the models and rules information 4430 and the document database 4435 together. Furthermore, some embodiments may split one of the illustrated storages across numerous physical storages (e.g., there may be so many documents that numerous storage devices are required to store copies of all of them).

The document retriever 4405 retrieves documents from an external source (e.g., third party databases available via the Internet). The document retriever, in some embodiments, is a web-crawler module that is separate from the document classification module 4400. In some embodiments, the document retriever 4405 is module that receives documents from a separate web-crawler.

The content extractor 4407 extracts relevant content from a retrieved document. In some embodiments, the content extractor 4407 identifies title, summary, and body content, removes ancillary content such as advertisements, removes markup language, etc. The content extractor then stores the relevant content into document storage 4425.

The document scoring module 4410 uses category models 4430 to determine relevancy scores for documents for a set of categories. In some embodiments, the relevancy scores are calculated as described in the '166 application, by searching for groups of word sets in a document that are indicative of either relevancy or non-relevancy to a category. Other embodiments use other methods to score a document's relevancy to a category. In some embodiments, the document scoring module 4410 makes an initial determination as to whether a document should be scored for a particular category. When the document passes (e.g., has enough keywords for the category), the module 4410 computes the relevancy score.

The document tagger 4415 receives a relevancy score from the document scoring module and determines whether the level of relevancy of the document to the category is above a threshold for the category. In some embodiments, the document tagger 4415 uses a look-up table of categories and relevancy score threshold ranges for relevancy levels. The document tagger 4415 then enters the category and relevancy information into the document database 4435.

The document filtering module 4420 includes a duplicate checker 4440, a junk checker 4445, and a filter 4450. The duplicate checker 4440 determines whether a document is a duplicate of another document already scored and tagged. When the document is a duplicate, some embodiments populate the document database entry for the current document with the relevancy information already determined for the earlier document. The junk checker 4445 determines whether a document is a junk document that should be discarded or flagged as junk. Examples of junk documents of some embodiments are described above. When a document is considered junk, the junk checker 4445 removes the document from the document database or sets a junk flag in the document database in different embodiments. The filter 4450 determines, based on the source of a document, type of document, etc., whether the document should not be counted for various purposes (such as determining the volume of new web documents for a category), even if it is not a junk or duplicate document.

One of ordinary skill will recognize that FIG. 44 illustrates only one example of a document classification module. Other, similar, modules may be used by different embodiments. For instance, some embodiments will have different sub-modules or use a different flow of data (e.g., the three sub-modules of the document filtering module 4420 could be separate, independent modules).

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 45:
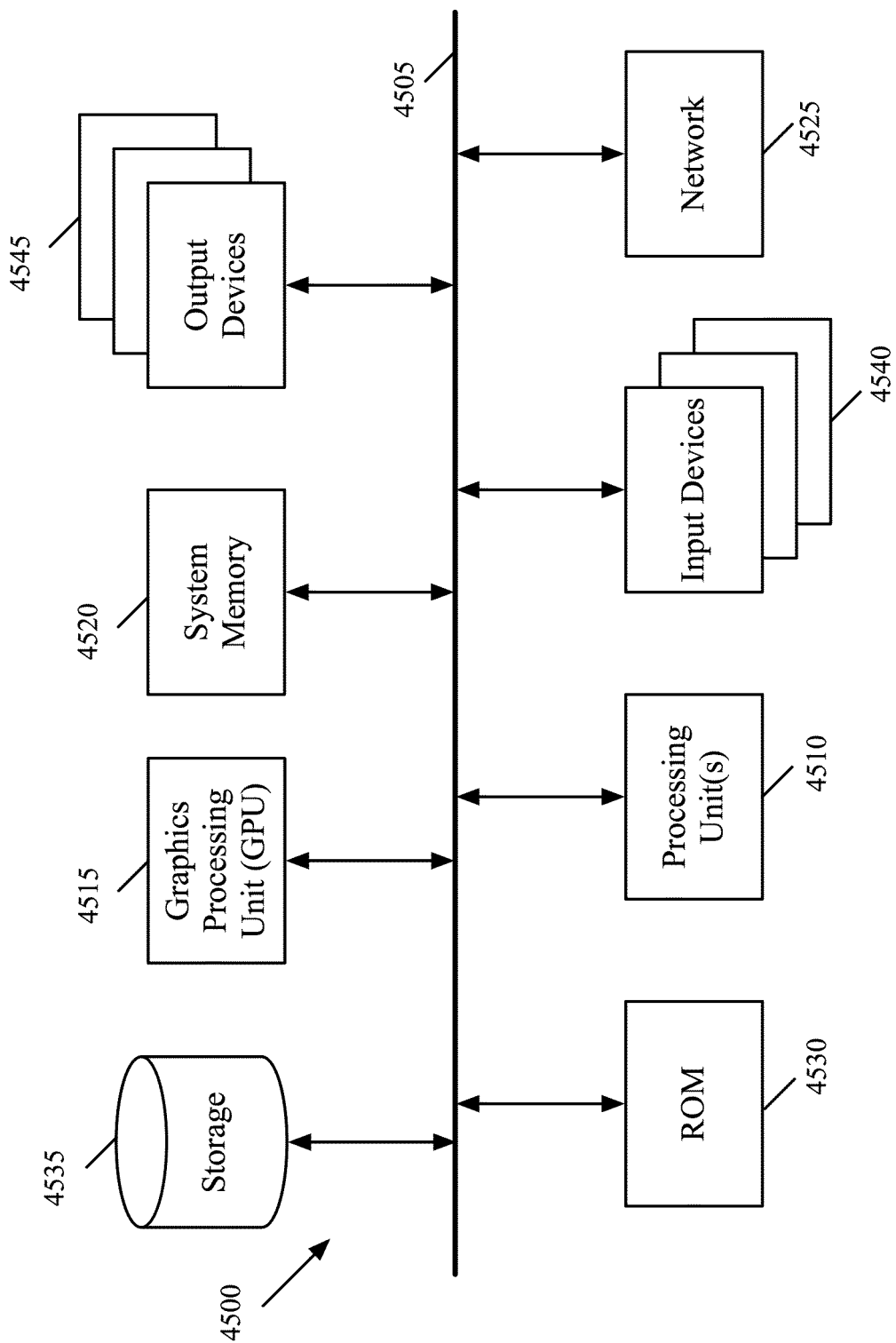
FIG. 45 conceptually illustrates an electronic system with which some embodiments of the invention are implemented.

FIG. 45 conceptually illustrates an electronic system 4500 with which some embodiments of the invention are implemented. The electronic system 4500 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 4500 includes a bus 4505, processing unit(s) 4510, a graphics processing unit (GPU) 4515, a system memory 4520, a network 4525, a read-only memory 4530, a permanent storage device 4535, input devices 4540, and output devices 4545.

The bus 4505 collectively represents all system, peripheral, and chipset buses that communicatively connect the numerous internal devices of the electronic system 4500. For instance, the bus 4505 communicatively connects the processing unit(s) 4510 with the read-only memory 4530, the GPU 4515, the system memory 4520, and the permanent storage device 4535.

From these various memory units, the processing unit(s) 4510 retrieves instructions to execute and data to process in order to execute the processes of the invention. The processing unit(s) may be a single processor or a multi-core processor in different embodiments. Some instructions are passed to and executed by the GPU 4515. The GPU 4515 can offload various computations or complement the image processing provided by the processing unit(s) 4510.

The read-only-memory (ROM) 4530 stores static data and instructions that are needed by the processing unit(s) 4510 and other modules of the electronic system. The permanent storage device 4535, on the other hand, is a read-and-write memory device. This device is a non-volatile memory unit that stores instructions and data even when the electronic system 4500 is off. Some embodiments of the invention use a mass-storage device (such as a magnetic or optical disk and its corresponding disk drive) as the permanent storage device 4535.

Other embodiments use a removable storage device (such as a floppy disk, flash memory device, etc., and its corresponding disk drive) as the permanent storage device. Like the permanent storage device 4535, the system memory 4520 is a read-and-write memory device. However, unlike storage device 4535, the system memory 4520 is a volatile read-and-write memory, such as random access memory. The system memory 4520 stores some of the instructions and data that the processor needs at runtime. In some embodiments, the invention's processes are stored in the system memory 4520, the permanent storage device 4535, and/or the read-only memory 4530. For example, the various memory units include instructions for processing multimedia clips in accordance with some embodiments. From these various memory units, the processing unit(s) 4510 retrieves instructions to execute and data to process in order to execute the processes of some embodiments.

The bus 4505 also connects to the input and output devices 4540 and 4545. The input devices 4540 enable the user to communicate information and select commands to the electronic system. The input devices 4540 include alphanumeric keyboards and pointing devices (also called "cursor control devices"), cameras (e.g., webcams), microphones or similar devices for receiving voice commands, etc. The output devices 4545 display images generated by the electronic system or otherwise output data. The output devices 4545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 45, bus 4505 also couples electronic system 4500 to a network 4525 through a network adapter (not shown). In this manner, the computer can be a part of a network of computers (such as a local area network ("LAN"), a wide area network ("WAN"), or an Intranet, or a network of networks, such as the Internet. Any or all components of electronic system 4500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 6, 12, 36, 37, 38 and 40) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A system for providing a graphical user interface (GUI) for a research system, the system comprising:

a processor; and a memory having code stored therein and executable by the processor to cause the system to:

provide a selectable list of user objectives for a recurring search that identifies documents, from a particular recurring time period, classified as relevant to a set of categories by the research system, wherein a selected user objective comprises a purpose for which a user plans to use the identified documents;

provide a categories display area for displaying a set of recommended categories to include in the recurring search based on the selected user objective and an initial set of categories, wherein the set of recommended categories comprises a subset of pre-selected categories most related to the initial set of categories and further categories for selection by the user;

receiving a selection of a set of additional categories from the set of recommended categories for the recurring search;

after receiving the selection of the set of the additional categories for the recurring search, providing a filters display area for displaying a set of recommended filters for removing specific types of documents from the recurring search that are otherwise relevant to the set of additional categories for the recurring search, wherein a first set of selected additional categories results in displaying a first set of recommended filters and a second set of selected additional categories results in displaying a second, different set of recommended filters; and provide a plurality of selectable user interface controls for modifying delivery parameters for the recurring search, wherein a set of the plurality of selectable user interface controls are automatically pre-selected for the user based on an analysis of a plurality of user profile information and user behavior information, wherein email is pre-selected as a medium through which reports are delivered to the user if the user does not log-in to the research system on a recurring basis over a specified time period.

2. The system of claim 1, wherein the code is further executable by the processor to provide for display in the GUI a set of delivery parameters that define a frequency of notifications to send the user, a medium through which the notifications are sent, and a format of the notifications.

3. The system of claim 2, wherein a particular search identifies a plurality of documents that are relevant to the recurring search for the set of the additional categories and an optimized modifiable set of filters, wherein the plurality of documents are delivered to the user based on the set of delivery parameters.

4. The system of claim 1, wherein the selectable list of user objectives further comprises a pre-defined objective comprising one of a portfolio analysis objective, a competitor analysis objective, and a customer analysis objective.

5. The system of claim 1, wherein the set of additional categories are determined based on an analysis of relationship data stored in the research system.

6. The system of claim 1, wherein at least one of the initial set of categories is one of a company, an industry, a person, and a topic.

7. The system of claim 1, wherein a plurality of the set of recommended filters are configured to filter documents based on one of a source of a document, a type of document, or a geographic region to which the document is related.

8. The system of claim 1, wherein the plurality of the selectable user interface controls for modifying delivery parameters comprises controls for specifying a format of reports generated by the recurring search, a frequency of delivering the reports generated by the recurring search to the user, and a medium through which the reports generated by the recurring search are delivered to the user.

9. The system of claim 1, wherein the set of recommended filters are selected for display in the filters display area based on an analysis of a set of filter rules and the user's objective for the recurring search.

10. The system of claim 1, wherein the set of recommended filters are grouped into subsets based on filter type and a plurality of the set of recommended filters is selectable to either (i) exclude from the recurring search documents that are relevant to a set of search categories but that meet the selected filter for exclusion or (ii) include in the recurring search documents that are relevant to the set of search categories and that meet either the selected filter for inclusion or a different selected filter for inclusion in a same subset.

* * * * *